United States Patent
Hirata et al.

(10) Patent No.: US 9,116,349 B2
(45) Date of Patent: Aug. 25, 2015

(54) IMAGE DISPLAY DEVICE

(75) Inventors: Koji Hirata, Ibaraki (JP); Masahiko Yatsu, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/127,982

(22) PCT Filed: Jun. 22, 2011

(86) PCT No.: PCT/JP2011/003557
§ 371 (c)(1),
(2), (4) Date: Dec. 20, 2013

(87) PCT Pub. No.: WO2012/176235
PCT Pub. Date: Dec. 27, 2012

(65) Prior Publication Data
US 2014/0126033 A1    May 8, 2014

(51) Int. Cl.
G02B 26/08 (2006.01)
G02B 26/10 (2006.01)
G02B 26/12 (2006.01)
G02B 17/08 (2006.01)
G02B 21/00 (2006.01)

(52) U.S. Cl.
CPC ............ G02B 26/101 (2013.01); G02B 17/08 (2013.01); G02B 17/0852 (2013.01); G02B 21/0096 (2013.01); G02B 26/0833 (2013.01)

(58) Field of Classification Search
CPC .. G03B 21/28; G03B 26/101; G03B 26/0833; H04N 9/3129
USPC ........... 353/77, 101; 359/196.1, 197.1, 202.1, 359/205.1
See application file for complete search history.

(56) References Cited

U.S. PATENT DOCUMENTS

| | | | |
|---|---|---|---|
| 6,118,569 A * | 9/2000 | Plesko | 359/202.1 |
| 2006/0028622 A1 | 2/2006 | Nojima et al. | |
| 2006/0114423 A1 | 6/2006 | Maeda et al. | |
| 2006/0139718 A1 | 6/2006 | Ishihara | |
| 2006/0238660 A1 | 10/2006 | Takeda | |
| 2007/0291236 A1* | 12/2007 | Hirata et al. | 353/77 |
| 2008/0143979 A1 | 6/2008 | Konno | |
| 2008/0239252 A1* | 10/2008 | Konno et al. | 353/98 |

(Continued)

FOREIGN PATENT DOCUMENTS

| | | |
|---|---|---|
| JP | 1-195416 A | 8/1989 |
| JP | 2000-196833 A | 7/2000 |
| JP | 2006-072319 | 3/2006 |

(Continued)

*Primary Examiner* — Mahidere Sahle
(74) *Attorney, Agent, or Firm* — Baker Botts L.L.P.

(57) ABSTRACT

An image display device having a scanning characteristic excellent in the linearity without being upsized is provided. The image display device includes: an optical scanning unit that scans a light emitted from a light source in a first direction and a second direction of an image plane due to a rotational movement of reciprocation of a reflecting surface of the light; and an optical system enlarges a scanning angle of the scanned light, in which the optical system has a free curved surface lens on an optical scanning unit side, and has a free curved surface mirror on an image plane side. The free curved surface mirror may be arranged so that the first direction is substantially parallel to a first plane defined by an incident optical beam and a reflected light in the free curved surface mirror when the optical scanning unit remains static in the center of the scanning range.

20 Claims, 49 Drawing Sheets

(56) References Cited

U.S. PATENT DOCUMENTS

2009/0231654 A1* 9/2009 Imai .......................... 359/204.1
2010/0253991 A1   10/2010 Yamada

FOREIGN PATENT DOCUMENTS

| | | |
|---|---|---|
| JP | 2006-178346 A | 7/2006 |
| JP | 2006-323354 A | 11/2006 |
| JP | 2006-337609 A | 12/2006 |
| JP | 2007-334240 A | 12/2007 |
| JP | 2008-20822 A | 1/2008 |
| JP | 2008-151887 A | 7/2008 |
| JP | 2010-32797 A | 2/2010 |
| JP | 2010-139687 A | 6/2010 |
| WO | 2009/041342 A1 | 4/2009 |
| WO | 2009/057522 A1 | 5/2009 |

* cited by examiner

FIG. 7

| APPELLATIVE | SURFACE NUMBER | SHAPE | RADIUS OF CURVATURE | INTER-SURFACE DISTANCE | GLASS MATERIAL | CONTENTS OF ECCENTRICITY AND INCLINATION | THE AMOUNT OF ECCENTRICITY(mm) | | THE AMOUNT OF INCLINATION (DEGREE) | |
|---|---|---|---|---|---|---|---|---|---|---|
| | | | | | | | X ECCENTRICITY | Y ECCENTRICITY | X-AXIS | Y-AXIS |
| LASER SOURCE | (0) | SPHERE | ∞ | 5 | | | | | | |
| ENTRANCE PUPIL | (1) | SPHERE | ∞ | 0 | | | | | | |
| MEMS | (2) | SPHERE | ∞ | 0 | REFLECTING SURFACE | DECENTER & RETURN | 0 | 0 | 0 | -40.860 |
| DUMMY SURFACE | (3) | SPHERE | ∞ | -8.5 | | NORMAL ECCENTRICITY | 0 | 0 | 0 | -90.000 |
| FREE CURVED SURFACE LENS | (4) | XY POLYNOMIAL SURFACE | ∞ | -2.7 | PMMA | DECENTER & RETURN | -0.090 | 0 | 0 | 22.106 |
| | (5) | XY POLYNOMIAL SURFACE | ∞ | -0.961 | | DECENTER & RETURN | 0.340 | 0 | 0 | 5.090 |
| FREE CURVED SURFACE LENS | (6) | XY POLYNOMIAL SURFACE | ∞ | -3.5 | PMMA | DECENTER & RETURN | 1.987 | 0 | 0 | 21.588 |
| | (7) | XY POLYNOMIAL SURFACE | ∞ | -60 | | DECENTER & RETURN | 2.307 | 0 | 0 | -4.349 |
| FREE CURVED SURFACE MIRROR | (8) | XY POLYNOMIAL SURFACE | ∞ | 0 | REFLECTING SURFACE | DECENTER & RETURN | 63.719 | 0 | 0 | 80.166 |
| DUMMY SURFACE | (9) | SPHERE | ∞ | 100 | | NORMAL ECCENTRICITY | 0 | 0 | 0 | 128.061 |
| IMAGE PLANE | (10) | SPHERE | ∞ | 0 | | NORMAL ECCENTRICITY | 270 | 0 | 0 | 0 |

FIG. 8

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$

| CODE | | FREE CURVED SURFACE LENS | | FREE CURVED SURFACE LENS | | FREE CURVED SURFACE MIRROR |
|---|---|---|---|---|---|---|
| | | FOURTH SURFACE | FIFTH SURFACE | SIXTH SURFACE | SEVENTH SURFACE | EIGHTH SURFACE |
| c | 1/R | 0 | 0 | 0 | 0 | 0 |
| K | K | 0 | 0 | 0 | 0 | 0 |
| C2 | X | 0.349624563 | 0.269927984 | -0.185371844 | -0.309182354 | -0.628649481 |
| C4 | $X^2$ | 0.04128861 | -0.012182237 | -0.054746638 | 0.003698041 | -0.009288099 |
| C6 | $Y^2$ | -0.141017861 | -0.048519056 | 0.764937711 | 0.021587641 | 0.002196752 |
| C7 | $X^3$ | -0.02150047 | 0.004069698 | 0.005633624 | -0.005692978 | 0.000701226 |
| C9 | $XY^2$ | -0.017256707 | 0.025427159 | 0.108572457 | -0.00623869 | 0.000244257 |
| C11 | $X^4$ | -0.000821675 | 6.1483E-04 | 0.00550315 | 1.8254E-04 | 2.0585E-05 |
| C13 | $X^2Y^2$ | 0.014813883 | 8.7481E-03 | 0.021244535 | 2.9920E-03 | -1.1730E-05 |
| C15 | $Y^4$ | -0.026216902 | -3.1692E-01 | -0.395137143 | 2.3554E-03 | -9.4200E-07 |
| C16 | $X^5$ | 0.000110443 | 1.1006E-04 | -0.000208594 | 1.3819E-04 | -7.8182E-07 |
| C18 | $X^3Y^2$ | -0.002662644 | 7.4408E-03 | -0.001397694 | -3.8605E-04 | -6.2747E-07 |
| C20 | $XY^4$ | 0.046531764 | 6.1055E-02 | -0.100446252 | -6.6014E-04 | 8.1691E-08 |
| C22 | $X^6$ | 4.37627E-05 | 2.3341E-05 | 0.000292687 | 4.9997E-06 | 2.0093E-08 |
| C24 | $X^4Y^2$ | 0.003196906 | -4.1073E-04 | -0.000492441 | -3.9561E-05 | 4.4766E-08 |
| C26 | $X^2Y^4$ | 0.003450416 | -8.7915E-03 | -0.025788093 | 2.6119E-05 | 5.4970E-09 |
| C28 | $Y^6$ | -0.067092382 | 5.5329E-03 | 0.459287803 | 6.4168E-05 | -9.7367E-10 |
| C29 | $X^7$ | -4.28869E-06 | 6.5180E-06 | 0.000509734 | 4.5678E-06 | -2.2207E-09 |
| C31 | $X^5Y^2$ | -0.000659626 | -2.2057E-04 | 0.00031577 | 6.9710E-06 | -2.6343E-10 |
| C33 | $X^3Y^4$ | -0.011448858 | 3.2124E-03 | -0.000933577 | 7.0756E-06 | -8.9063E-10 |
| C35 | $XY^6$ | -0.066580054 | 6.3687E-03 | 0.046089419 | -6.4576E-05 | -6.8233E-11 |
| C37 | $X^8$ | -4.81707E-06 | 1.4610E-06 | -0.000200734 | -2.6466E-07 | -2.8978E-10 |
| C39 | $X^6Y^2$ | -7.6712E-05 | -5.9685E-05 | -0.000125075 | -4.2372E-06 | -6.8633E-11 |
| C41 | $X^4Y^4$ | 0.003204566 | -8.1972E-04 | -0.000409066 | 4.6693E-06 | -2.2445E-11 |
| C43 | $X^2Y^6$ | -0.033227934 | -2.2869E-02 | 0.040759007 | 2.2739E-06 | 8.3163E-12 |
| C45 | $Y^8$ | 0.064497411 | -6.2588E-01 | -0.432182695 | 9.1847E-07 | 7.3071E-13 |
| C46 | $X^9$ | 2.9152E-08 | -2.3726E-08 | -0.000232996 | 2.7004E-07 | -2.4595E-12 |
| C48 | $X^7Y^2$ | -1.44485E-05 | -4.5344E-06 | -5.20091E-06 | 1.1587E-06 | 6.3132E-12 |
| C50 | $X^5Y^4$ | -0.000616877 | -4.2762E-05 | 0.00093 | 7.6834E-07 | 1.8258E-12 |
| C52 | $X^3Y^6$ | 0.010702798 | 1.0703E-02 | -0.000219987 | -1.7926E-06 | 5.6079E-13 |
| C54 | $XY^8$ | 0.048561261 | -1.6442E-01 | -0.00049315 | 7.4764E-06 | 3.3298E-15 |
| C56 | $X^{10}$ | 1.7083E-06 | -2.5101E-07 | 8.78141E-05 | -7.1733E-08 | 2.6285E-15 |
| C58 | $X^8Y^2$ | 1.73327E-05 | 6.4384E-06 | -9.79968E-06 | -9.5138E-08 | 1.0107E-13 |
| C60 | $X^6Y^4$ | 8.56939E-05 | 3.9058E-06 | -8.42942E-05 | -2.2269E-07 | -3.9928E-14 |
| C62 | $X^4Y^6$ | -0.00167207 | 1.3904E-03 | -0.000578202 | 2.2427E-07 | -1.2971E-14 |
| C64 | $X^2Y^8$ | 0.02820875 | 1.3481E-02 | -0.013192328 | -5.8871E-07 | -3.7322E-15 |
| C66 | $Y^{10}$ | 0.007477294 | 4.6528E-01 | 0.136172617 | -7.2216E-07 | -1.8566E-16 |

FIG. 18

| APPELLATIVE | SURFACE NUMBER | SHAPE | RADIUS OF CURVATURE | INTER-SURFACE DISTANCE | GLASS MATERIAL | CONTENTS OF ECCENTRICITY AND INCLINATION | THE AMOUNT OF ECCENTRICITY(mm) | | THE AMOUNT OF INCLINATION (DEGREE) | |
|---|---|---|---|---|---|---|---|---|---|---|
| | | | | | | | X ECCENTRICITY | Y ECCENTRICITY | X-AXIS | Y-AXIS |
| LASER SOURCE | (0) | SPHERE | ∞ | 5 | | | | | | |
| ENTRANCE PUPIL | (1) | SPHERE | ∞ | 0 | | | | | | |
| MEMS | (2) | SPHERE | ∞ | 0 | REFLECTING SURFACE | DECENTER & RETURN | 0 | 0 | 0 | -39.818 |
| DUMMY SURFACE | (3) | SPHERE | ∞ | -10 | | NORMAL ECCENTRICITY | 0 | 0 | 0 | -90.000 |
| FREE CURVED SURFACE LENS | (4) | XY POLYNOMIAL SURFACE | -140.2019 | -5 | PMMA | DECENTER & RETURN | 1.556 | 0 | 0 | 10.869 |
| | (5) | XY POLYNOMIAL SURFACE | -87.9970 | -50 | | DECENTER & RETURN | 1.808 | 0 | 0 | -1.11 |
| FREE CURVED SURFACE MIRROR | (6) | XY POLYNOMIAL SURFACE | -2074.526 | 0 | REFLECTING SURFACE | DECENTER & RETURN | 38.062 | 0 | 0 | 62.596 |
| DUMMY SURFACE | (7) | SPHERE | ∞ | 100 | | NORMAL ECCENTRICITY | 0 | 0 | 0 | 127.800 |
| IMAGE PLANE | (8) | SPHERE | ∞ | 0 | | | 270 | 0 | 0 | 0 |

FIG.19

| CODE | | FREE CURVED SURFACE LENS | | FREE CURVED SURFACE MIRROR |
|---|---|---|---|---|
| | | FOURTH SURFACE | FIFTH SURFACE | SIXTH SURFACE |
| c | 1/R | -0.007132572 | -0.011364024 | -0.000482038 |
| K | K | 0 | 0 | 0 |
| C2 | $X$ | 0.191070273 | -0.35249979 | -0.204793784 |
| C4 | $X^2$ | -0.103663775 | -0.007850465 | -0.005957753 |
| C6 | $Y^2$ | 0.567561957 | -0.03719686 | 0.002400809 |
| C7 | $X^3$ | -0.007521603 | -0.003417279 | 6.10749E-05 |
| C9 | $XY^2$ | 0.091876877 | 0.000517977 | 0.000192292 |
| C11 | $X^4$ | 0.004959388 | 2.6292E-04 | 7.5623E-06 |
| C13 | $X^2Y^2$ | -0.002077849 | 3.9894E-03 | -1.6143E-06 |
| C15 | $Y^4$ | -0.407964888 | 2.9205E-03 | -7.7905E-07 |
| C16 | $X^5$ | -0.002088801 | 1.4189E-04 | 3.3066E-07 |
| C18 | $X^3Y^2$ | 0.003570485 | -2.7959E-04 | -4.7153E-07 |
| C20 | $XY^4$ | -0.142157669 | -7.1242E-04 | 1.7743E-07 |
| C22 | $X^6$ | 0.000829819 | 1.5620E-06 | 3.2352E-08 |
| C24 | $X^4Y^2$ | 0.000617828 | -4.3309E-05 | 6.5997E-10 |
| C26 | $X^2Y^4$ | -0.000686478 | 5.7570E-05 | 3.3298E-09 |
| C28 | $Y^6$ | 0.626930796 | 3.7339E-06 | -2.9924E-09 |
| C29 | $X^7$ | 0.001104665 | 3.0946E-06 | -7.2033E-10 |
| C31 | $X^5Y^2$ | 0.001174248 | 2.8098E-06 | 3.6755E-10 |
| C33 | $X^3Y^4$ | -0.003606619 | 4.8514E-06 | -8.1503E-10 |
| C35 | $XY^6$ | 0.123222494 | -8.9434E-05 | -2.6672E-10 |
| C37 | $X^8$ | -0.000403152 | -5.6393E-07 | -1.1905E-10 |
| C39 | $X^6Y^2$ | 0.000245671 | -5.2579E-06 | -7.9248E-11 |
| C41 | $X^4Y^4$ | -0.007652178 | 3.6503E-06 | -1.2810E-11 |
| C43 | $X^2Y^6$ | 0.032961649 | 8.1001E-07 | 1.3911E-11 |
| C45 | $Y^8$ | -0.590578953 | 9.9163E-06 | 3.2946E-12 |
| C46 | $X^9$ | -0.0002447 | 2.4449E-07 | -9.9787E-13 |
| C48 | $X^7Y^2$ | -0.000655028 | 1.1531E-06 | 4.6133E-12 |
| C50 | $X^5Y^4$ | 0.001749715 | 5.5272E-07 | 1.3281E-12 |
| C52 | $X^3Y^6$ | -0.006489721 | -2.3944E-06 | 1.1915E-12 |
| C54 | $XY^8$ | -0.041212334 | 6.2778E-06 | 7.9863E-14 |
| C56 | $X^{10}$ | 0.00011303 | -5.5414E-08 | -2.6446E-13 |
| C58 | $X^8Y^2$ | 0.00026706 | -1.7895E-08 | 2.4070E-13 |
| C60 | $X^6Y^4$ | -0.000981428 | -2.3583E-07 | -8.1436E-14 |
| C62 | $X^4Y^6$ | 0.007212128 | 3.7389E-07 | -2.2139E-14 |
| C64 | $X^2Y^8$ | -0.026269329 | -3.1933E-07 | -1.1348E-14 |
| C66 | $Y^{10}$ | 0.271096853 | -7.0287E-07 | -1.1555E-15 |

FIG.20
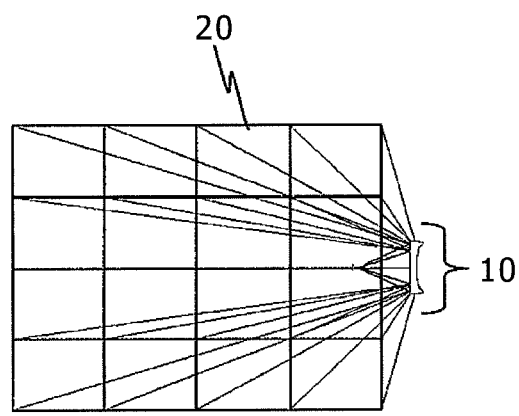
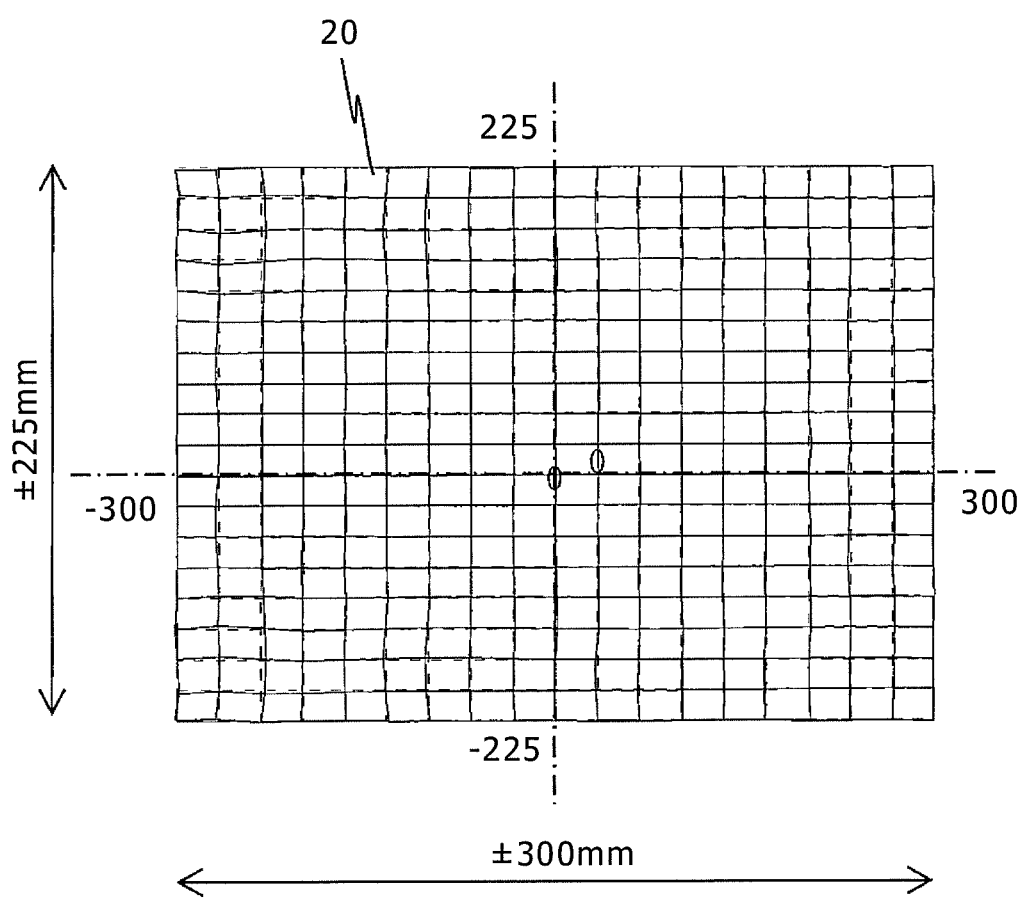

FIG. 24

| APPELLATIVE | SURFACE NUMBER | SHAPE | RADIUS OF CURVATURE | INTER-SURFACE DISTANCE | GLASS MATERIAL | CONTENTS OF ECCENTRICITY AND INCLINATION | THE AMOUNT OF ECCENTRICITY | | THE AMOUNT OF INCLINATION (DEGREE) | |
|---|---|---|---|---|---|---|---|---|---|---|
| | | | | | | | X ECCENTRICITY | Y ECCENTRICITY | X-AXIS | Y-AXIS |
| LASER SOURCE | (0) | SPHERE | ∞ | 5 | | | | | | |
| ENTRANCE PUPIL | (1) | SPHERE | ∞ | 0 | | | | | | |
| MEMS | (2) | SPHERE | ∞ | 0 | REFLECTING SURFACE | DECENTER & RETURN | 0 | 0 | 0 | -40.865 |
| DUMMY SURFACE | (3) | SPHERE | ∞ | -8.5 | | NORMAL ECCENTRICITY | 0 | 0 | 0 | -90.000 |
| FREE CURVED SURFACE LENS | (4) | XY POLYNOMIAL SURFACE | ∞ | -2.7 | PMMA | DECENTER & RETURN | -0.094 | 0 | 0 | 22.012 |
| | (5) | XY POLYNOMIAL SURFACE | ∞ | -0.981 | | DECENTER & RETURN | 0.337 | 0 | 0 | 5.086 |
| FREE CURVED SURFACE LENS | (6) | XY POLYNOMIAL SURFACE | ∞ | -3.5 | PMMA | DECENTER & RETURN | 1.990 | 0 | 0 | 21.457 |
| | (7) | XY POLYNOMIAL SURFACE | ∞ | -59.819 | | DECENTER & RETURN | 2.322 | 0 | 0 | -4.297 |
| FREE CURVED SURFACE MIRROR | (8) | XY POLYNOMIAL SURFACE | ∞ | 0 | REFLECTING SURFACE | DECENTER & RETURN | 62.309 | 0 | 0 | 80.113 |
| DUMMY SURFACE | (9) | SPHERE | ∞ | 100 | | NORMAL ECCENTRICITY | 270 | 0 | 0 | 129.307 |
| IMAGE PLANE | (10) | SPHERE | ∞ | 0 | | NORMAL ECCENTRICITY | | | | 0 |

FIG.25

| CODE | | FREE CURVED SURFACE LENS | | FREE CURVED SURFACE LENS | | FREE CURVED SURFACE MIRROR |
|---|---|---|---|---|---|---|
| | | FOURTH SURFACE | FIFTH SURFACE | SIXTH SURFACE | SEVENTH SURFACE | EIGHTH SURFACE |
| c | 1/R | 0 | 0 | 0 | 0 | 0 |
| K | K | 0 | 0 | 0 | 0 | 0 |
| C2 | $X$ | 0.346744527 | 0.26782264 | −0.180273253 | −0.309131769 | −0.631304397 |
| C4 | $X^2$ | 0.04252678 | −0.013311811 | −0.055711788 | 0.003492276 | −0.009243924 |
| C6 | $Y^2$ | −0.155063178 | −0.054453872 | 0.832549045 | 0.021625569 | 0.002365015 |
| C7 | $X^3$ | −0.021634778 | 0.004038403 | 0.005476125 | −0.005649828 | 0.000687608 |
| C9 | $XY^2$ | −0.013903268 | 0.020147273 | 0.095469608 | −0.006145659 | 0.000233248 |
| C11 | $X^4$ | −0.000851684 | 6.1694E−04 | 0.005660408 | 1.8017E−04 | 1.6596E−05 |
| C13 | $X^2Y^2$ | 0.013117177 | 8.0799E−03 | 0.019905661 | 2.9934E−03 | −1.1722E−05 |
| C15 | $Y^4$ | −0.019803254 | −2.9061E−01 | −0.443797536 | 2.2993E−03 | −9.8768E−07 |
| C16 | $X^5$ | 0.000105773 | 1.1159E−04 | −0.000171959 | 1.3871E−04 | −9.5748E−07 |
| C18 | $X^3Y^2$ | −0.002889421 | 7.2556E−03 | −0.00221254 | −3.7959E−04 | −6.2226E−07 |
| C20 | $XY^4$ | 0.038443615 | 8.7639E−02 | −0.084230933 | −6.8728E−04 | 8.0919E−08 |
| C22 | $X^6$ | 4.31381E−05 | 2.3962E−05 | 0.000295724 | 4.9598E−06 | 2.3519E−08 |
| C24 | $X^4Y^2$ | 0.003062574 | −4.5787E−04 | −0.000316974 | −3.9453E−05 | 4.6828E−08 |
| C26 | $X^2Y^4$ | 0.006110861 | −1.2666E−02 | −0.025609184 | 2.1866E−05 | 5.6518E−09 |
| C28 | $Y^6$ | −0.062935333 | −1.1715E−01 | 0.45537754 | 7.4176E−05 | −9.1435E−10 |
| C29 | $X^7$ | −4.4624E−06 | 6.7419E−06 | 0.00050416 | 4.5761E−06 | −2.6301E−09 |
| C31 | $X^5Y^2$ | −0.000620824 | −2.3565E−04 | 0.00026525 | 7.1689E−06 | −2.3094E−10 |
| C33 | $X^3Y^4$ | −0.010973323 | 2.2225E−03 | −0.000248937 | 6.8180E−06 | −8.5694E−10 |
| C35 | $XY^6$ | −0.065581465 | 2.4661E−02 | 0.045870765 | −6.3356E−05 | −6.2195E−11 |
| C37 | $X^8$ | −4.84041E−06 | 1.5208E−06 | −0.000200859 | −2.6322E−07 | −3.5249E−10 |
| C39 | $X^6Y^2$ | −7.42022E−05 | −6.2873E−05 | −1.54748E−05 | −4.2365E−06 | −6.3592E−11 |
| C41 | $X^4Y^4$ | 0.002800899 | −8.1854E−04 | −0.000783594 | 4.6472E−06 | −2.1806E−11 |
| C43 | $X^2Y^6$ | −0.031790714 | −1.9997E−02 | 0.039158598 | 2.2779E−06 | 8.3537E−12 |
| C45 | $Y^8$ | 0.059212604 | −7.1397E−01 | −0.411847122 | 7.4042E−07 | 7.3022E−13 |
| C46 | $X^9$ | 6.27795E−08 | −1.5713E−08 | −0.000233248 | 2.6990E−07 | −2.9044E−12 |
| C48 | $X^7Y^2$ | −1.82739E−05 | −4.5629E−06 | 1.16318E−06 | 1.1549E−06 | 8.3784E−12 |
| C50 | $X^5Y^4$ | −0.000499521 | −1.6187E−05 | 0.000915373 | 7.9373E−07 | 1.9435E−12 |
| C52 | $X^3Y^6$ | 0.011648932 | 1.1649E−02 | −5.05992E−05 | −1.8391E−06 | 5.7069E−13 |
| C54 | $XY^8$ | 0.057087544 | −1.5520E−01 | −0.005093218 | 7.7288E−06 | 1.8796E−15 |
| C56 | $X^{10}$ | 1.744E−06 | −2.5337E−07 | 8.77099E−05 | −7.1972E−08 | −3.3208E−14 |
| C58 | $X^8Y^2$ | 1.58227E−05 | 6.8173E−06 | −1.94823E−05 | −9.7713E−08 | 1.1231E−13 |
| C60 | $X^6Y^4$ | 0.000104213 | 1.4834E−05 | −7.59028E−05 | −2.1420E−07 | −5.2882E−14 |
| C62 | $X^4Y^6$ | −0.002043173 | 1.2694E−03 | −0.000559016 | 2.0402E−07 | −1.6189E−14 |
| C64 | $X^2Y^8$ | 0.024744197 | −1.3458E−03 | −0.012352595 | −5.7551E−07 | −3.8572E−15 |
| C66 | $Y^{10}$ | 0.009346022 | 7.0781E−01 | 0.127910068 | −7.8724E−07 | −2.0337E−16 |

FIG.26
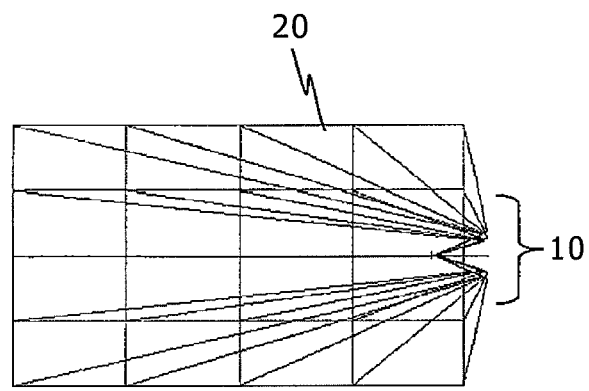
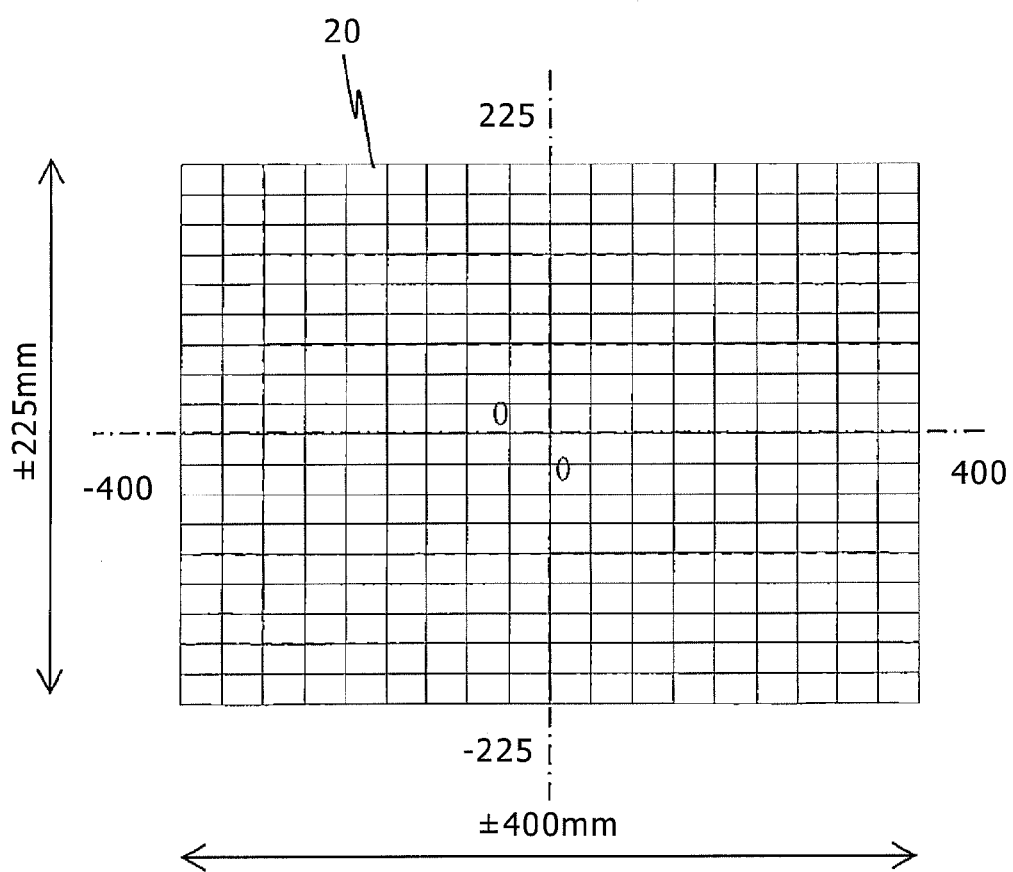

AREA A    AREA B

| | COLOR MIXTURE RATIO | | | BRIGHTNESS RATIO | CHROMATICITY | |
|---|---|---|---|---|---|---|
| | B(460) | G(532) | R(635) | | x | y |
| LASER SIMPLE COLOR | 1 | 0 | 0 | 172 | 0.144 | 0.03 |
| | 0 | 1 | 0 | 2536 | 0.17 | 0.796 |
| | 0 | 0 | 1 | 623 | 0.714 | 0.286 |
| NTSC SIMPLE COLOR | 1 | 0 | 0 | — | 0.14 | 0.08 |
| | 0 | 1 | 0 | — | 0.21 | 0.71 |
| | 0 | 0 | 1 | — | 0.67 | 0.33 |
| NTSC CORRESPONDING COLOR | 1 | 0.05 | 0 | 299 | 0.145 | 0.05 |
| | 0.05 | 1 | 0.1 | 2607 | 0.2 | 0.766 |
| | 0 | 0.05 | 1 | 750 | 0.677 | 0.321 |
| BRIGHTNESS IMPORTANT COLOR | 1 | 0.1 | 0.05 | 457 | 0.155 | 0.074 |
| | 0.025 | 1 | 0.2 | 2665 | 0.232 | 0.708 |
| | 0 | 0.1 | 1 | 877 | 0.644 | 0.351 |

| | COLOR MIXTURE RATIO | | | | | | BRIGHTNESS RATIO | CHROMATICITY | |
|---|---|---|---|---|---|---|---|---|---|
| | B1(460) | B2(450) | G1(532) | G2(515) | R1(635) | R2(645) | | x | y |
| LASER SIMPLE COLOR | 1 | 1 | 0 | 0 | 0 | 0 | 282 | 0.15 | 0.024 |
| | 0 | 0 | 1 | 1 | 0 | 0 | 4280 | 0.118 | 0.802 |
| | 0 | 0 | 0 | 0 | 1 | 1 | 1126 | 0.716 | 0.284 |
| NTSC SIMPLE COLOR | 1 | | 0 | | 0 | | — | 0.14 | 0.08 |
| | 0 | | 1 | | 0 | | — | 0.21 | 0.71 |
| | 0 | | 0 | | 1 | | — | 0.67 | 0.33 |
| NTSC CORRESPONDING COLOR | 1 | 1 | 0.05 | 0.1 | 0 | 0 | 578 | 0.149 | 0.049 |
| | 0 | 0 | 1 | 1 | 0.1 | 0.5 | 4541 | 0.208 | 0.723 |
| | 0 | 0 | 0.05 | 0.1 | 1 | 1 | 1322 | 0.658 | 0.331 |
| BRIGHTNESS IMPORTANT COLOR | 1 | 1 | 0.05 | 0.1 | 0.05 | 0 | 704 | 0.153 | 0.056 |
| | 0 | 0 | 1 | 1 | 0.5 | 0.1 | 4632 | 0.23 | 0.704 |
| | 0 | 0 | 0.15 | 0.05 | 1 | 1 | 1489 | 0.637 | 0.354 |

FIG.65

| RESOLUTION | VGA (640×480) | SVGA (800×600) | XGA (1024×768) | SXGA (1280×1024) | HD (1920×1080) |
|---|---|---|---|---|---|
| HORIZONTAL SCANNING FREQUENCY | 18kHz | 22.5kHz | 28.8kHz | 38.4kHz | 38.9kHz |

IMAGE DISPLAY DEVICE

TECHNICAL FIELD

The present invention relates to an image display device.

BACKGROUND ART

In recent years, there have been proposed image display devices having an optical scanning device that scans a laser beam subjected to optical intensity modulation (hereinafter, modulation) according to an image signal in two dimensional directions, and scans an image plane (for example, screen) with the laser beam by the optical scanning device to draw an image (refer to Patent Documents 1 and 2).

CITATION LIST

Patent Literature

Patent Document 1: Japanese Unexamined Patent Application Publication No. 2010-139687
Patent Document 2: Japanese Unexamined Patent Application Publication No. 2006-178346

SUMMARY OF INVENTION

Technical Problem

According to Patent document 1, there arises such a problem that a movement locus of scanning coordinates on the image plane becomes sinusoid, and its linearity is low. Also, according to Patent document 2, there arises such a problem that a mirror interval needs to be increased to upsize an overall optical system.

Under the circumstances, an object of the present invention is to provide an image display device having a scanning characteristic excellent in the linearity without being upsized.

Solution to Problem

In order to solve the above problem, one of desirable modes of the present invention is described below. The image display device includes: an optical scanning unit that scans a light emitted from a light source in a first direction and a second direction of an image plane due to a rotational movement of reciprocation of a reflecting surface of the light; and an optical system enlarges a scanning angle of the scanned light, in which the optical system has a free curved surface lens on an optical scanning unit side, and has a free curved surface mirror on an image plane side.

Advantageous Effects of Invention

According to the present invention, there can be provided an image display device having a scanning characteristic excellent in the linearity without being upsized.

BRIEF DESCRIPTION OF DRAWINGS

FIG. 7 is a diagram illustrating lens data according to the first embodiment.
FIG. 8 is a diagram illustrating a mathematical expression of a free curved surface coefficient, and specific values according to the first embodiment.
FIG. 18 is a diagram illustrating lens data according to the second embodiment.
FIG. 19 is a diagram illustrating specific values of a free curved surface coefficient according to the second embodiment.
FIG. 20 is a diagram illustrating a distortion performance according to the second embodiment.
FIG. 24 is a diagram illustrating lens data according to the third embodiment.
FIG. 25 is a diagram illustrating specific values of a free curved surface coefficient according to the third embodiment.
FIG. 26 is a diagram illustrating a distortion performance according to the third embodiment.

FIG. 65 is a diagram illustrating a relationship between a display pixel and a horizontal scanning frequency.

DESCRIPTION OF EMBODIMENTS

Figure 59:
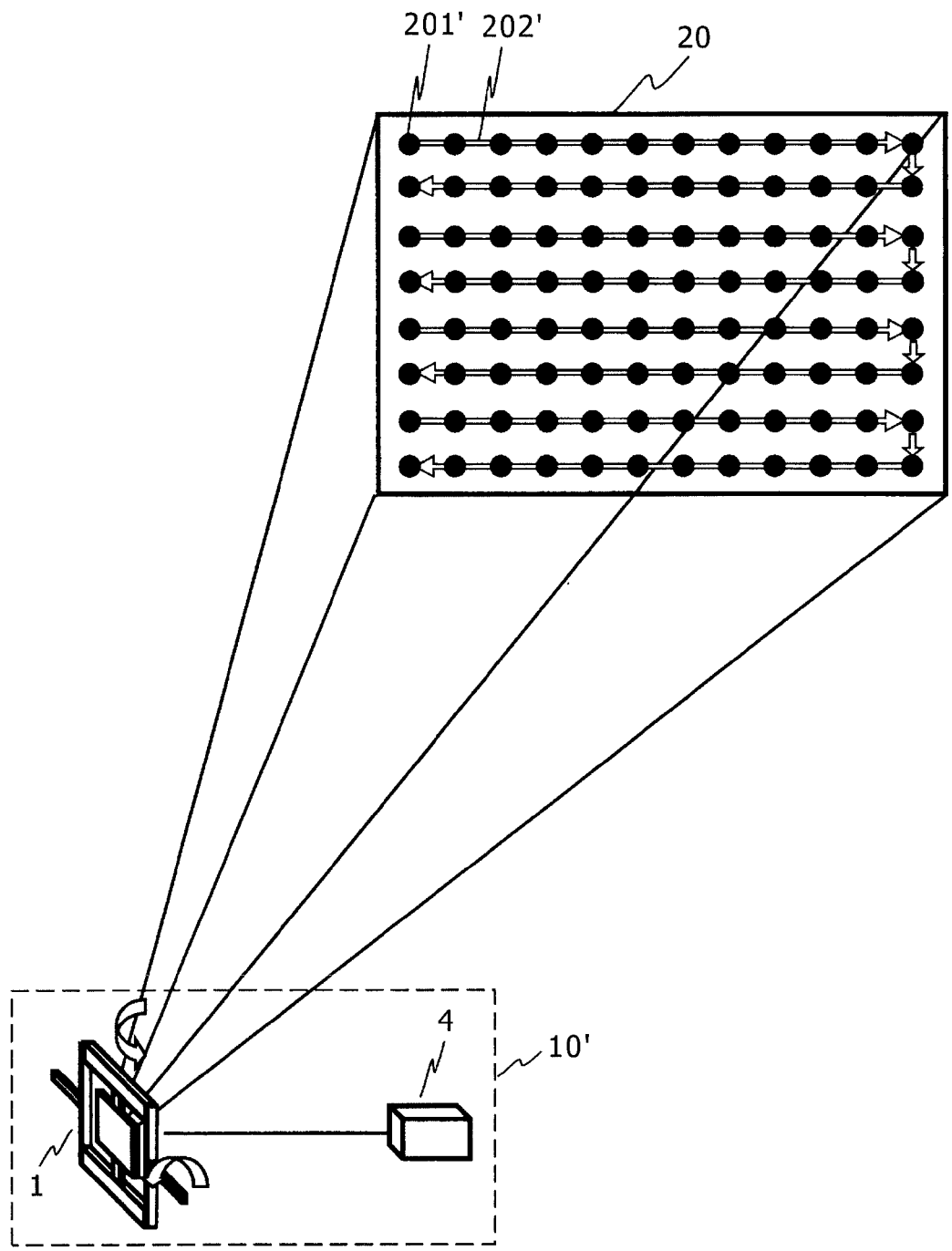
FIG. 59 is a system diagram illustrating a conventional image display device.

Hereinafter, for comparison with this embodiment, a conventional art will be first described. FIG. 59 is a system diagram illustrating a conventional image display device.

An optical scanning unit 1 in an image display device 10' scans an image plane (screen) 20 with a laser beam from a light source 4 while being reflected by a reflective mirror having a rotating shaft. Respective pixels 201' are two-dimensionally scanned along a scanning locus 202'.

Figure 60:
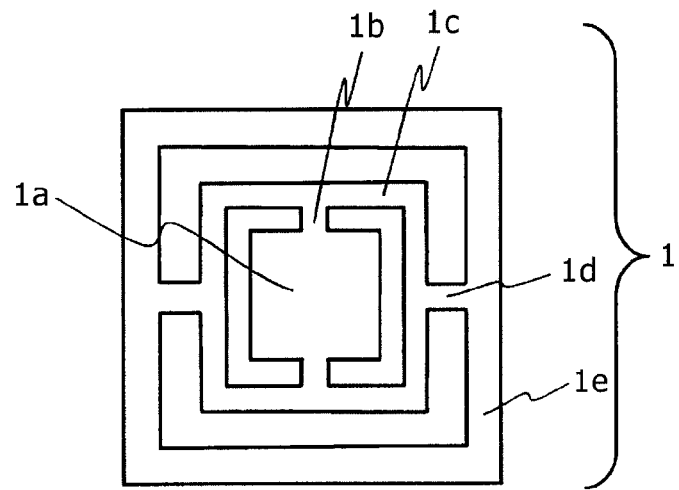
FIG. 60 is an enlarged diagram of an optical scanning unit.

FIG. 60 is an enlarged diagram of the optical scanning unit. The optical scanning unit 1 includes a mirror 1a that deflects the laser beam at a reflection angle, a first torsion spring 1b that is coupled to the mirror 1a, a retention member 1c that is coupled to the first torsion spring 1b, a second torsion spring 1d that is coupled to the retention member 1c, and a permanent magnet and a coil not shown.

The coil is formed substantially in parallel to the mirror 1a, and when the mirror 1a is in a static state, a magnetic field substantially parallel to the mirror 1a is generated. When a current flows in the coil, a Lorentz force substantially perpendicular to the mirror 1a is generated according to the Fleming's left-hand rule.

The mirror 1a is rotated to a position at which the Lorentz force matches with a restorative force of the torsion springs 1b and 1d. An AC current is supplied to the coil at a resonance frequency of the mirror 1a whereby the mirror 1a conducts resonant operation, and the torsion spring 1b rotates. Also, the AC current is supplied to the coil at the resonance frequency combining the mirror 1a and the retention member 1c, whereby the mirror 1a, the torsion spring 1b, and the retention member 1c conduct the resonant operation, and the torsion spring 1d rotates. In this way, the resonant operation caused by different resonance frequencies is realized in the two directions. Instead of the resonant operation using the resonance frequency, not the resonant operation but sinusoidal drive may be applied.

Figure 61:
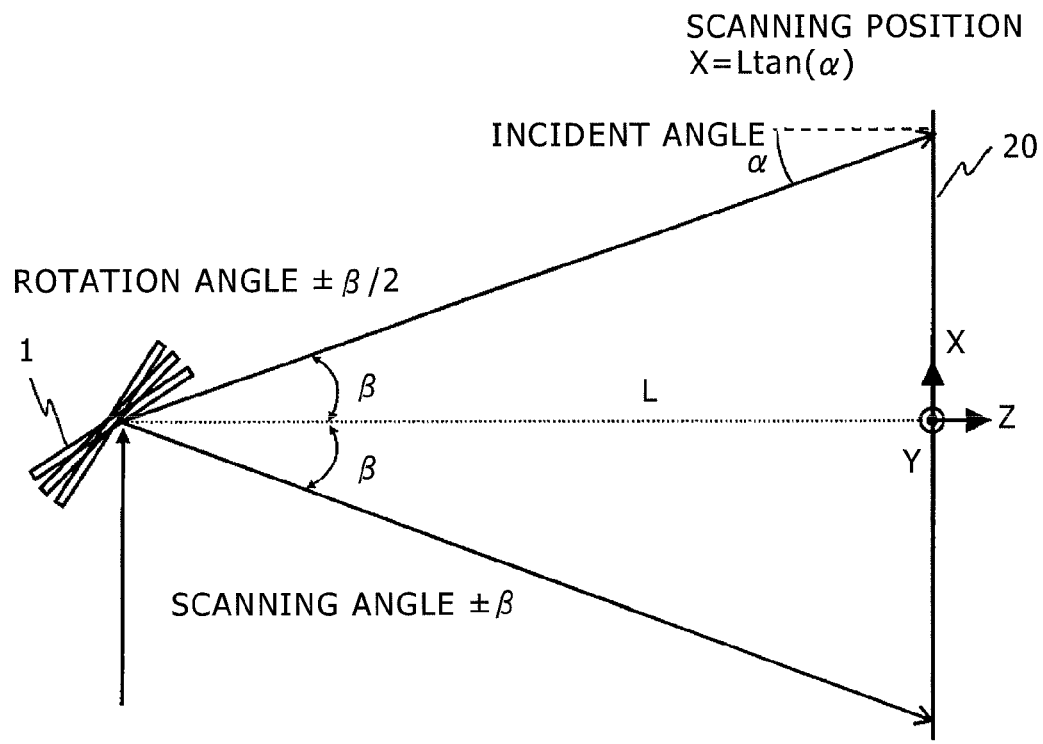
FIG. 61 is a diagram of a relationship between a rotation angle and a scanning position in a conventional art.

FIG. 61 is a relationship diagram of a rotation angle and a scanning position in a conventional art. If it is assumed that the rotation angle of the optical scanning unit 1 is β/2, a scanning angle which is an angle of the reflected optical beam is β. In this example, if no optical element is arranged between the optical scanning unit 1 and an image plane 20, the scanning angle β is equal to an incident angle α on the image plane 20. Therefore, a size of the scanned image relative to a certain projector distance is determined according to the rotation angle β/2.

Figure 62:
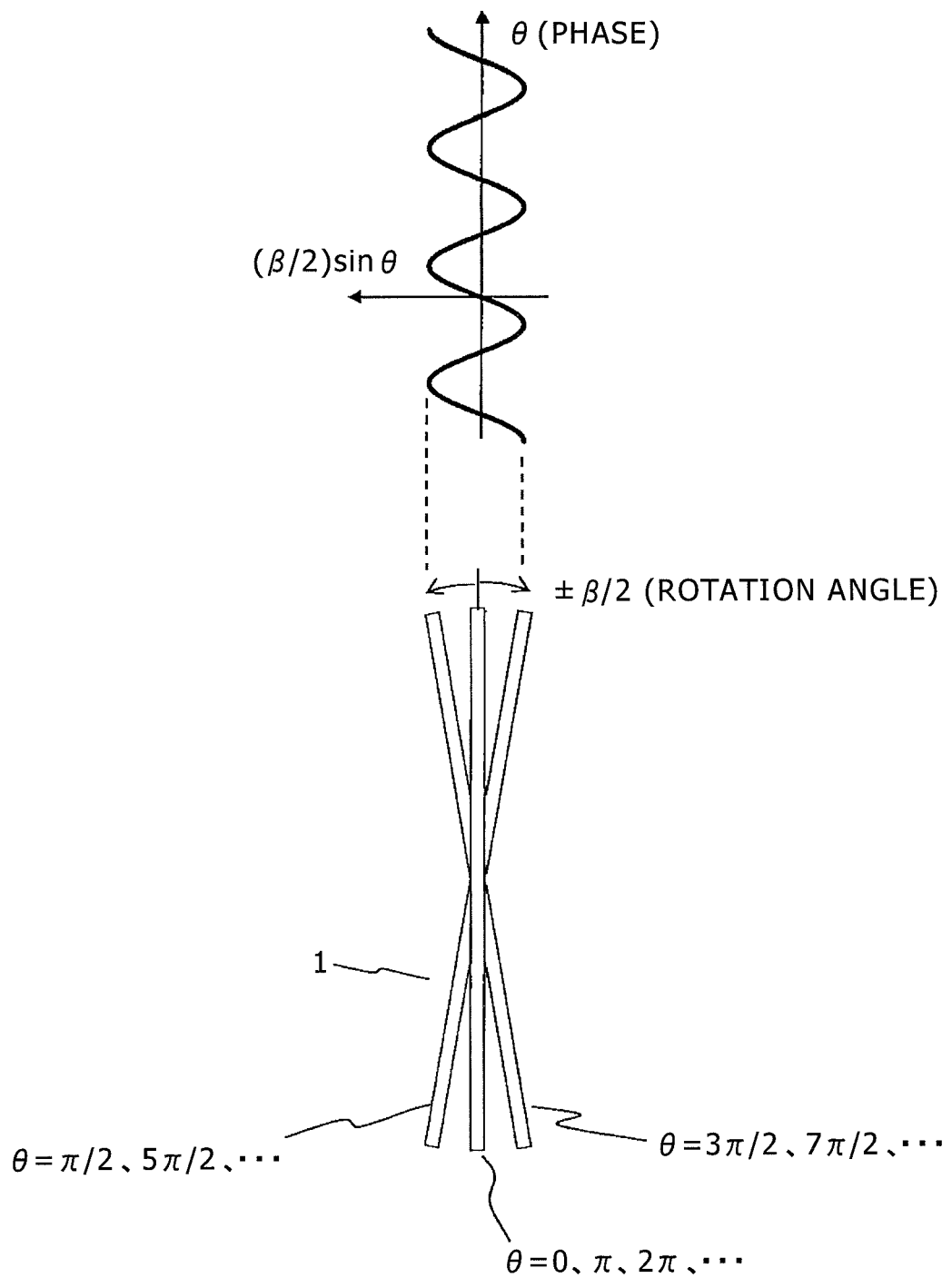
FIG. 62 is a diagram of a change in an oscillation angle by a phase in the conventional art.

FIG. 62 is a diagram of a change in an oscillation angle of a mirror surface in the conventional art. An oscillation angle θ is changed into a sinusoidal wave within a range of ±β/2.

Figure 63:
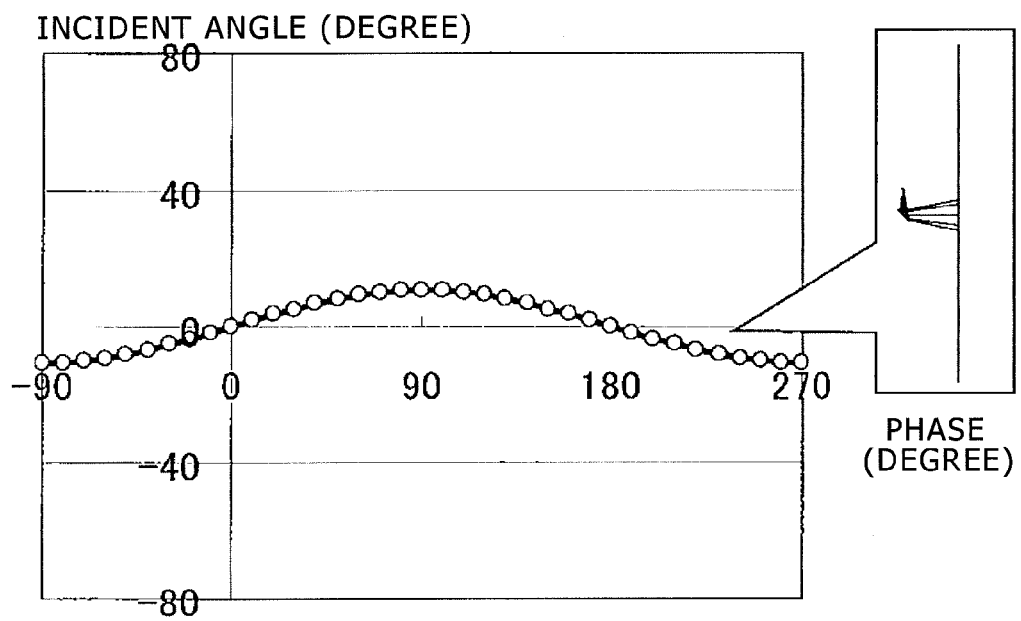
FIG. 63 is a diagram illustrating a relationship between an incident angle and a phase of the optical beam on the image plane in the conventional art.
Figure 64:
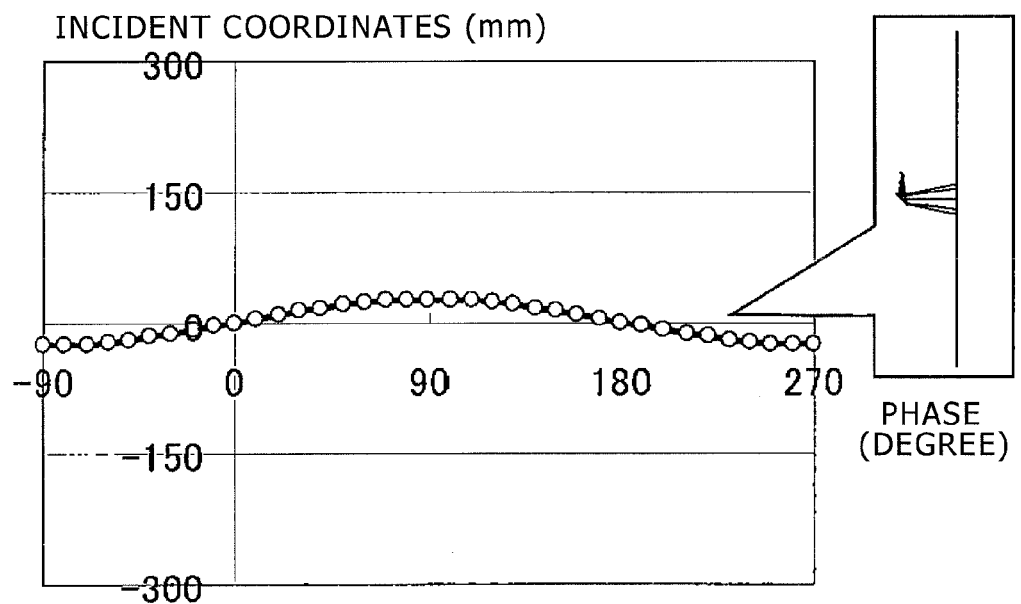
FIG. 64 is a diagram illustrating a relationship between incident coordinates and a phase of the optical beam on the image plane in the conventional art.

FIG. 63 is a diagram illustrating a relationship between the incident angle and a phase of the optical beam on the image plane in the conventional art. FIG. 64 is a diagram illustrating a relationship between incident coordinates and the phase of the optical beam on the image plane in the conventional art. FIG. 63 illustrates the sinusoidal wave shape similar to that of FIG. 64.

Those figures show an example using the optical scanning unit 1 with the rotation angle of ±5.3 degrees. That is, the scanning angle becomes ±10.6 degrees, and the incident angle on the image plane also becomes ±10.6 degrees.

As the drive system of the optical scanning unit 1, there is a galvanometer mirror producing a rotation angle change of a saw-tooth wave shape except for a resonant mirror producing a rotation angle change of the sinusoidal wave. The resonant mirror large in drive frequency is proper for high-resolution image display.

In this example, in two-dimensional scanning corresponding to scanning lines of a television, scanning is conducted in a horizontal direction by the number of pixels in a vertical direction while scanning for one reciprocation is being conducted in the vertical direction. In this way, scanning for one scanning line is conducted. For example, in order to conduct a display of 800 pixels in the horizontal direction and 600 pixels in the vertical direction at a vertical frequency 60 Hz, 300 reciprocations are necessary, and driving at a high-speed frequency of 60×300=18000 Hz is required. Driving at higher frequency is required as display resolution (the number of pixels) is more increased.

FIG. 65 is a diagram illustrating a relationship between the display pixel and a horizontal scanning frequency (horizontal scan scanning number). The horizontal scanning frequency becomes 38.9 kHz in HD version of 1920 pixels in the horizontal direction and 1080 pixels in the vertical direction, which requires further speed-up.

On the other hand, in order to realize a large scanned image at a given projector distance, there is a need to increase the rotation angle of the optical scanning unit 1.

If the optical scanning unit 1 is driven at a larger rotation angle at a higher speed, a load of the torsion springs 1b and 1d of a mechanism part which is a movable portion is increased. Therefore, in the resonant mirror, it is difficult to realize the higher-speed frequency and the larger rotation angle at the same time.

Also, in the sinusoidal rotation of the optical scanning unit 1, fast and slow angle changes of the mirror 1a cyclically appear. When the image plane 20 is scanned with the laser beam by only the rotation, if the angle change of the mirror is fast, a change in the scanning position on the image plane is also fast, and if the angle change of the mirror is slow, a change in the scanning position on the image plane is also slow. Therefore, on the image plane, light and dark corresponding to the sinusoidal wave are generated on the image plane.

Likewise, when the laser beam is modulated at regular time intervals, pixels on the image plane are coarsely arranged if the angle change of the mirror 1a is fast, and pixels on the image plane are densely arranged if the angle change of the mirror 1a is slow, thereby resulting in a two-dimensional image having a linearity largely degraded.

If circuit processing that thins out the laser beam in portions where a pixel distribution is dense, and the sinusoidal wave shape is light, only the light and dark on the image plane can be improved, but the linearity of the two-dimensional image cannot be improved. As a result, a circuit scale is increased, and the amount of light is reduced. The linearity can be improved if the laser beam is modulated at timing of arrangement of the pixels on the image plane, but the circuit scale is more and more increased.

Under the circumstances, a technique using a plurality of reflecting surfaces apart from the mirror is also considered. However, when a shape error, and the eccentricity/inclination of optical components in manufacture occur, a fluctuation of the optical beam angle on the mirror is about twice as large as that on the lens surface which is a transmission surface. This makes it difficult to manufacture the optical system making great use of the mirrors. Further, in the optical system using a plurality of mirrors, in order to ensure the optical path before and after reflection of the laser beam by the mirrors, large intervals need to be provided before and after the mirrors. As a result, the overall optical system is upsized.

Also, in the case where the light source is a laser, because the generated light is a coherent light, when the light is reflected on a general image plane (coarse plane), a random phase is added to the light, and the reflected light becomes a scattering light. The lights scattered at places where the coarse plane is different overlap and interfere with each other by space propagation, to thereby generate a speckle which is a random interference pattern, as a result of which an image quality is degraded. Further, in the case where the light source is a semiconductor laser having a small light emission point, if an inside of a solid angle that connects the light source and pupils of an observer is irradiated with the laser beam having an energy exceeding an allowable value, there is a risk that his retinas are destroyed by fire. Therefore, the amount of light is restricted, and necessary brightness is not obtained.

First Embodiment

Figure 1:
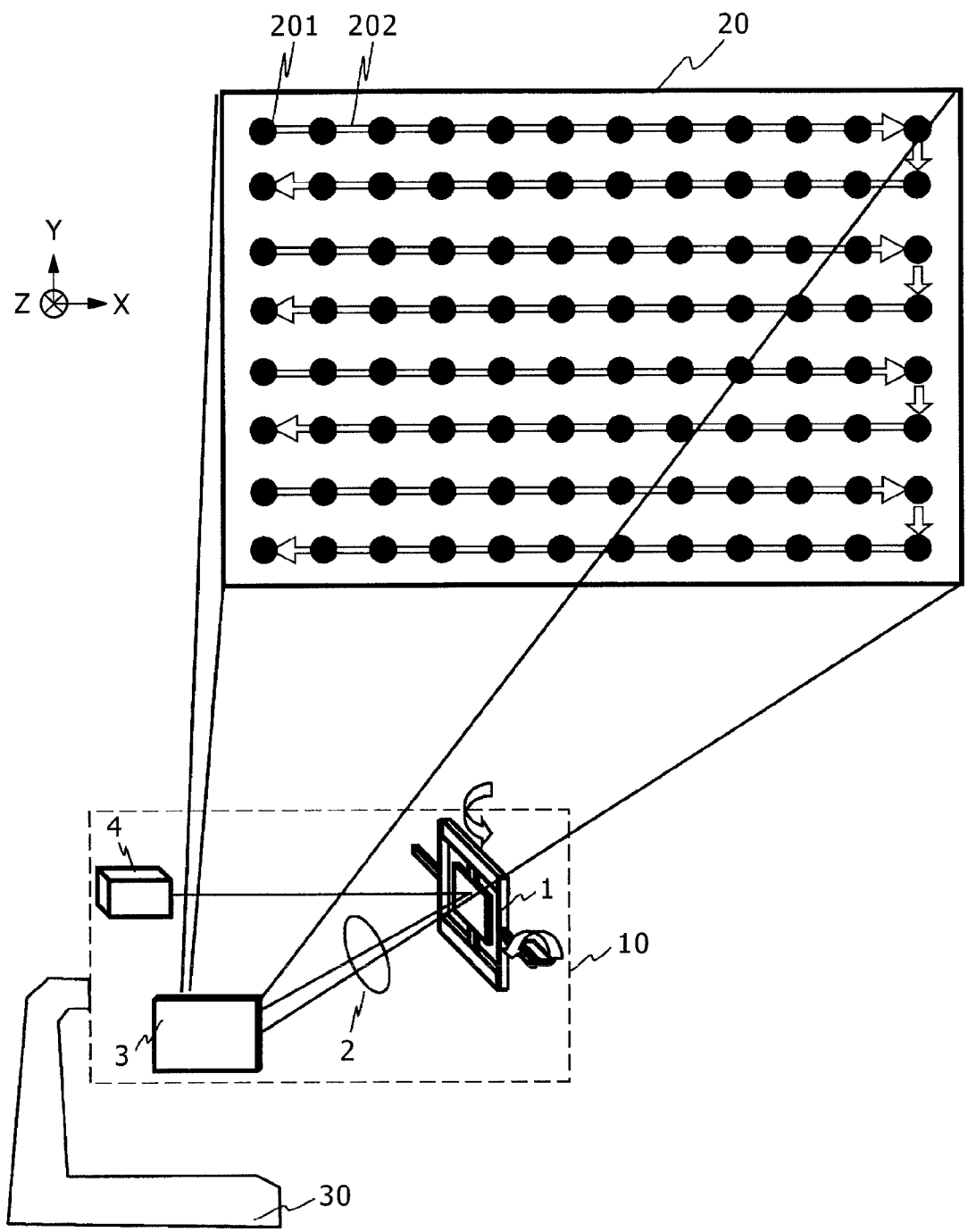
FIG. 1 is a system diagram illustrating an image display device.

Subsequently, embodiments will be described. A first embodiment will be described with reference to FIGS. 1 to 14. FIG. 1 is a system diagram illustrating an image display device. In this drawing, a direction from left to right on a paper plane is defined as an X-direction, a direction from bottom to top on the image plane 20 is defined as a Y-direction, and a direction from front to back on the paper plane is defined as a Z-direction. FIGS. 2, 34, 37, 59, and 61 also use the same coordinate system as that of FIG. 1. Drawings other the above drawings use a local coordinate system having an optical axis as the Z-direction.

The system includes an image display device 10, a structure 30 that holds the image display device 10, and the image plane 20. Also, the image display device 10 includes a light source 4, the optical scanning unit 1 that two-dimensionally deflects a laser beam from the light source 4, a free curved surface lens 2 that transmits and refracts the optical beam deflected by the optical scanning unit 1, and a free curved surface mirror 3 that reflects the optical beam from the free curved surface lens 2, and guides the optical beam to the image plane 20. The free curved surface mirror 3 includes a convex mirror. Those optical components are subjected to an improvement in the linearity, and the action of wider angle (which will be described later), and a two-dimensionally scanned image which is rectangular and uniform in light quantity distribution is displayed on the image plane 20.

The optical scanning unit 1 may realize the scanning in a long side direction and a short side direction by one reflecting surface (mirror 1a), or may have the respective reflecting surfaces in correspondence with the respective directions.

In this example, a shape having a rotational asymmetry and parameters illustrated in FIGS. 8, 19, and 25 is called "free curved surface".

Figure 2:
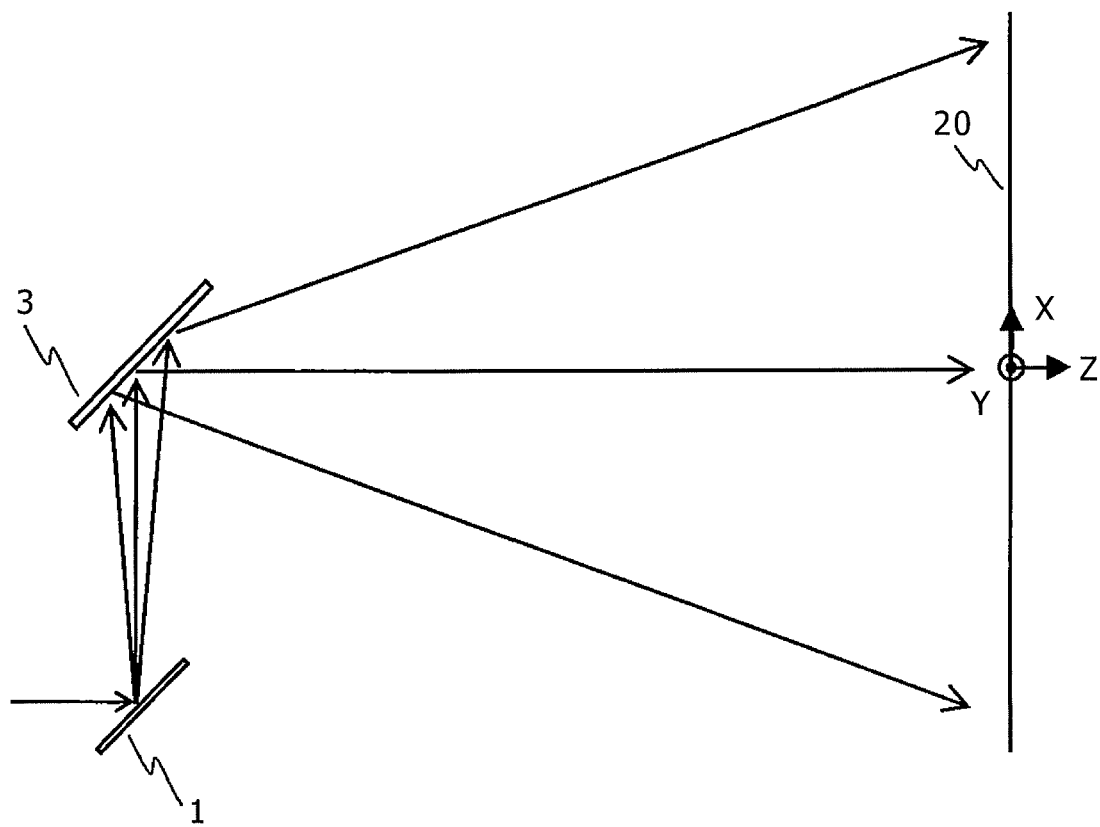
FIG. 2 is a top view illustrating the system of FIG. 1.

FIG. 2 is a top view illustrating the system of FIG. 1.

Hereinafter, because a side corresponding to the X-direction is longer than a side corresponding to the Y-direction in the image plane 20, the former is called "long side", and the latter is called "short side". Also, a direction larger in the deflection angle on the reflecting surface corresponds to the long side direction, and the smaller direction corresponds to the short side direction.

When the optical scanning unit 1 remains static in the center of a scanning range, the free curved surface mirror 3 is arranged so that a long side thereof becomes substantially in parallel to a first plane (XZ plane) defined by an incident optical beam and a reflected optical beam in the free curved surface mirror 3. The reason is because when the free curved surface mirror 3 is arranged obliquely to the optical beam of the long side larger in the amount of scanning, a coordinate range in which the optical beam scanned at a scan angle which is twice as large as a given rotation angle is reflected by the free curved surface mirror 3 becomes widened, and therefore a shape freedom of the free curved surface mirror 3 is increased.

Figure 3:
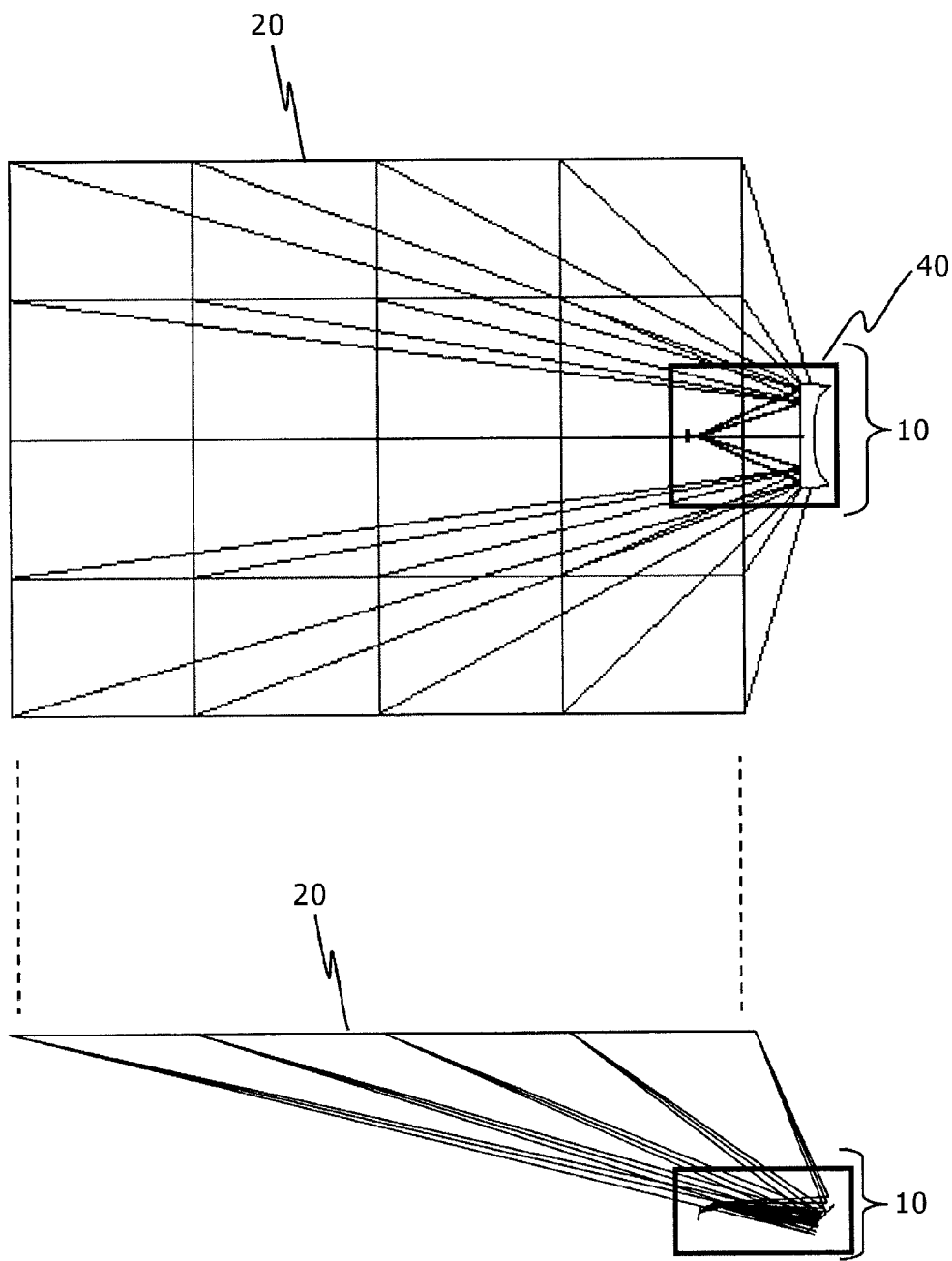
FIG. 3 is a diagram of one optical beam in a first embodiment.
Figure 4:
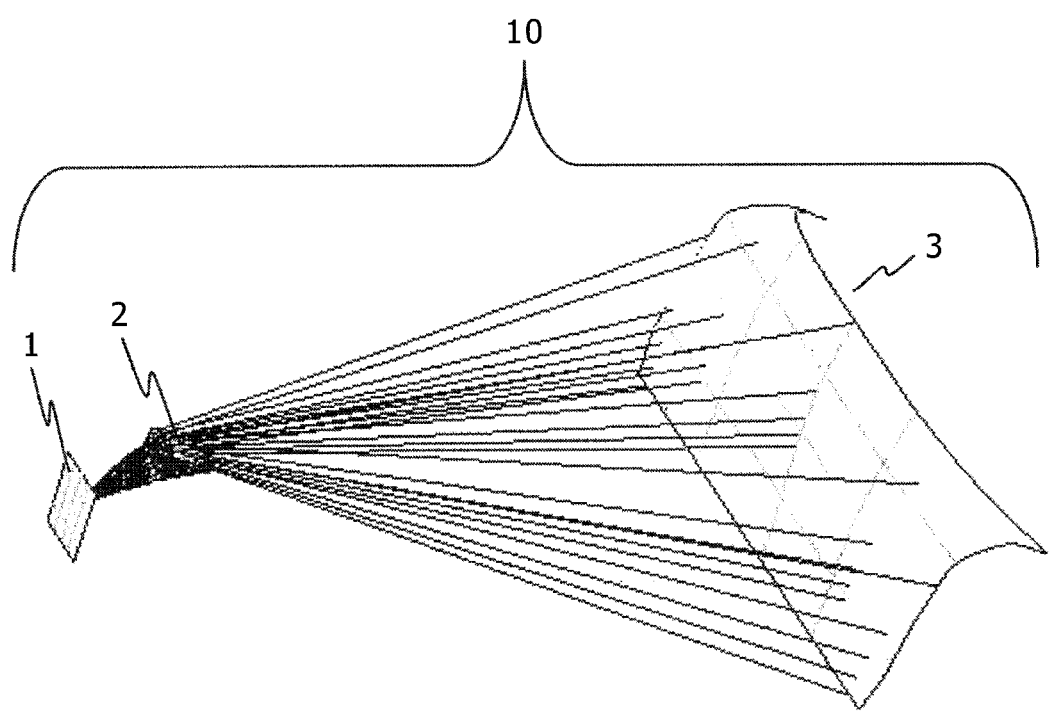
FIG. 4 is a diagram of another optical beam in the first embodiment.
Figure 5:
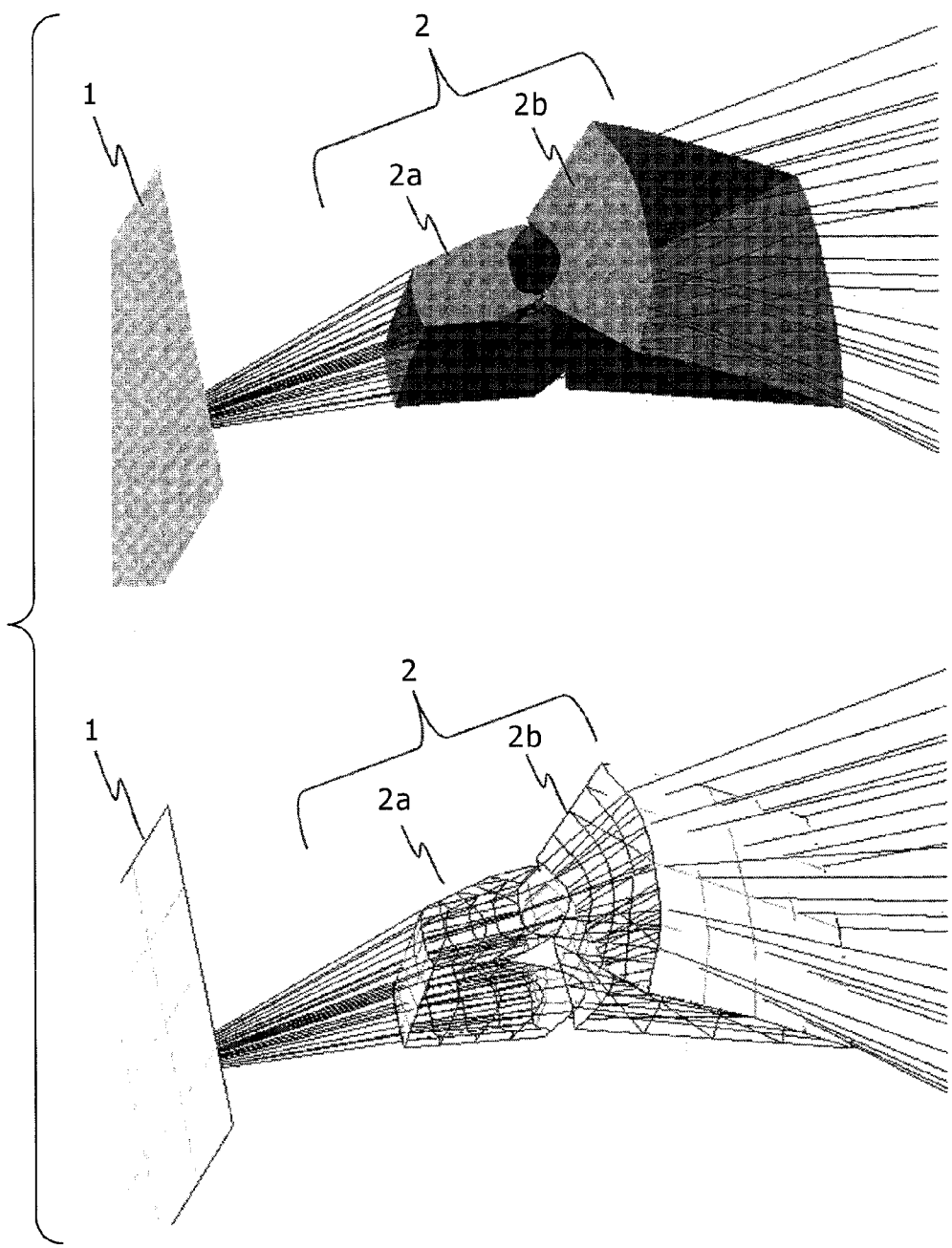
FIG. 5 is a diagram illustrating the detail of a free curved surface lens according to the first embodiment.

FIG. 3 is one diagram of the optical beam in which the optical beam emitted from the image display device 10 arrives at 5×5 division points on the image plane 20. FIG. 4 is another diagram of the optical beam in which after the optical beam emitted from the light source 4 is deflected by the rotation of the optical scanning unit 1, the optical beam arrives at the image plane 20 through the free curved surface lens 2 and the free curved surface mirror 3. Further, FIG. 5 is a diagram of the detail of the free curved surface lens 2, which is configured by a first free curved surface lens 2a and a second free curved surface lens 2b.

A portion of the second free curved surface lens 2b through which the laser beam corresponding to the long side direction of the scanning screen passes is longer in physical length than a portion through which the laser beam corresponding to the short side direction passes. Further, a portion of the free curved surface mirror 3 on which the laser beam corresponding to the long side direction of the scanning screen is reflected is stronger in convex shape toward the scanning screen than a portion on which the laser beam corresponding to the short side direction is reflected. FIGS. 4 and 5 illustrate the optical beams in an orientation from which the shape of the optical elements is more easily understood.

Figure 6:
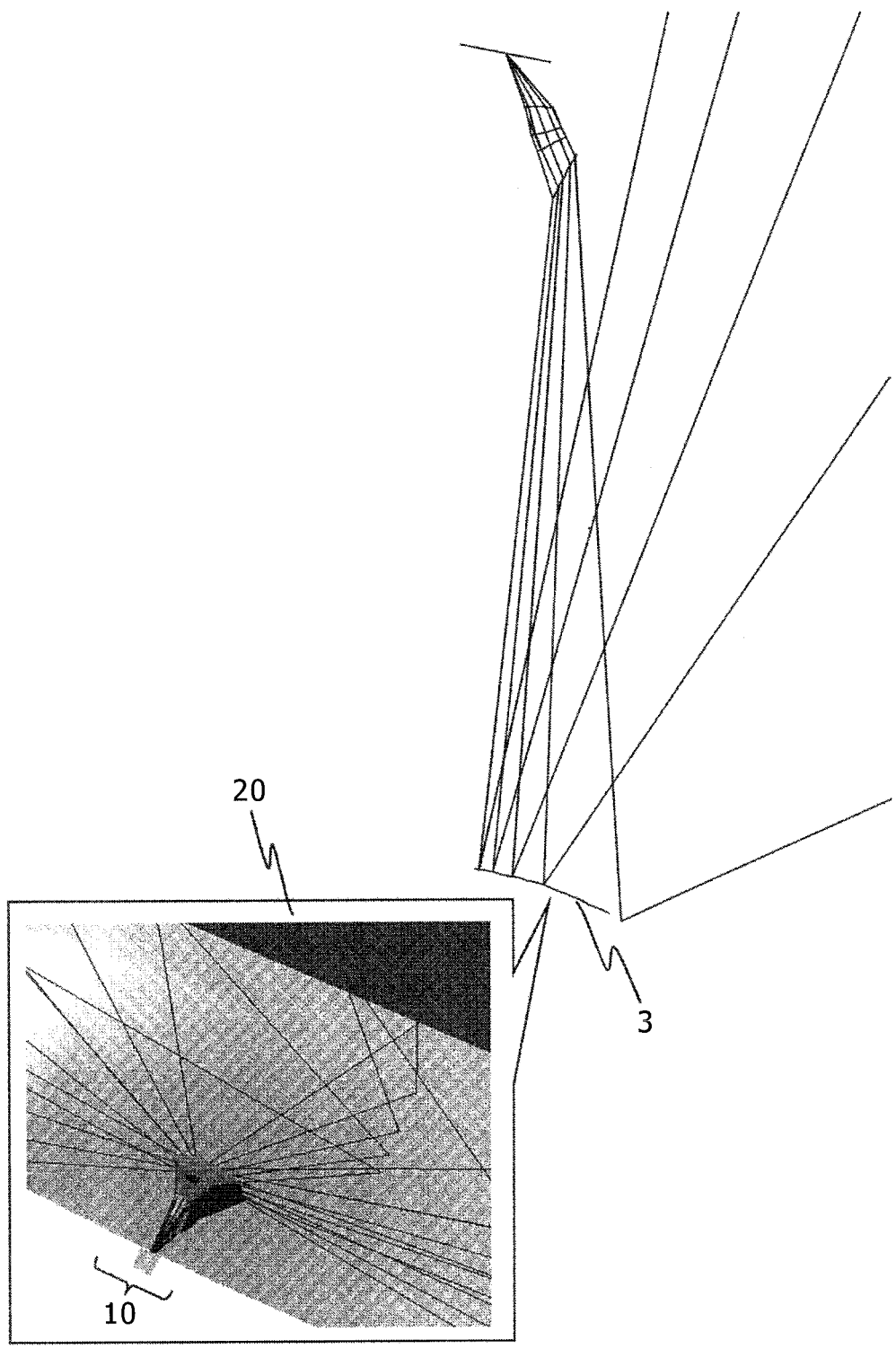
FIG. 6 is a diagram of a three-dimensional optical beam in the first embodiment.

FIG. 6 is a diagram of the three-dimensional optical beam. In FIG. 3, a phenomenon in which the free curved surface lens 2 is not irradiated with the optical beam reflected by the free curved surface mirror 3 is difficult to understand. Therefore, in FIG. 6, it is understood that no optical paths interfere with each other.

Figure 9:
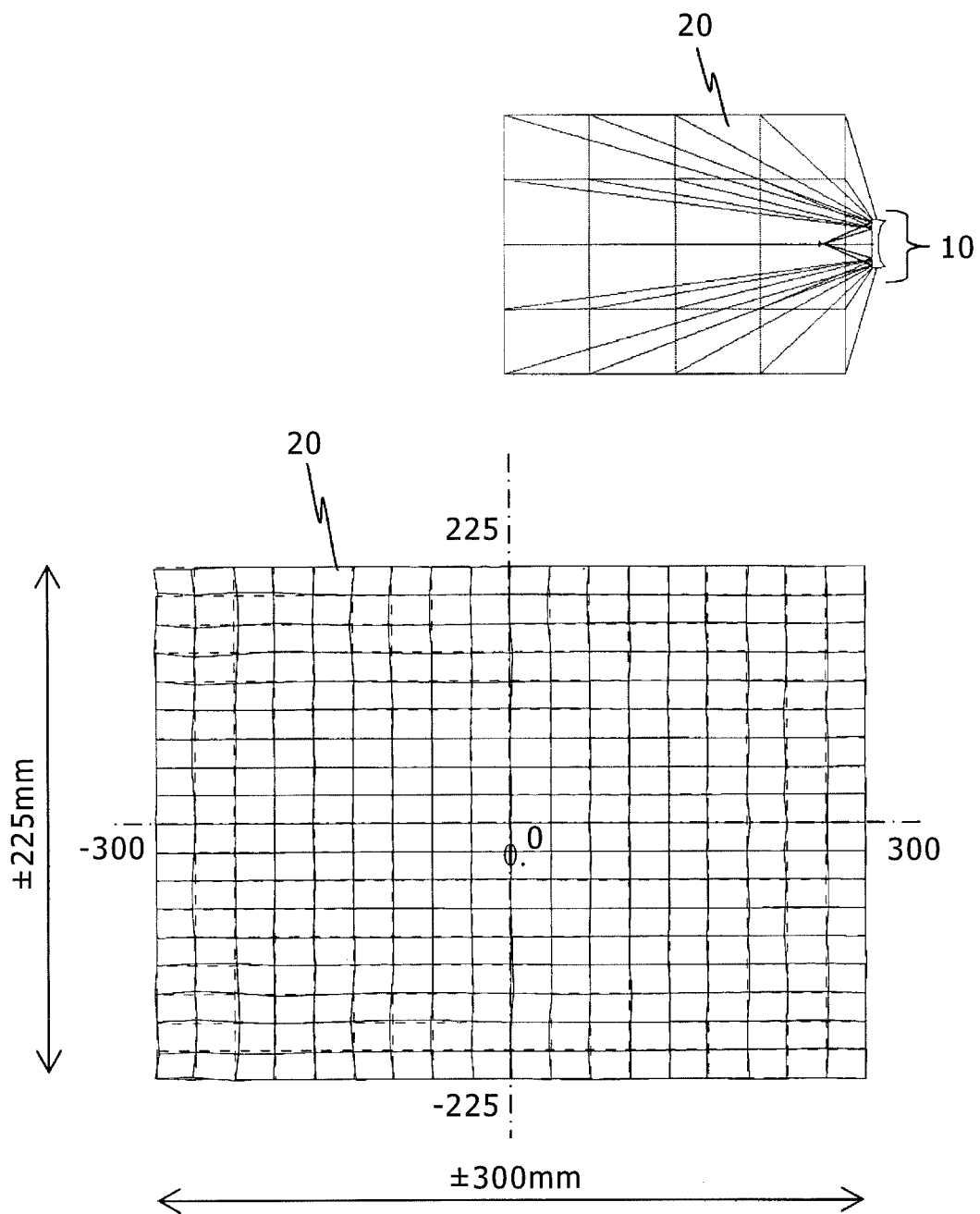
FIG. 9 is a diagram illustrating a distortion performance according to the first embodiment.

FIG. 7 is a diagram illustrating lens data of an MEMS (micro electro mechanical systems) mirror (resonance rotation ±5.3 degrees horizontally and ±2.9 degrees vertically), the free curved surface lens, and the free curved mirror as the optical scanning unit 1 from the light source 4 which is a 0-th surface. FIG. 8 is a diagram illustrating a mathematical expression of the free curved surface coefficient of the free curved surface configuration, and specific values. FIG. 9 is a diagram illustrating a distortion performance. FIG. 9 is a diagram of a distortion performance. Those figures illustrate coordinates at which the optical beam having the scan angle by the optical scanning unit 1 of the rotation angle ±5.3 degrees in the long side direction (main scanning direction) and the rotation angle ±2.9 degrees in the short side direction (sub-scanning direction) arrives at the image plane 20 at every 10 degrees of a phase, and results obtained by evaluating the scanning range by division of 19×19 in detail.

Because the projector distance from the free curved surface mirror 3 illustrated in FIG. 7 is 100 mm, and the scanning range is 600×450 mm on the image plane 20, an appearance in which the wider angle is realized is understood.

Subsequently, an improvement in the linearity and the results of the wider angle will be described on the basis of the incident angle and the incident coordinates on the image plane with reference to FIGS. 10 to 14, 63, and 64.

In FIGS. 63 and 64 illustrating a conventional example, none of the free curved surface lens 2 and the free curved surface mirror 3 is present. The incident angle is changed into a sinusoidal wave shape in a range of ±10.6 degrees which is a value twice as large as 5.3 degrees, and the incident coordinates are also changed into a sinusoidal wave shape in a range of ±26.6 mm.

Figure 10:
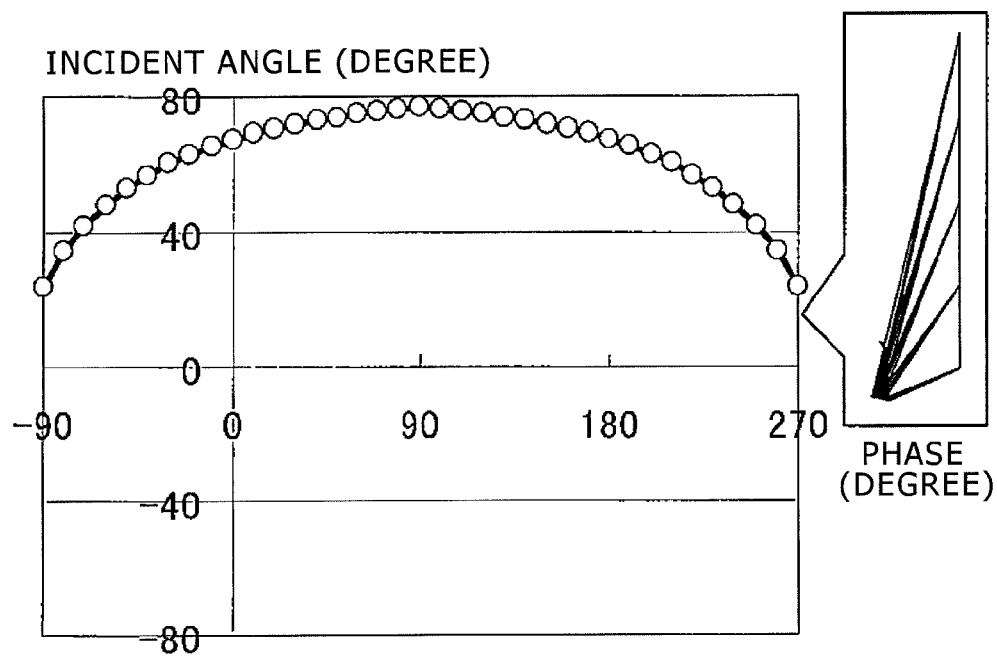
FIG. 10 is a diagram illustrating a relationship between an incident angle and a phase of the optical beam on the image plane according to the first embodiment.
Figure 11:
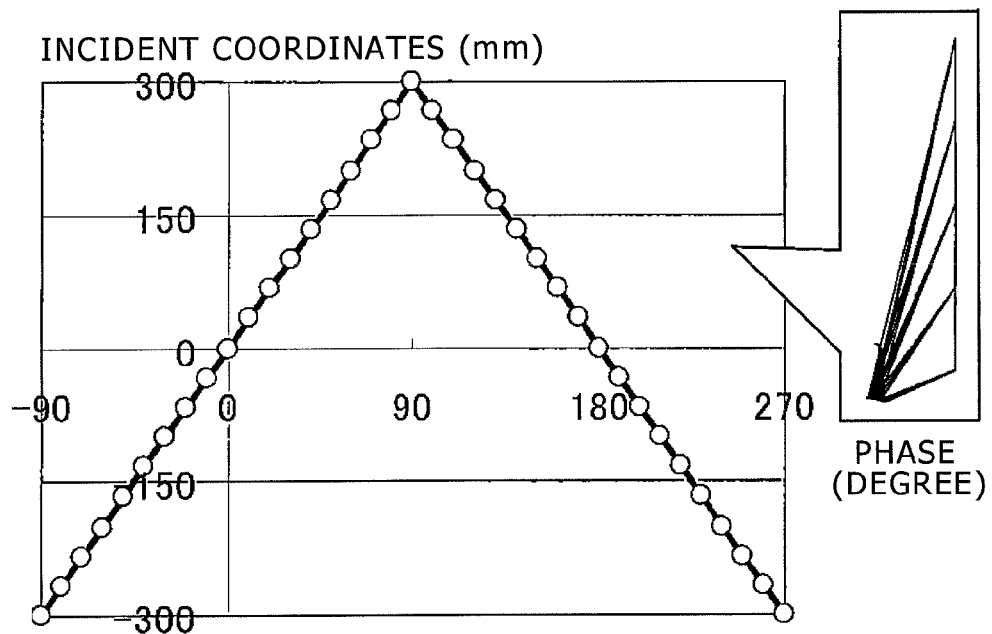
FIG. 11 is a diagram illustrating a relationship between an incident angle and a phase of the optical beam on the image plane according to the first embodiment.

On the other hand, in the first embodiment, FIG. 10 is a diagram illustrating a relationship between the incident angle and the phase of the optical beam on the image plane, and FIG. 11 is a diagram illustrating a relationship between the incident coordinates and the phase of the optical beam on the image plane according to the first embodiment. The incident angle is largely changed by the action of the free curved surface lens 2 and the free curved surface mirror 3 to realize the incident coordinates of a chopping wave shape on the image plane 20 in a range of ±300 mm. That is, the scanning range is ±26.6 mm in the conventional system whereas the scanning range is ±300 mm in the first embodiment to realize a remarkably wider angle of 10 times or more. Also, when it is assumed that a horizontal size corresponding to the long side is X, and the projector distance is L, since X=600 mm and L=100 mm are satisfied, to thereby realize L/X which is a small value, that is, 0.17.

The projector distance is defined by a length of a vertical line which lowers from a reference position defining an arrangement position of the free curved surface mirror on lens data toward the image plane. In an intended purpose giving priority to the downsizing of the image display device, a value of L/X may be increased without exceeding 1.

For comparison, in the above Patent document 1, if a value of L/X is calculated on the disclosure that the shape is symmetric in a horizontal direction, and the angle of view is ±18.9 degrees, a large value such as L/X=1/2/tan 18.9=1.46 is obtained, and the wider angle is insufficient.

Subsequently, the features of the free curved surface lens 2 and the free curved surface mirror 3 will be described with reference to FIGS. 12 to 14.

Figure 12:
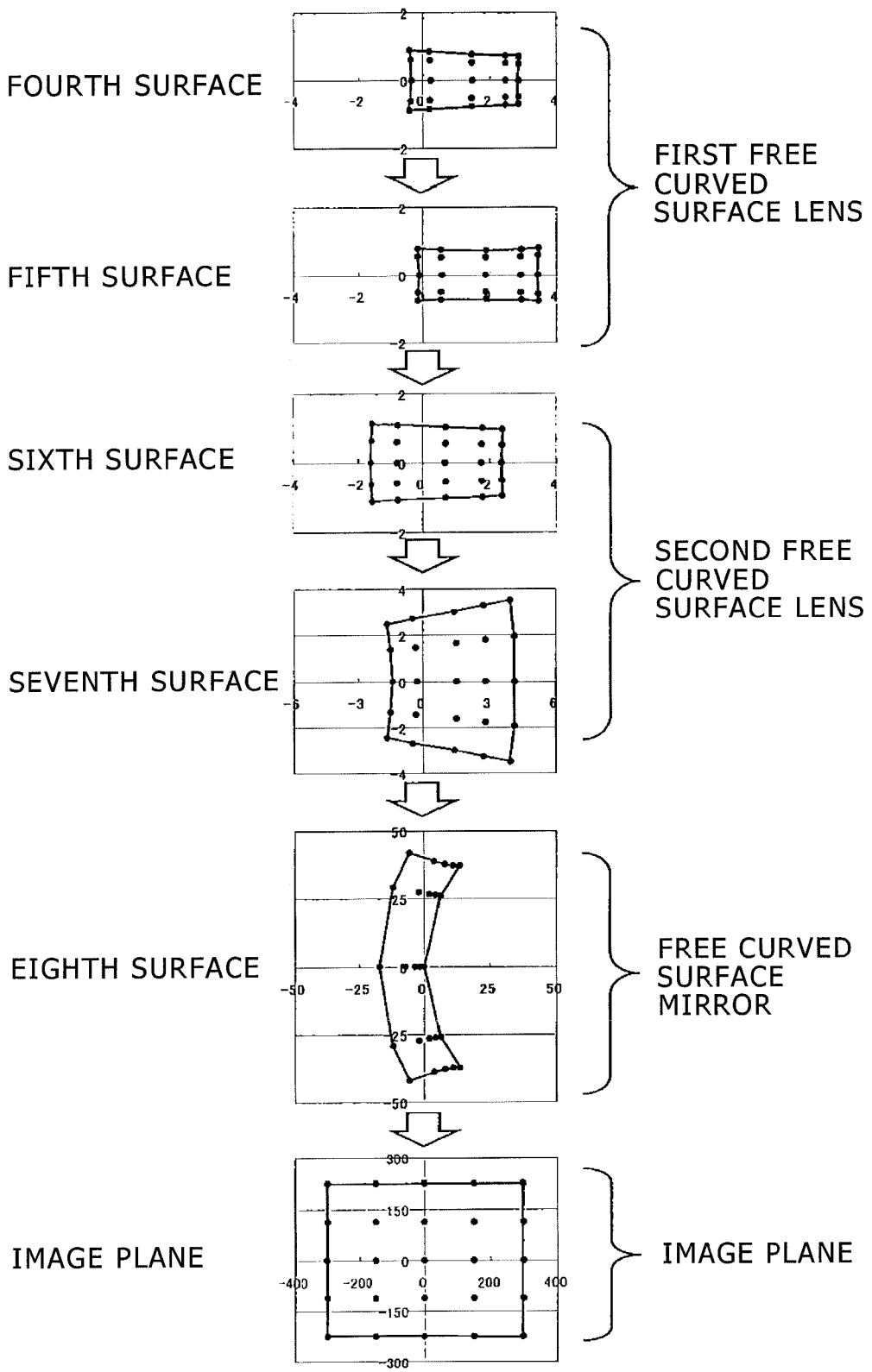
FIG. 12 is a diagram illustrating an area of the optical beam in which coordinates of a main optical beam are present.

FIG. 12 illustrates a range of the optical beam where the coordinates of a main optical beam is present as the control results of the optical beam by the free curved surface lens 2 and the free curved surface mirror 3. Since the long side direction of the optical scanning unit 1 is larger than the short side direction thereof, a range of the main optical beam on a fourth surface which is the incident surface of the first free curved surface lens 2a is a horizontal long area.

It is found that the range of the main optical beam is changed into the horizontal long area every time the main optical beam sequentially passes through an output surface of the first free curved surface lens 2a and the second free curved surface lens 2b.

The horizontal long area is formed in an eighth surface which is the free curved surface mirror 3, but the long side direction (lateral direction of FIG. 12) is not extremely narrowed in the eighth surface, and a vertical size in the eighth surface is increased as the degree of freedom. The reason will be described with reference to FIG. 13.

Figure 13:
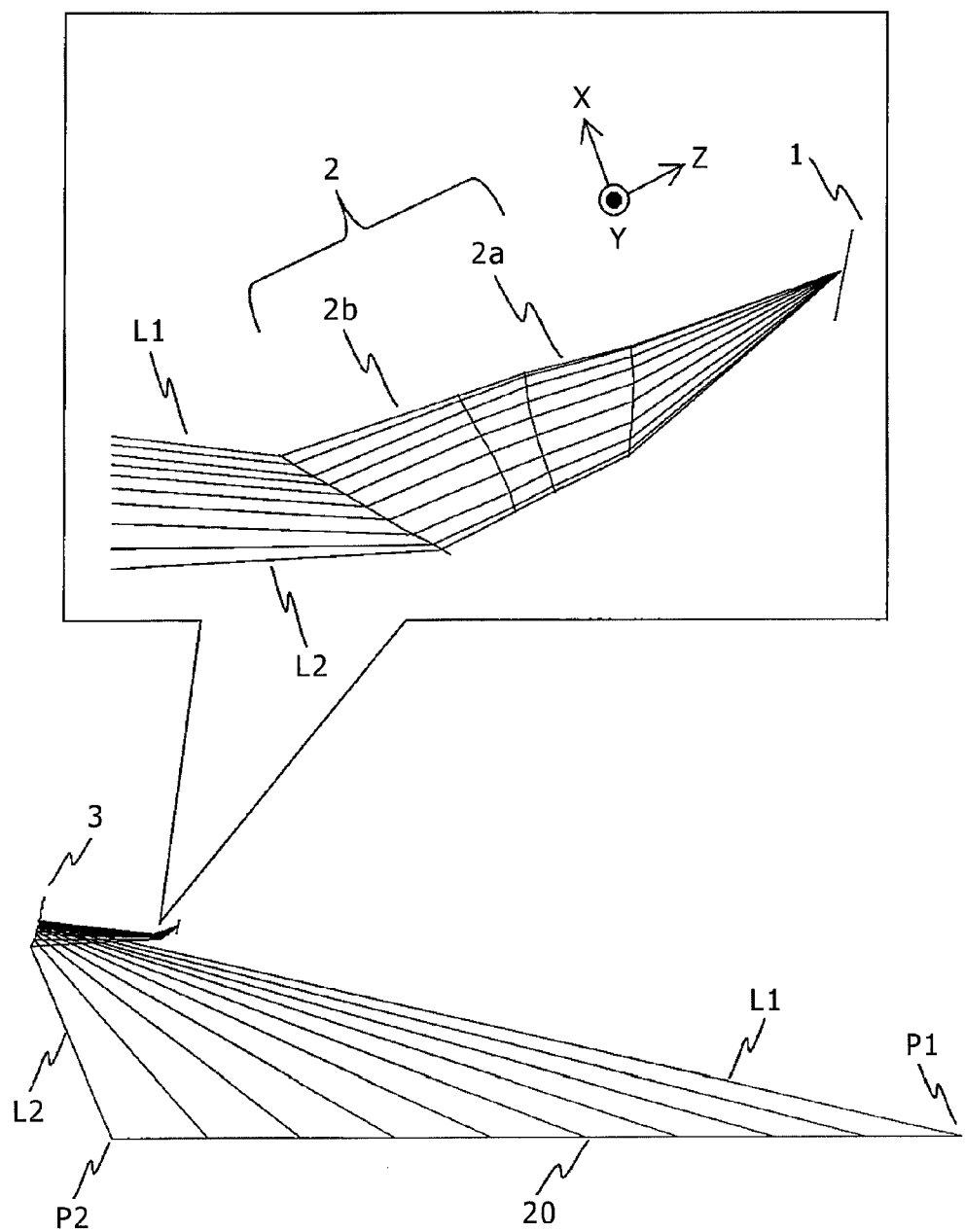
FIG. 13 is a diagram of an optical beam in a cross-section in a long side direction.

FIG. 13 is a diagram of an optical beam in a cross-section in the long side direction, which is a diagram illustrating an optical beam diagram of the overall optical system and an enlarged diagram of the free curved surface lens 2 together. With the rotation of the optical scanning unit 1, an optical beam L1 that passes through a positive side of the X-axis in FIG. 13 is reflected by the free curved surface mirror 3, and arrives at coordinates P1 on the image plane 20. On the other hand, an optical beam L2 that passes through a negative side of the X-axis is reflected by the free curved surface mirror 3, and arrives at coordinates P2 on the image plane 20. In this example, it is necessary that the optical paths of the optical beam L2 that passes through the second free curved surface lens 2b and the optical beam L1 that is reflected by the free curved surface mirror 3 do not interfere with each other on the second free curved surface lens 2b. In order to achieve this configuration, it is necessary that a width formed by the optical beam L1 and the optical beam L2 on the free curved surface mirror 3 is small. This is a reason that the size of an optical beam passage range in the horizontal direction in the free curved surface mirror 3 is small.

Also, in FIG. 13, an optical path length of the optical beam L1 from the reflection on the free curved surface mirror 3 to the image plane is larger than the optical path length of the optical beam L2. Therefore, in order to improve the linearity, it is necessary that the optical path length of the optical beam L1 is made shorter than the optical path length of the optical beam L2 in the free curved surface lens 2 and the free curved surface mirror 3.

Under the circumstances, thickening the lens thickness on a side through which the optical beam L1 passes, that is, "artificial prism" is necessary for making the optical path length of the optical beam L1 that passes through the free curved surface lens 2 in air conversion smaller than a value of the optical beam L2.

In the optical system of this embodiment, it is desirable to reduce a difference of the optical path length in the overall optical path by satisfying L1<L2 on an object side with respect to L1>L2 on an enlarged side because of not a mapping relationship but conceptually wide conversion.

On the other hand, in the case where the lens shape of the free curved surface lens 2 is configured in a prism fashion, a lens material is dispersed (refractive index is different depending on a wavelength of the light). That is, a reaching distance on the image plane 20 is different for each of the wavelengths of the light, and a chromatic aberration of the magnification is generated.

In order to reduce the chromatic aberration, the optical path length of the optical beam L1 that passes through the free curved surface lens 2 in air conversion may be made smaller than the optical path length of the optical beam L2 in the air conversion. Then, if a ratio of a lens thickness on a side through which the optical beam L1 passes and a lens thickness on a side through which the optical beam L2 passes is set to three times or lower, it is found that the chromatic aberration can be reduced to the magnification chromatic aberration on the level of no problem in practical use through simulation. If the chromatic aberration is set to twice or lower, a further excellent imaging performance can be obtained.

In this way, the chromatic aberration can be sufficiently reduced by optimizing the shape of the free curved surface mirror 3 large in the degree of freedom of design, and optimizing (power distributing) the shape of the free curved surface lens 2.

Subsequently, the features in the short side direction will be described with reference to FIG. 14 which is a diagram of sag quantities of the respective optical elements in the short side direction. FIG. 14 is a diagram illustrating the shapes of the free curved surface lens and mirror in the short side direction.

Figure 14:
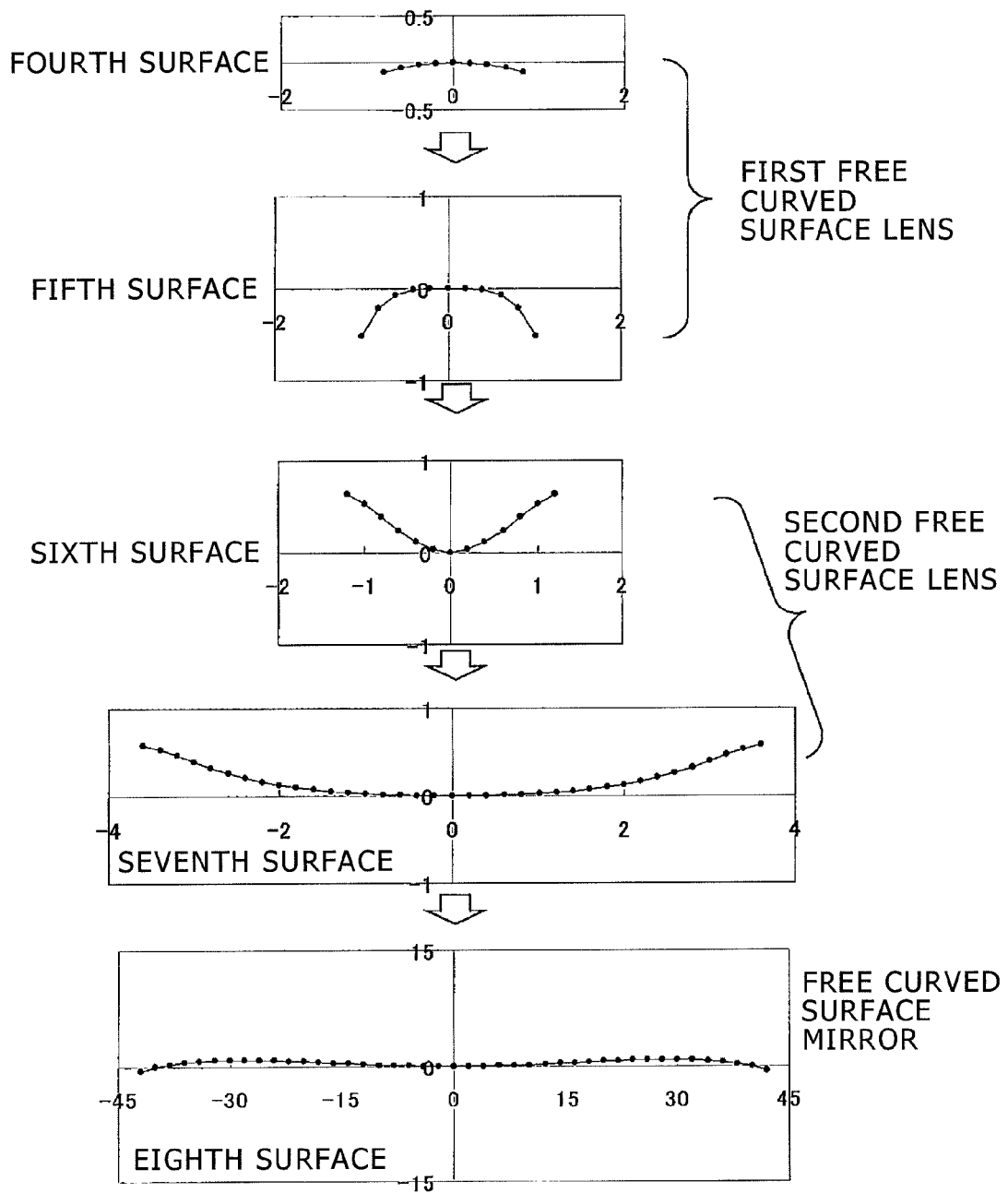
FIG. 14 is a diagram illustrating shapes of a free curved surface lens and a mirror in a short side direction.

Referring to FIG. 14, the first free curved surface lens 2a and the second free curved surface lens 2b in the short side direction each have a negative refractive power in a concave lens shape. The free curved surface mirror 3 has a positive refractive power in a center portion of a concave surface, and a negative refractive power in a peripheral portion of a convex surface. Because of the above configuration, the lens data in the first embodiment is arranged plane-symmetrically in the short side direction. However, the condition of the plane symmetry, that is, the arrangement relationship is changed to change a portion of a positive refractive power and a portion of a negative refractive power. Therefore, the portion of the positive refractive power and the portion of the negative refractive power are present in the free curved surface mirror 3.

As described above, when the free curved surface lens 2 and the free curved surface mirror 3 are arranged under a given condition, there is no need to increase the rotation angle of the MEMS mirror as the optical scanning unit 1, and the wider angle of 10 times or more and an improvement in the linearity can be realized without damaging the mechanical reliability of the MEMS mirror.

Second Embodiment

Figure 15:
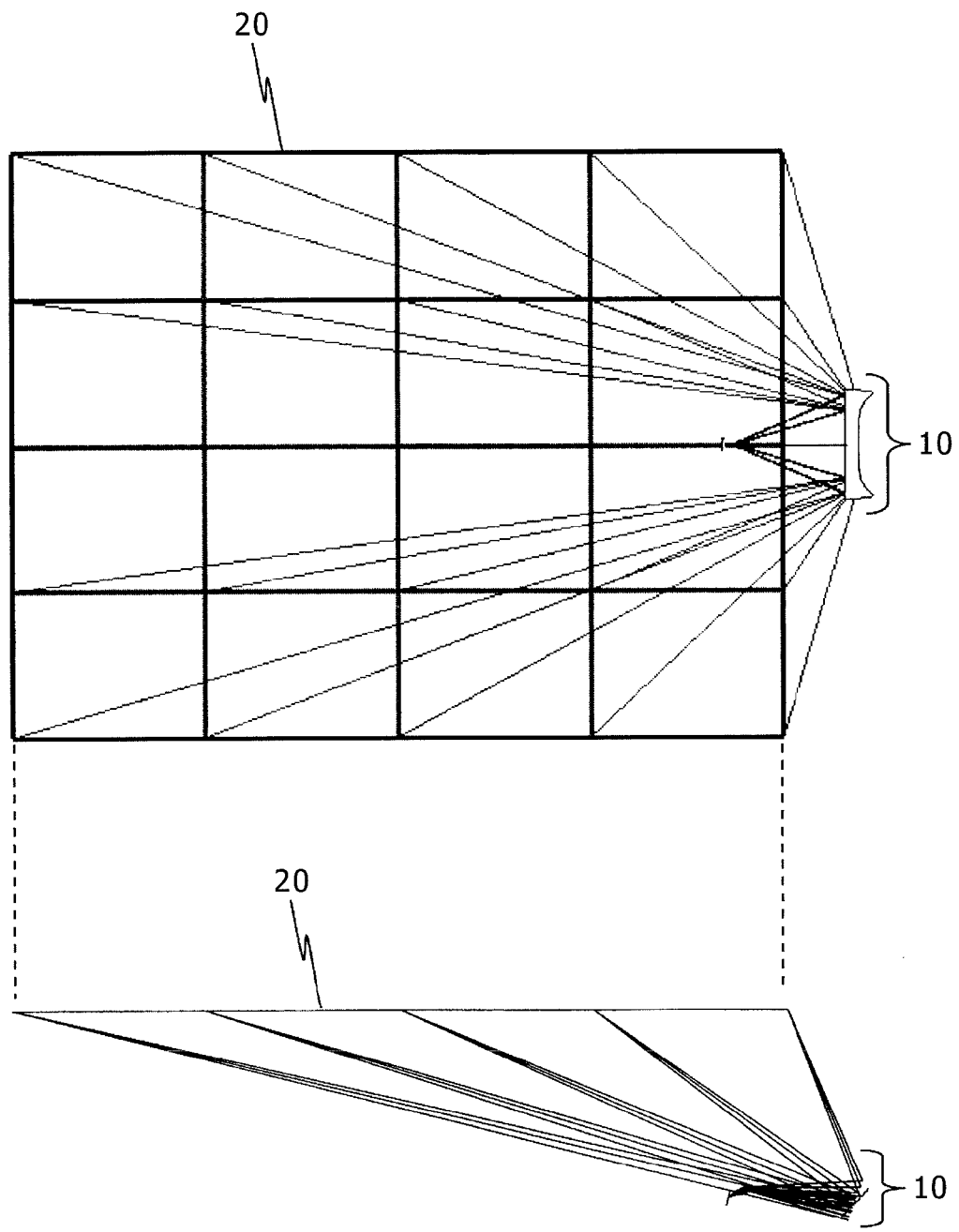
FIG. 15 is a diagram of one optical beam according to a second embodiment.
Figure 16:
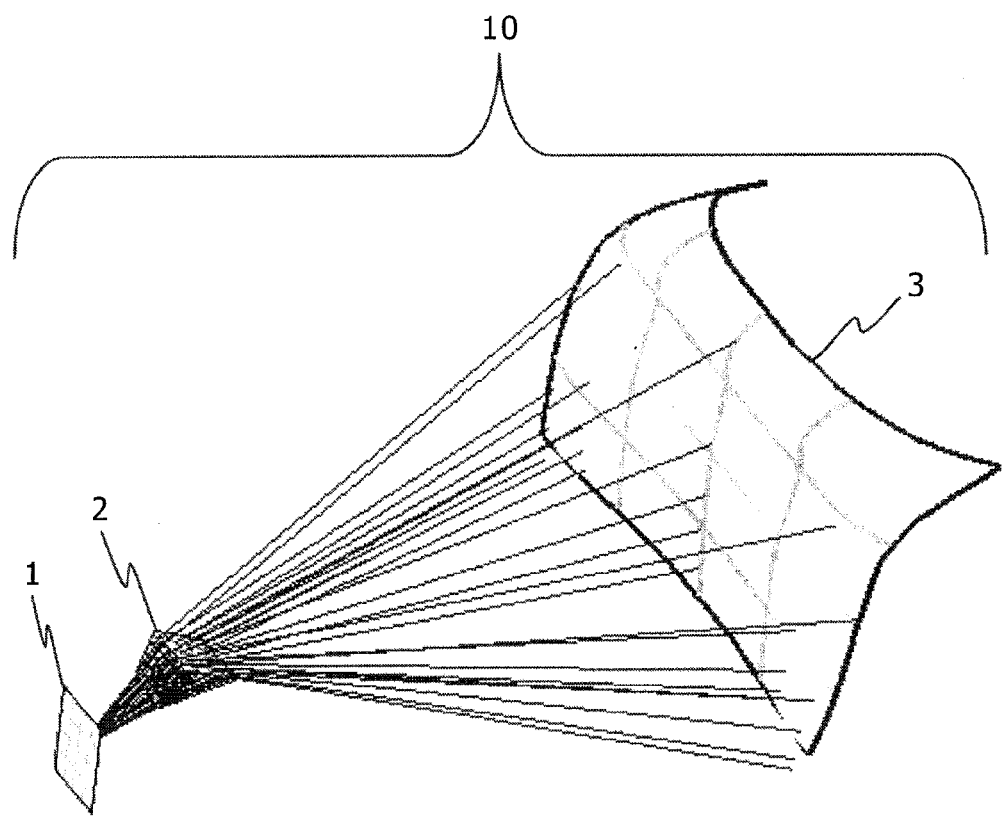
FIG. 16 is a diagram of another optical beam according to the second embodiment.
Figure 17:
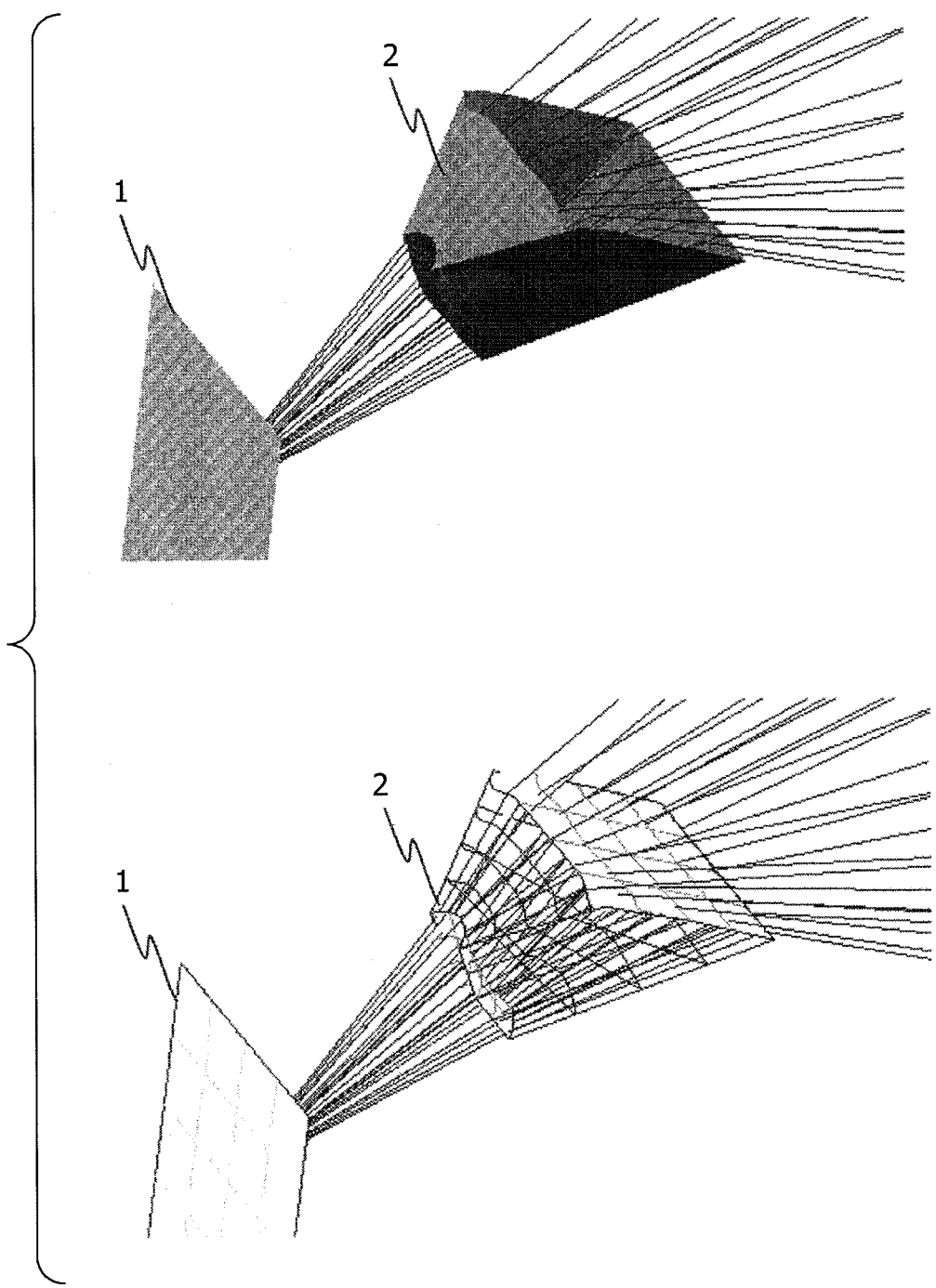
FIG. 17 is a diagram illustrating the detail of a free curved surface lens according to the second embodiment.

Subsequently, a second embodiment will be described with reference to FIGS. 15 to 20. FIG. 15 is one optical beam diagram of the second embodiment, FIG. 16 is another optical beam diagram of the second embodiment, FIG. 17 is a detailed diagram of a free curved surface lens in the second embodiment, FIG. 18 is a diagram illustrating lens data in the second embodiment, FIG. 19 is a diagram illustrating specific values of a free curved surface coefficient in the second embodiment, and FIG. 20 is a distortion performance diagram of the second embodiment.

A difference from the first embodiment resides in that the number of free curved surface lenses 2 is one. However, since X=600 mm and L=100 mm are satisfied even in the second embodiment, L/X which is a very small value, that is, 0.17 can be realized.

Third Embodiment

Subsequently, a third embodiment will be described with reference to FIGS. 21 to 26.

Figure 21:
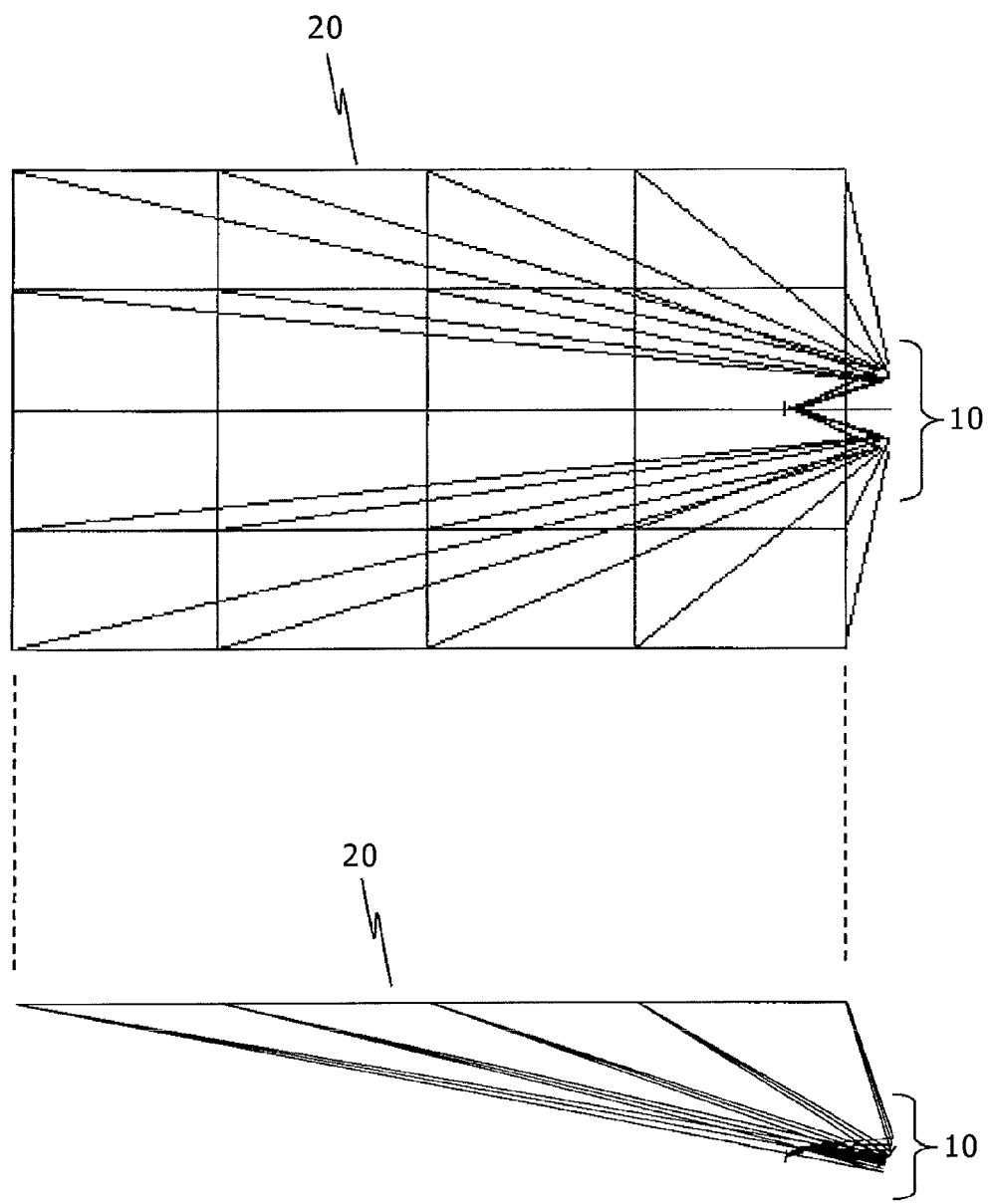
FIG. 21 is a diagram of one optical beam according to a third embodiment.
Figure 22:
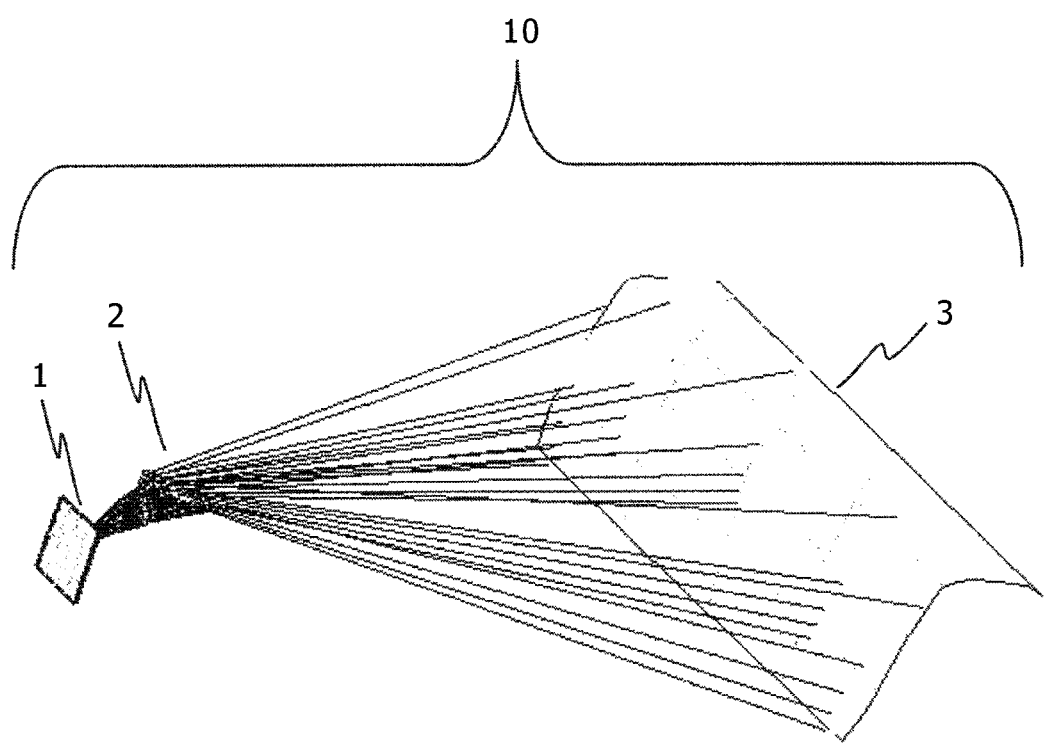
FIG. 22 is a diagram of another optical beam according to the third embodiment.
Figure 23:
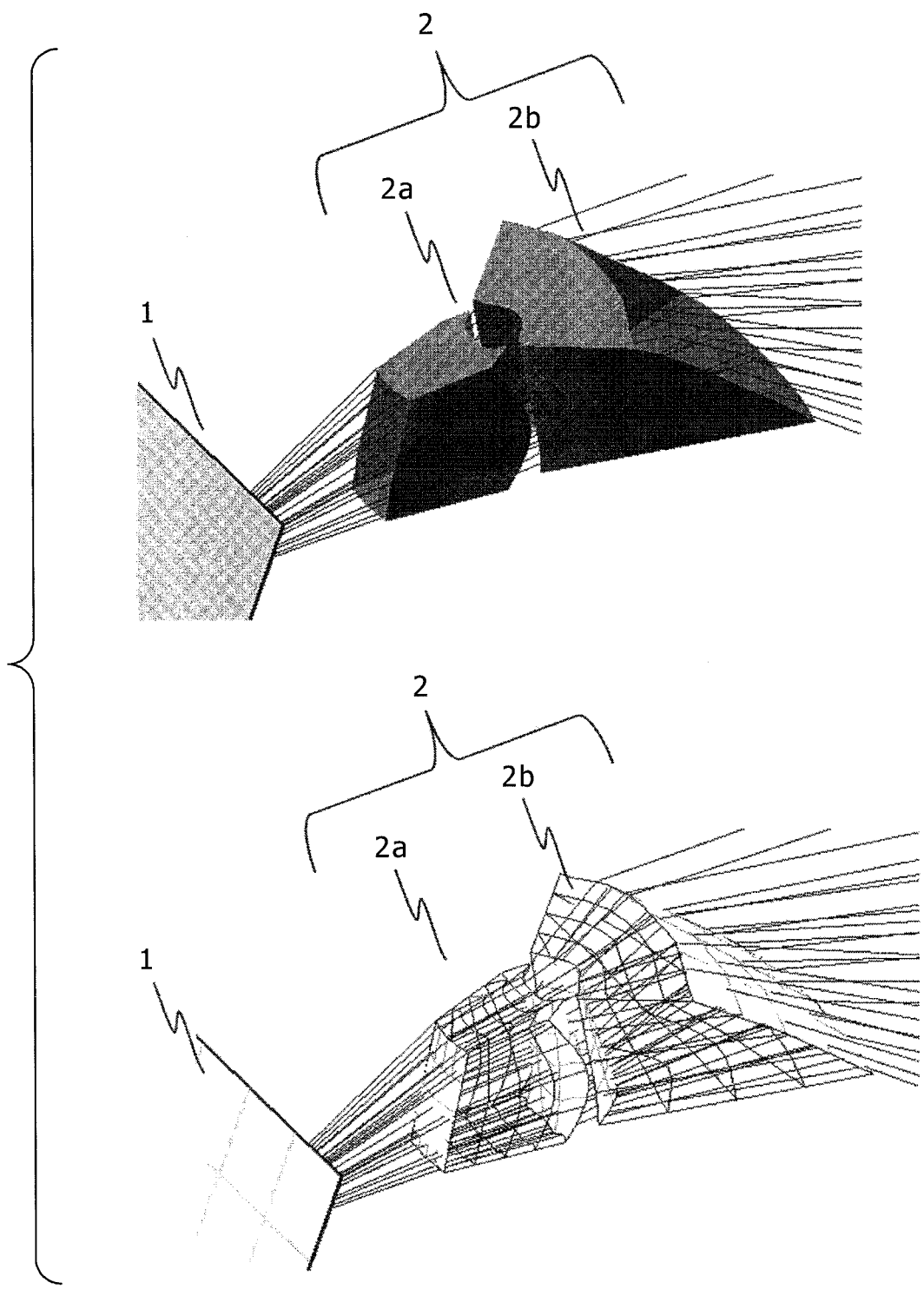
FIG. 23 is a diagram illustrating the detail of a free curved surface lens according to the third embodiment.

FIG. 21 is one optical beam diagram of the third embodiment, FIG. 22 is another optical beam diagram of the third embodiment, FIG. 23 is a detailed diagram of a free curved surface lens in the third embodiment, FIG. 24 is a diagram illustrating lens data in the third embodiment, FIG. 25 is a diagram illustrating specific values of a free curved surface coefficient in the third embodiment, and FIG. 26 is a distortion performance diagram of the third embodiment.

Differences from the first embodiment reside in that an image plane is set to 16:9 in conformity to an original wide screen, and the rotation angle of the optical scanning unit 1 (resonance rotation ±5.3 degrees horizontally and ±2.9 degrees vertically) is set to a two-dimensional range of 800× 450 mm. The linearity which is the distortion performance in FIG. 26 is improved more than the linearity which is the distortion performance of the first embodiment illustrated in FIG. 9. In the optical scanning unit 1 originally developed to scan the image plane of 16:9, scanning the image place of 16:9 is excellent as combination. It is needless to say that the scanning mirror developed at 16:9 can be also applied to the image plane of 4:3.

In the third embodiment, since X=800 mm and L=100 mm are satisfied, L/X which is a very small value, that is, 0.135 can be realized.

Fourth Embodiment

Figure 27:
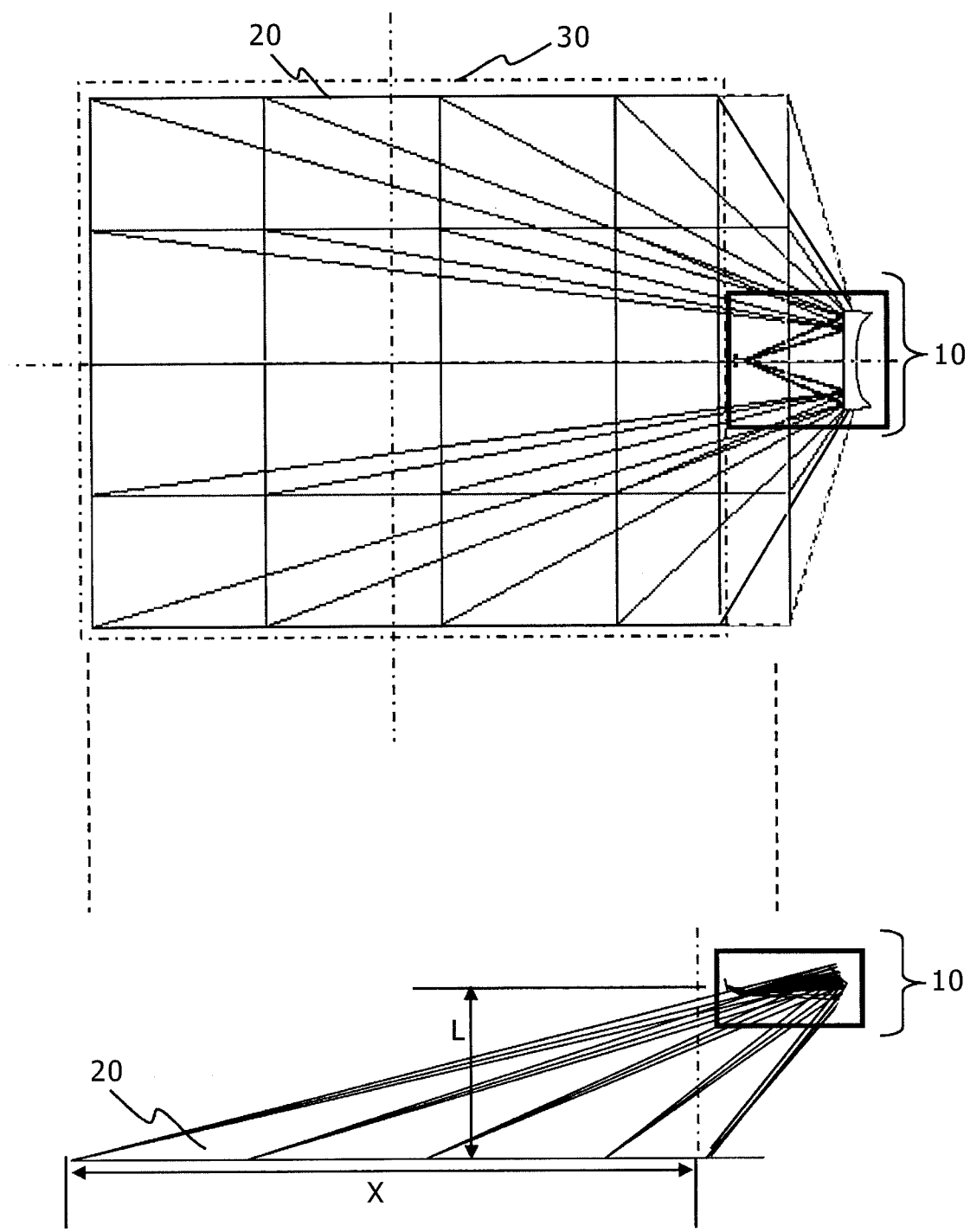
FIG. 27 is a diagram of an optical beam according to a fourth embodiment.
Figure 28:
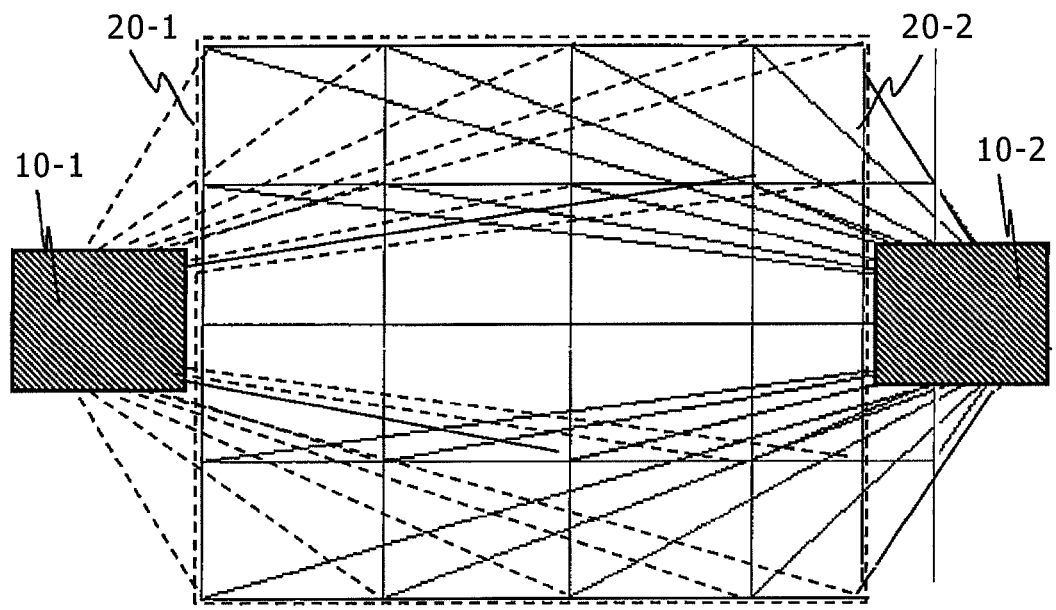
FIG. 28 is a diagram of an optical beam according to the fourth embodiment.
Figure 29:
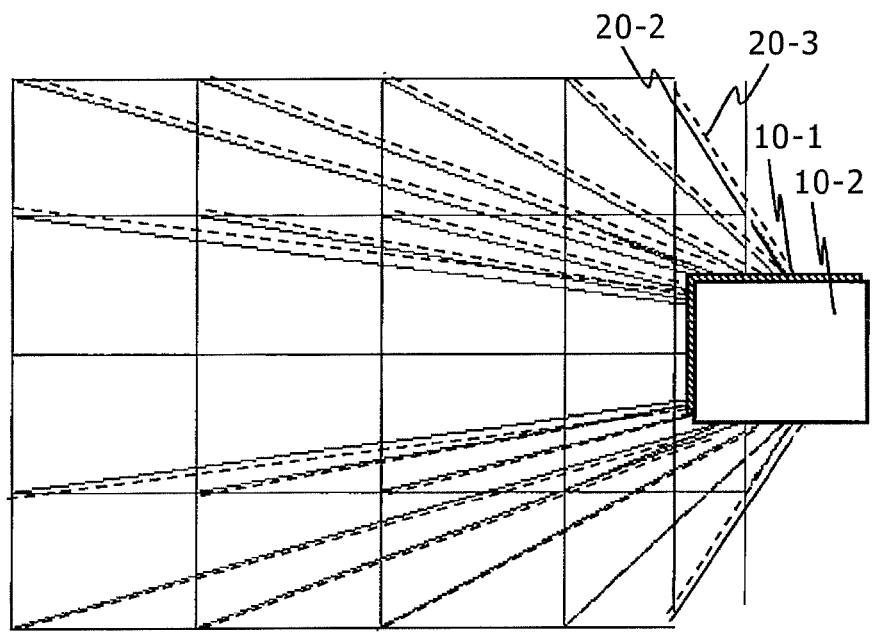
FIG. 29 is a diagram of an optical beam according to the fourth embodiment.

Subsequently, an embodiment in which a light use efficiency is improved, and the generation of speckle is suppressed will be described. FIGS. 27 to 33 are optical beam diagrams. FIGS. 27 to 29 illustrate appearances in which the optical beam emitted from the image display device 10 arrives at 5×5 division points on the image plane 20. Also, the image display device 10 is arranged above the image plane 20 in the long side direction of the image plane 20.

An effective scanning range in the vicinity of the image display device 10 is narrowed only in the X-axial direction from an effectively oscillating area (indicated by a dashed line 30). As a result, even if the degree of freedom of installation of the image display device 10 becomes larger, and the dimension of the image display device 10 also becomes larger, the set-up does not interrupt the image in a real use state, and improves the usability.

A lower portion of FIG. 27 illustrates a side of the drawing illustrated in an upper portion thereof. The image display device 10 does not interrupt a scanning screen display area even if the image display device 10 is located above (for example, desk projection) the scanning screen display area (indicated by an area X in the lower portion of FIG. 27) on the image plane 20. The image display device 10 may be arranged below the image plane 20.

In FIG. 28, image display devices 10-1 and 10-2 are arranged at two respective different positions. A plurality of image display devices 10 may be arranged at each of two or more different positions. In this way, the images are superimposed on each other, and displayed as the same image by the plurality of image display devices 10, to thereby enable higher brightness.

Also, the resolution is artificially increased by intentionally displacing the scanning image positions of the plurality of image display devices 10 having the same resolution, or the images are superimposed on each other by image information for each different field by interlacing, thereby being capable of improving the resolution. Also, the plurality of image display devices 10 may be arranged as illustrated in FIG. 29.

A right-eye image and a left-eye image are superimposed on each other on the screen with a laser beam of the image display device 10-1 as one polarized wave (for example, P wave), and a laser beam of the image display device 10-2 as the other polarized wave (for example, S wave), and a stereoscopic image can be realized by using polarization glasses. Likewise, the right-eye image and the left-eye image are superimposed on each other on the screen, and the stereoscopic image can be realized by using specific glasses having a function of switching images that enter the right and left eyes in time sharing.

Figure 30:
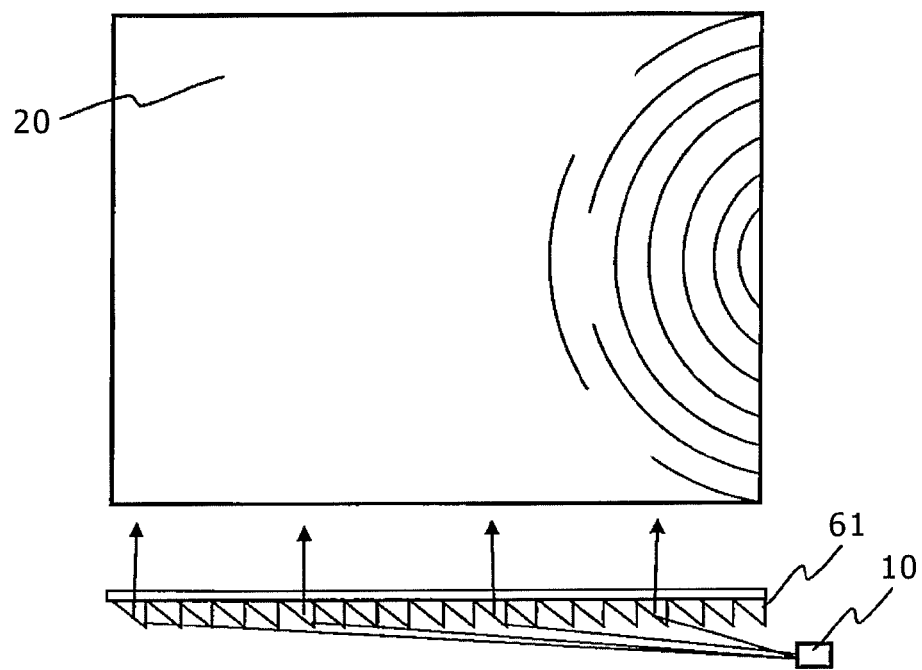
FIG. 30 is a diagram of an optical beam according to the fourth embodiment.

In FIG. 30, the image display device 10 is arranged below the image plane 20. The laser beam forming the image plane 20 is refracted in a direction substantially perpendicular to the image plane 20 by an optical path changing unit 61 having an action of refracting the light, and output to an image observation side. In this example, a Fresnel lens is used as the optical path changing unit 61. In particular, in the case of an oblique projection optical system, an eccentric Fresnel lens having a Fresnel center deviated from the image plane 20 is preferable.

Figure 31:
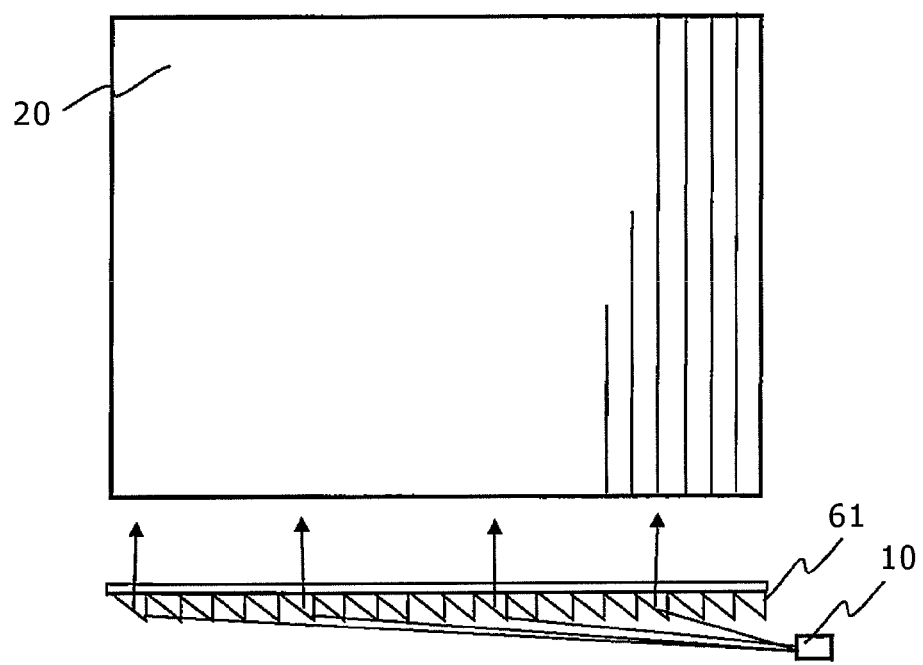
FIG. 31 is a diagram of an optical beam according to the fourth embodiment.
Figure 32:
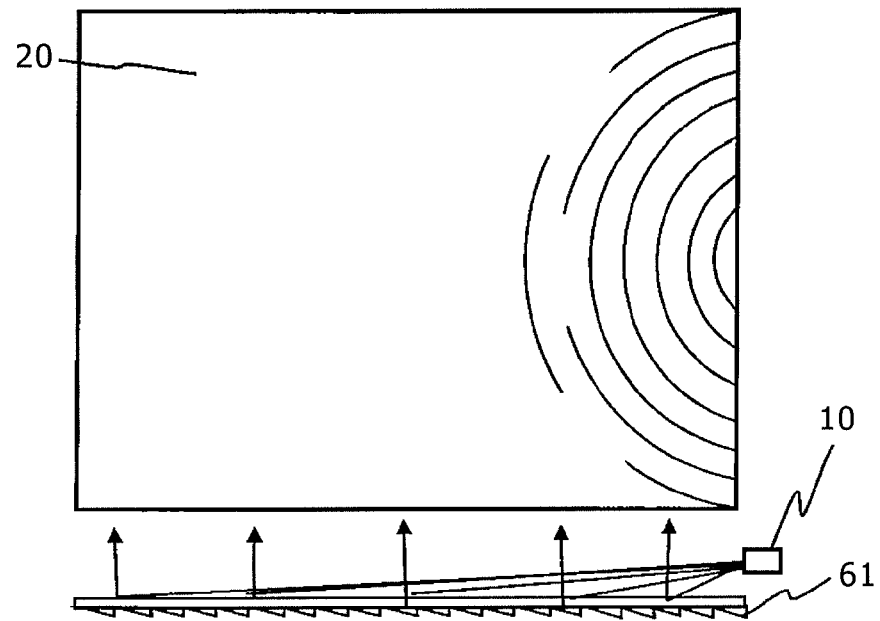
FIG. 32 is a diagram of an optical beam according to the fourth embodiment.
Figure 33:
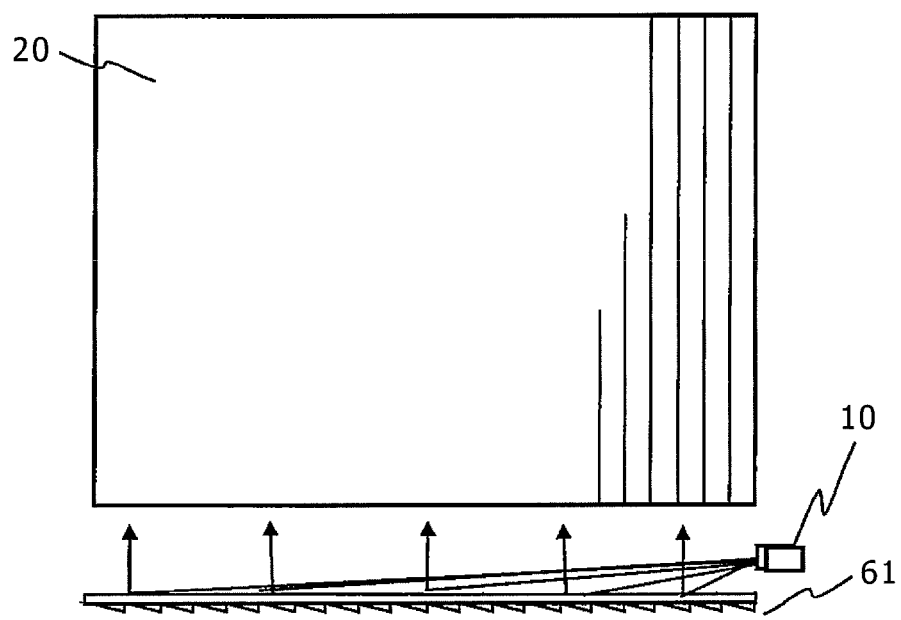
FIG. 33 is a diagram of an optical beam according to the fourth embodiment.

In FIG. 31, an eccentric linear Fresnel lens having a light reflecting surface on the lens surface is used as the optical path changing unit 61. FIG. 32 illustrates an example in which the image display device 10 is arranged above the image plane 20, and the optical path changing unit 61 is formed of the Fresnel lens. FIG. 33 illustrates an example in which the image display device 10 is arranged above the image plane 20, and the optical path changing unit 61 is formed of the eccentric linear Fresnel lens.

If a total reflection system is further employed as the optical path changing unit 61, a reflection loss on an incident surface can be reduced, and an excellent image small in the reflection loss can be obtained.

Figure 34:
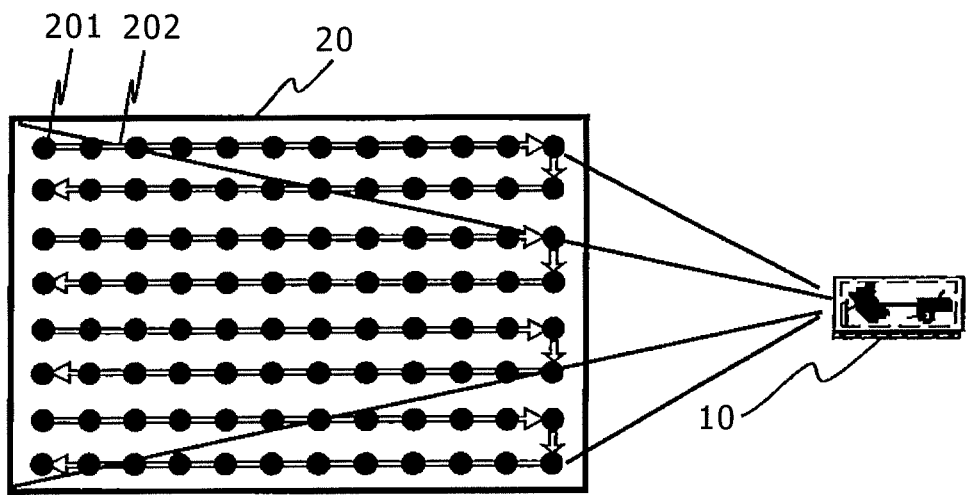
FIG. 34 is a diagram illustrating a principle of the fourth embodiment.
Figure 35:
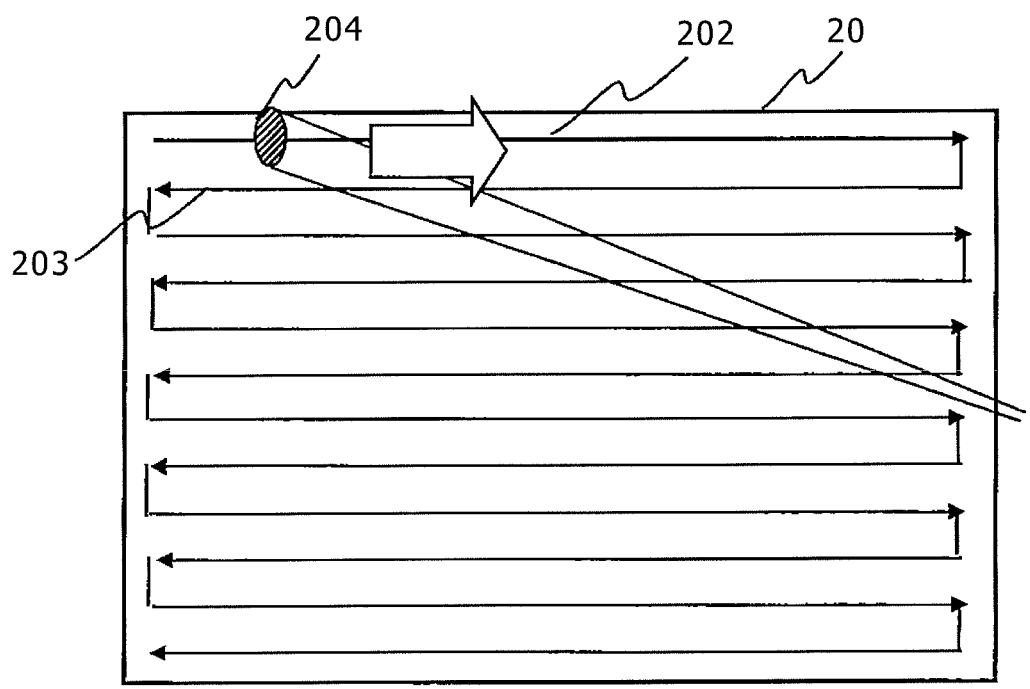
FIG. 35 is a diagram illustrating scanning of an image plane.
Figure 36:
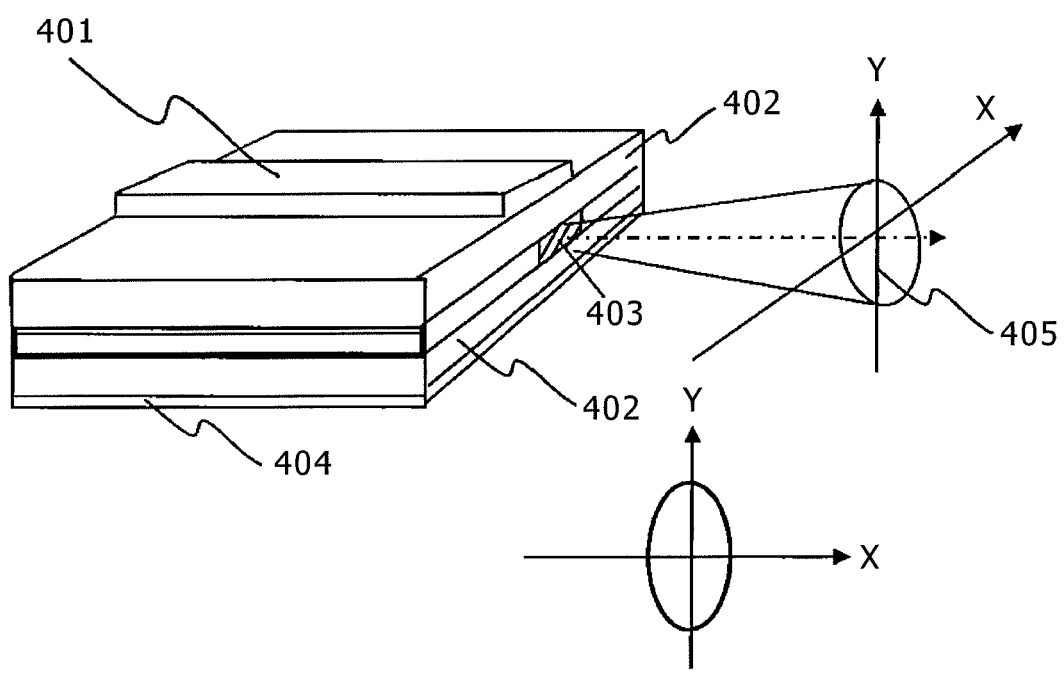
FIG. 36 is a diagram illustrating a semiconductor layer used as a light source.

Subsequently, a technique of uniforming the brightness of the image plane will be described. FIG. 34 is a diagram illustrating a principle of this embodiment. FIG. 35 is a diagram illustrating scanning of the image plane. FIG. 36 is a diagram illustrating a semiconductor layer used as the light source.

The laser beam has a spot dimension 201 of a specific size, and as illustrated in FIG. 35, the image plane 20 is scanned with a laser beam 204 along arrows 202 in a horizontal direction (first scanning), and then scanned along arrows 203 in an opposite direction thereof (second scanning). Therefore, since no flyback period is present unlike the interlace system, and no loss is present in a scanning time, the resolution is not damaged.

As the laser source, for example, the semiconductor laser includes, as illustrated in FIG. 36, a clad layer 402 sandwiched between electrodes 401 and 404, and an active area 403 existing within the clad layer 402. A spot shape of the laser beam is an elliptical shape having a direction (Y-axis in the figure) orthogonal to the active area 403 as a long side direction. For that reason, a short side of the elliptical spot shape is aligned with a distant direction (long side direction in the drawing) of the image plane 20 from the image display device 10 whereby the degradation of the spot shape by an oblique incidence can be reduced.

In the conventional system, if the spot dimension of the laser beam is determined, the resolution performance is unambiguously determined according to the image plane dimension determined by the oscillation angle of the scanning mirror. On the other hand, in this embodiment, because a last surface of the optical system is configured by a reflecting surface, the laser beam scanned and deflected by the optical scanning unit 1 (scanning mirror) is deflected by twice as large as the incident angle on the reflecting surface of the free curved surface mirror. Therefore, the laser beam can be more reflected with respect to the amount of deviation of the optical scanning unit 1. Further, a normal angle of the free curved surface mirror surface corresponding to the respective positions of the image plane 20 is made different from each other so that the reflection angle of the free curved surface mirror is different depending on the corresponding position of the image plane 20.

For that reason, in this embodiment, unlike the conventional system, the resolution is not determined by only the spot dimension of the laser beam and the oscillation angle of the scanning mirror.

Figure 37:
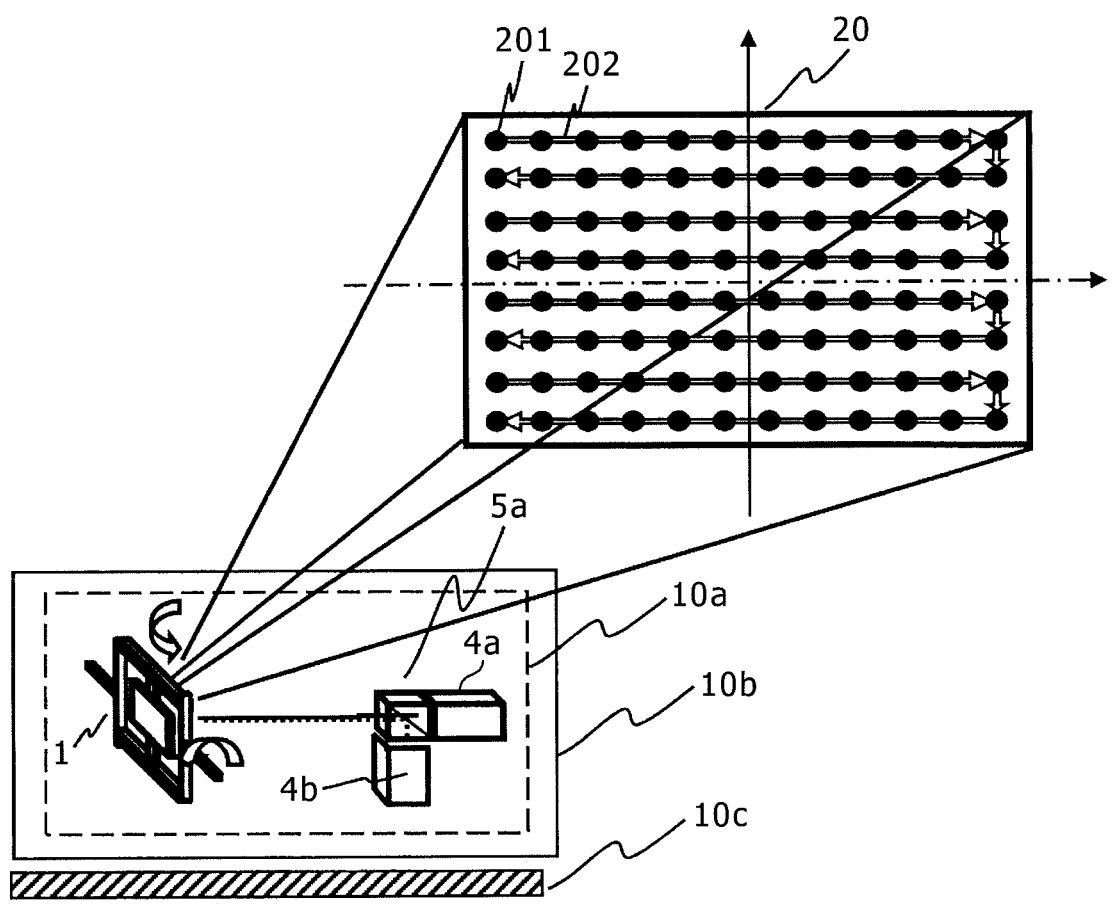
FIG. 37 is a diagram illustrating the principle of the fourth embodiment.
Figure 38:
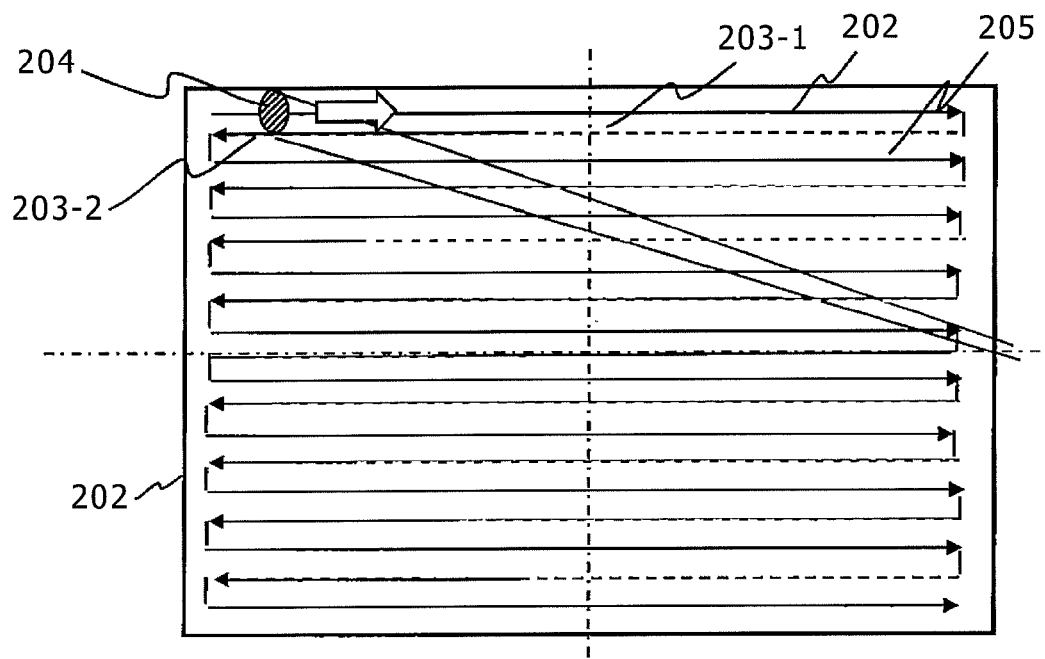
FIG. 38 is a diagram illustrating scanning of the image plane.
Figure 39:
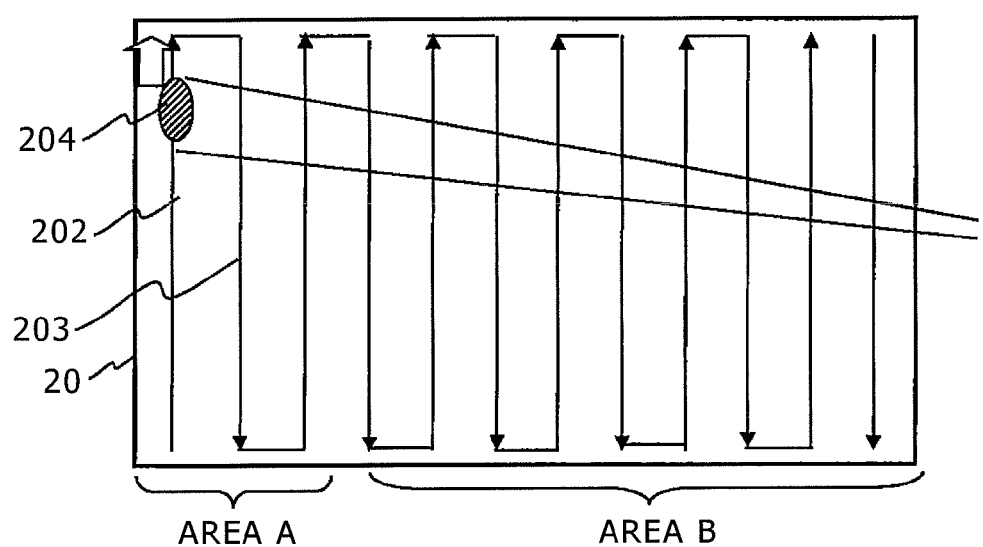
FIG. 39 is a diagram illustrating scanning of the image plane.
Figure 40:
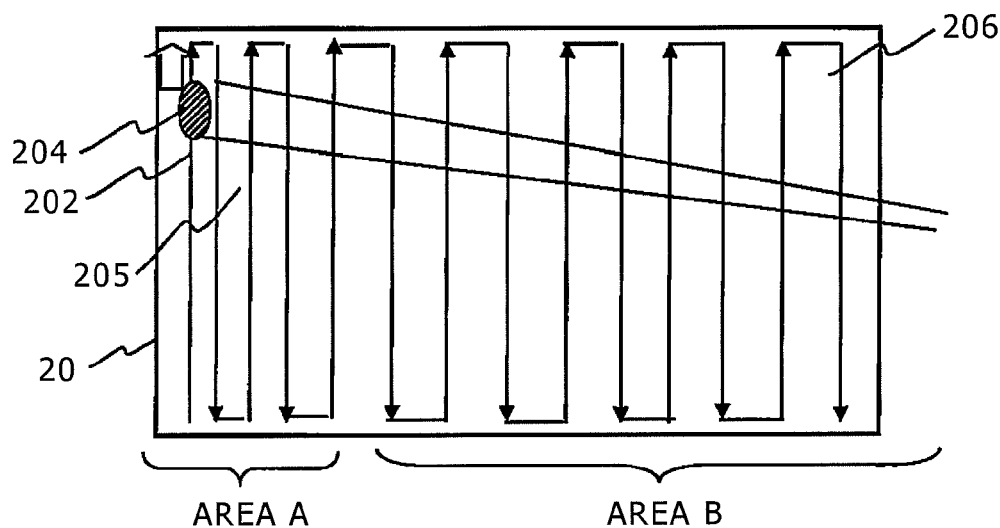
FIG. 40 is a diagram illustrating scanning of the image plane.

In this embodiment, the laser beam is input at the incident angle different in the respective positions on the image plane 20. In the long side direction, the incident angle of the scanning beam to the free curved surface (convex) mirror 3 corresponding to the center portion of the image plane 20 is larger than the incident angle of the scanning beam to the free curved surface mirror corresponding to the peripheral portion of the image plane 20. In the short side direction, the incident angle of the scanning beam to a portion of the free curved surface mirror 3 which is closer to the optical scanning unit 1 is smaller than the incident angle of the scanning beam to a portion of the free curved surface mirror which is distant from the optical scanning unit 1. In this way, the spot dimension, the brightness, or the density of the laser beam is changed according to the respective scanning positions independently or in combination. Then, means for embodying the above contents will be described. FIG. 37 is a diagram illustrating the principle of this embodiment. FIGS. 38 to 40 are diagrams illustrating scanning of the image plane.

Referring to FIG. 37, the image display device 10 includes a plurality of laser sources (two types in this example). Laser beams of a first light source portion 4a and a second light source portion 4b are combined together by a color synthesis unit 5a, and then scanned and deflected by the rotation of the optical scanning unit 1. Therefore, the laser beam is refracted and reflected by the free curved surface lens 2 and the free curved surface mirror 3, and then arrives at the image plane 20. If the color synthesis unit 5 is, for example, a polarization synthetic prism, the laser beam from the first light source portion 4a is a P polarized wave, and the laser beam from the second light source portion 4b is an S polarized wave, the laser beams can be efficiently combined together.

The outputs of the laser beams emitted from the first light source portion 4a and the second light source portion 4b are changed according to the position on the image plane 20, thereby being capable of improving the uniformity of brightness of the overall screen.

In this example, in the case of the laser semiconductor, a light emission energy is changed according to a supply current. However, when a current continues to flow beyond an allowable value, the light emission efficiency is degraded to darken, and a lifetime is also shortened. In order to avoid this drawback, a current value (about two to three times as large as normal) which exceeds the allowable value is input in a pulsed manner in a time of about a specific cycle (ms), thereby being capable of obtaining a high-bright laser beam output without shortening the lifetime.

In the oblique projection optical system, since an energy of the light that is reflected to a monitoring side is different due to a difference of a scanning speed depending on places or the optical beam incident angle to the image plane, it is difficult to uniform the brightness of the screen. However, the brightness is controlled in correspondence with a position of the screen under a PWM control so that the uniformity of the brightness over the overall area of the screen can be improved.

The spot diameter of the combined laser beam may be changed in synchronization with the laser beam output from the respective light sources. Also, as illustrated in FIG. 37, the provision of a magnetic shield 10b has a magnetic shield effect. Further, the provision of an electromagnet (fixed device) 10c in a part of the housing can realize an image display device that can be easily detachably attached to a metal board or wall surface.

Referring to FIG. 38, the resolution in the direction perpendicular to the image plane is more fined to conduct the first scanning along arrows 202, and the second scanning is conducted along arrows 203-1 and arrows 203-2 which are opposite directions thereof. In this situation, in areas of the arrow 203-1 and the arrows 203-2 (indicate by broken lines in the figure), the laser beam is not emitted (oscillated). As a result, a screen brightness on a left side of FIG. 38 can be relatively increased. Referring to FIG. 39, the screen is scanned with the laser beam in the direction perpendicular to the image plane.

The short side of the elliptical spot shape is aligned with a distant direction of the image plane 20 from the image display device 10 whereby the degradation of the spot shape by an oblique incidence can be reduced, like the above description.

Also, in order to uniform the brightness within the image plane 20, for example, the scanning interval in the long side direction is changed in a scanning range of an area A and a scanning range of an area B is changed so that the screen brightness on the left side of the image plane 20 can be relatively increased.

Referring to FIGS. 37 to 40, the brightness of a part (for example, right side, or upper or lower portion) of the image plane 20 can be changed, and the amount of change in the brightness can be inclined by freely controlling an area where the laser beam is emitted (oscillated) in a scanning range in the direction perpendicular to the image plane.

Subsequently, a technique for reducing the spectrum of the image plane 20 will be described. The speckle is generated because when a coherent light such as the laser beam is scattered on a diffusion surface, the light intensity of the speckle pattern has a distribution by an interference of the scattering light. In order to reduce the speckle, it is effective to convert the laser beam into a temporally and spatially irregular light. Specifically, the following four methods are effective.

(1) Polarization multiplicity is improved. That is, only a specific polarized wave is not present.

(2) A portion where a random reflection pattern is formed is provided on the image plane or the projection optical system.

(3) A multiple property of the wavelength is improved. That is, laser beams of not a specific single wavelength but a plurality of wavelengths are mixed together.

(4) An incident angle of the plural laser beams is changed, and the laser beams are input to the image plane to obtain a random scattering light.

Figure 41:
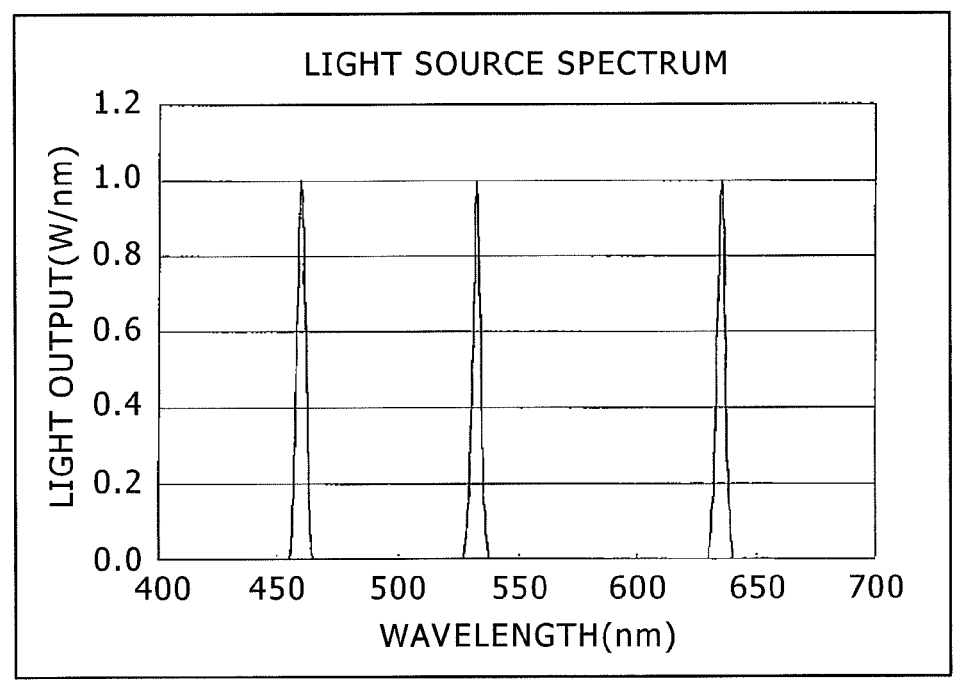
FIG. 41 is a diagram illustrating one example of a light having a light emission spectrum.
Figures 42, 43:
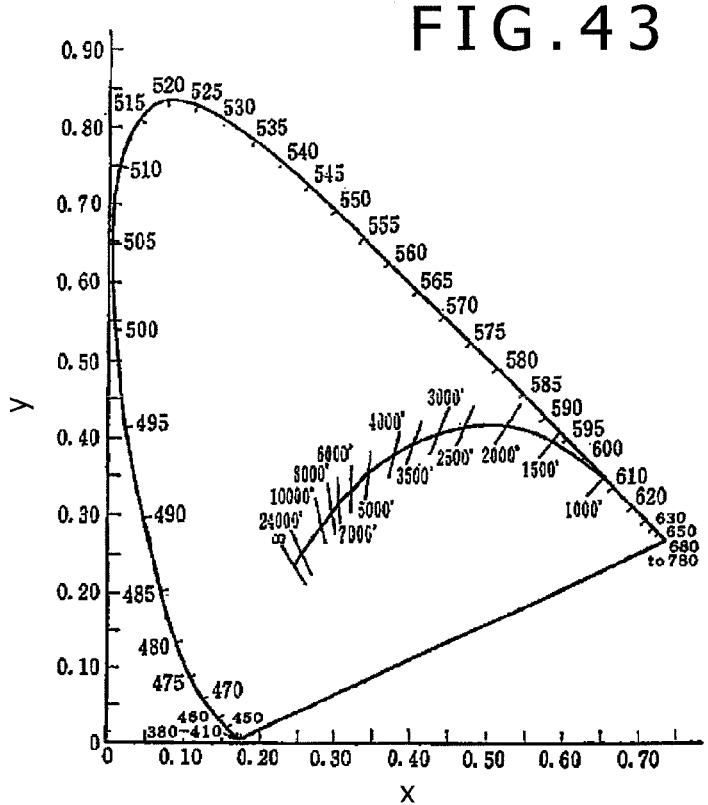
FIG. 42 is a diagram illustrating a property of a laser beam in FIG. 41 as a table.
FIG. 43 is a diagram illustrating the property of the laser beam in FIG. 41 as xy values.

In one of methods for realizing the above items (1) to (3), as described with reference to FIG. 37, since P waves and S waves are mixed in the obtained laser beams, the speckle can be reduced. Also, if the laser beams of the first light source portion 4a and the second light source portion 4b include a blue light emitting laser (460 nm in oscillation center wavelength), a green light emitting laser (532 nm in oscillation center wavelength), and a red light emitting laser (635 nm in oscillation center wavelength), and are combined together by the color synthesis unit 5a, a color reproduction range illustrated in FIG. 42 can be realized, and the brightness can be obtained. FIG. 42 illustrates colors of the scanning image when the laser beam illustrated in FIG. 41 oscillates, independently, to output the light, and single color and the three colors are combined to display white. FIG. 43 illustrates the laser beams obtained as the xy value on a chromaticity diagram through simulation calculation.

Figures 44, 45:
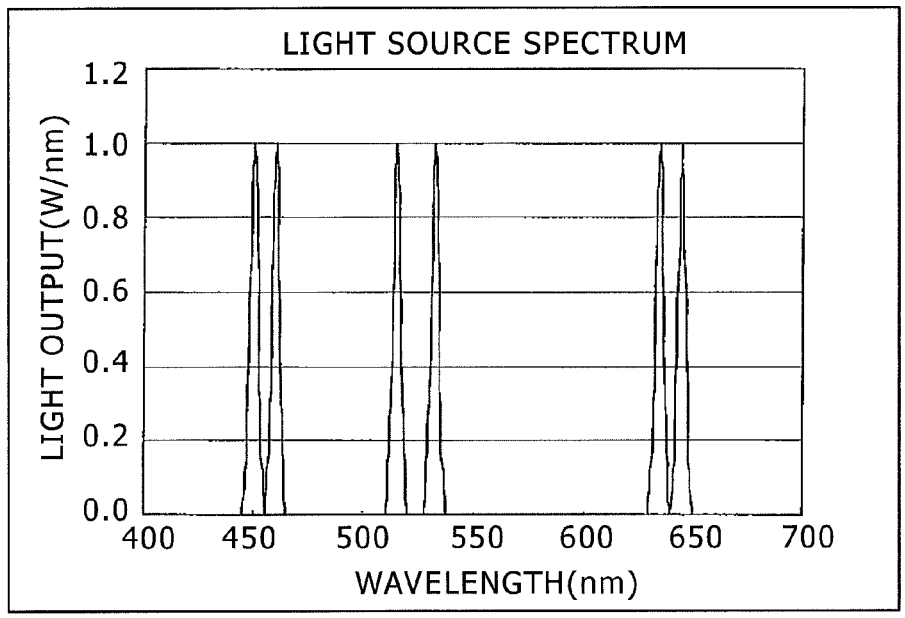
FIG. 44 is a diagram illustrating another example of the light having the light emission spectrum.
FIG. 45 is a diagram illustrating the property of the laser beam in FIG. 44 as a table.
Figure 46:
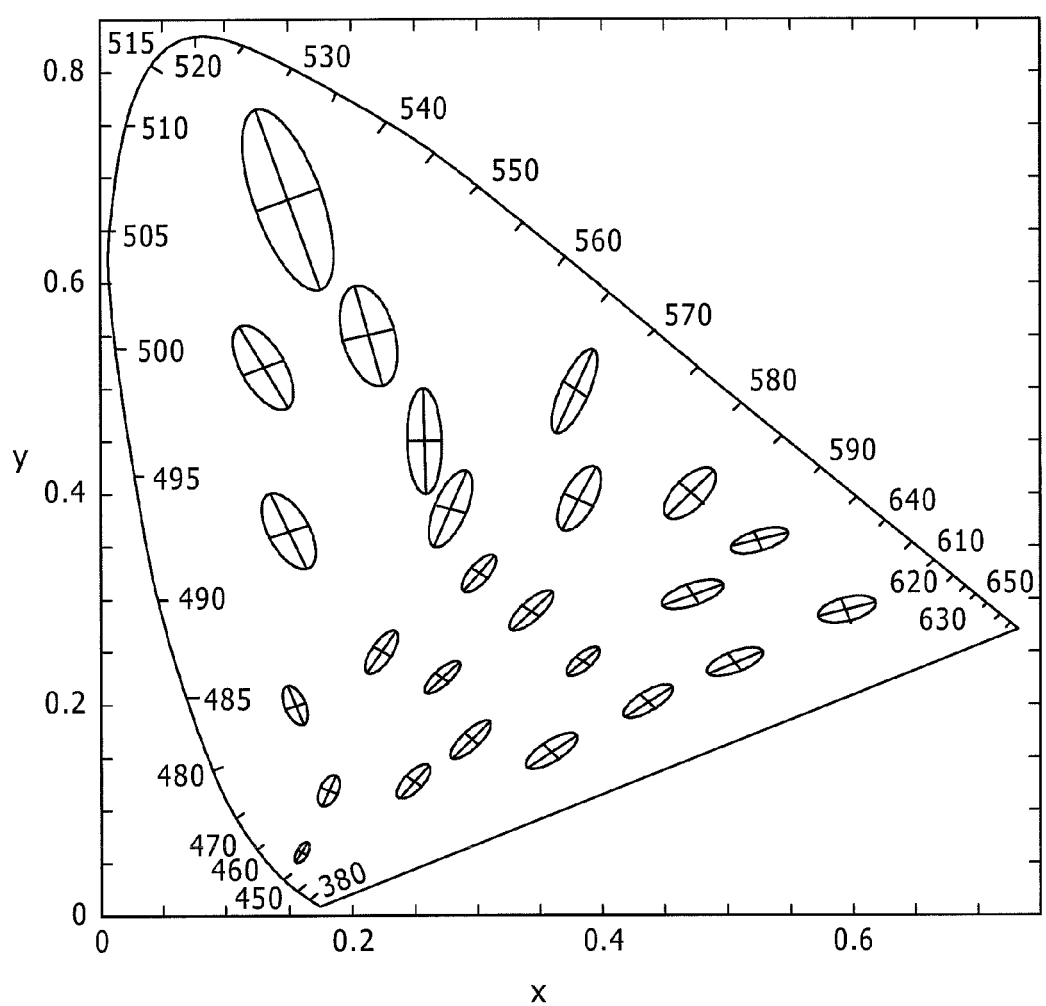
FIG. 46 is a diagram illustrating the property of the laser beam in FIG. 44 as xy values.

Also, when the laser beams of the second light source portion 4b are mixed together as a blue light emitting laser (450 nm in oscillation center wavelength), a green light emitting laser (515 nm in oscillation center wavelength), and a red light emitting laser (645 nm in oscillation center wavelength), having the light emission spectrum illustrated in FIG. 44, an extensive color reproduction area can be realized as illustrated in FIG. 45, and the speckle can be reduced.

Subsequently, how to look at tables illustrated in FIGS. 42 and 45 will be described. A color mixture ratio in those tables shows how intensity the above-mentioned single color laser beam (implement simulation using a light emission color and an energy intensity indicated in FIG. 44) is emitted with. The laser of the respective colors is monochromatic, and a case in which the laser emits a light with a relative intensity 100% is set as 1, and a case in which the laser emits a light with a relative intensity 5% is set as 0.05. The results obtained by the mixed color are indicated by the brightness (brightness is higher as a numerical value is larger in a relative value indication), and coordinate values on chromaticity diagram illustrated in FIG. 43.

With the use of the single color lasers each having a wavelength different between the first light source portion 4a and the second light source portion 4b, the single color laser obtained by combining the lasers that have been combined together by the color synthesis unit 5a can reduce the speckle as compared with a case where the laser beams having the same wavelength are combined together.

Further, as compared with a case in which the respective color laser beams of blue, green, and red (chromaticity coordinate values indicated in FIG. 42) are emitted, independently, the brightness can be increased without narrowing a color reproduction range in a case where the green laser and the red laser are emitted at a given ratio, and combined together at the time of emitting, for example, the blue laser. The present inventors have confirmed that a change in color when plural colors of lasers are mixed with a single color laser illustrated in FIG. 42 to improve the brightness is obtained through simulation, and compared with a graph indicative of a color matching identification area of a McAdam illustrated in FIG. 42, as a result of which the respective colors fall within the color matching areas, and there is no problem in practical use.

As described above, an improvement in the brightness and a reduction in the speckle can be realized by mixing the laser beams of the plural colors at a specific ratio without narrowing the color reproduction range.

On the other hand, in the above item (4), an angle of the synthetic surface (prism) of the color synthesis unit 5, and the respective incident positions to the synthetic surface are optimized with the results that the lights having the different incident angles from two light sources can be combined together on the image plane 20, and the speckle can be reduced.

Figure 47:
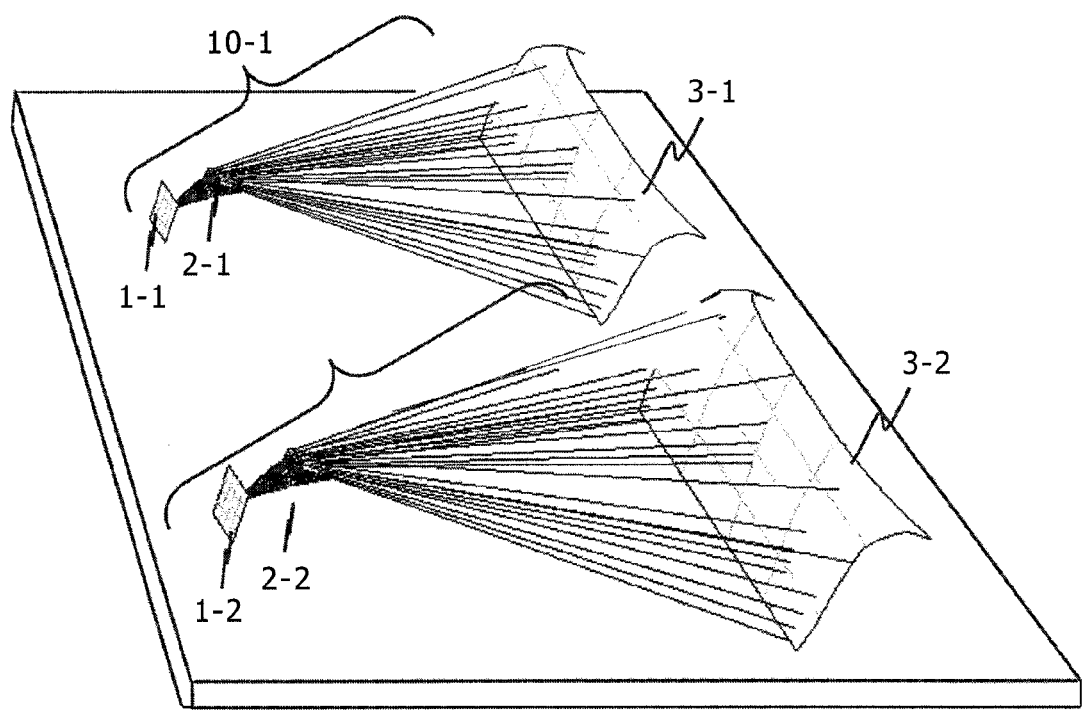
FIG. 47 is a diagram illustrating a state in which a plurality of image display device is arranged.

A plurality of the image display devices configured by combination of the above-mentioned light sources and the oblique projection optical systems is arranged as illustrated in FIG. 47 in use (FIG. 4). As a result, there can be realized the image display device that improves the brightness while realizing the sufficient color reproduction range in practical use, and reduces the speckle.

Subsequently, the above item (2) will be described. Referring to FIG. 37, the present inventors have found through experiments that the speckle of the laser beam can be reduced by controlling the surface roughness of the free curved surface mirror surface. In order to obtain the free curved surface mirror, a mold is machined in conformity to a design shape, plastic is molded by the obtained mold, and a reflective film is formed on a surface of the plastic to realize the free curved surface mirror. For that reason, since the surface roughness of the mold surface is transferred to the surface roughness of the reflecting surface of the mirror without any change, the speckle can be reduced by optimizing the surface roughness of the mold surface depending on the position of the reflecting surface.

FIGS. 48 to 52 illustrate a relationship between a machining direction (machining order) of the mold processing for determining the surface roughness of the free curved surface mirror reflecting surface, and the scanning direction of the laser beam.

Figure 50:
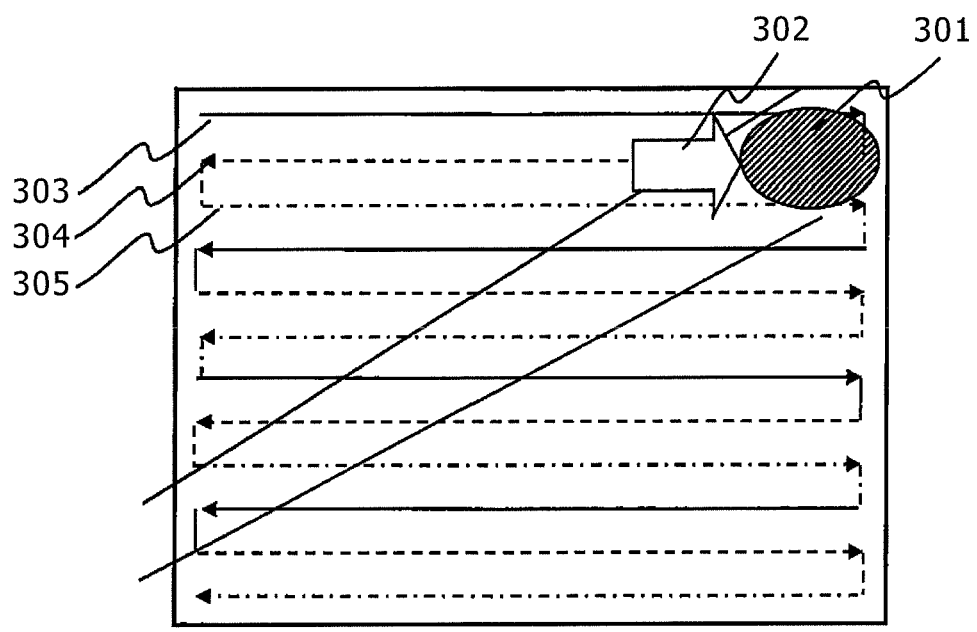
FIG. 50 is a diagram illustrating the processing order of the mold processing of the free curved surface mirror reflecting surface.
Figure 51:
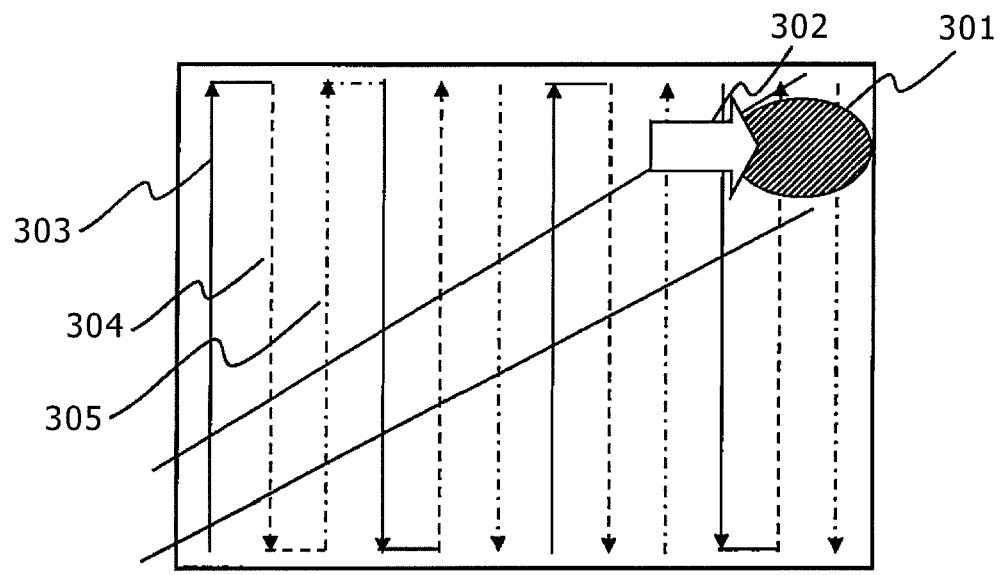
FIG. 51 is a diagram illustrating the processing order of the mold processing of the free curved surface mirror reflecting surface.
Figure 52:
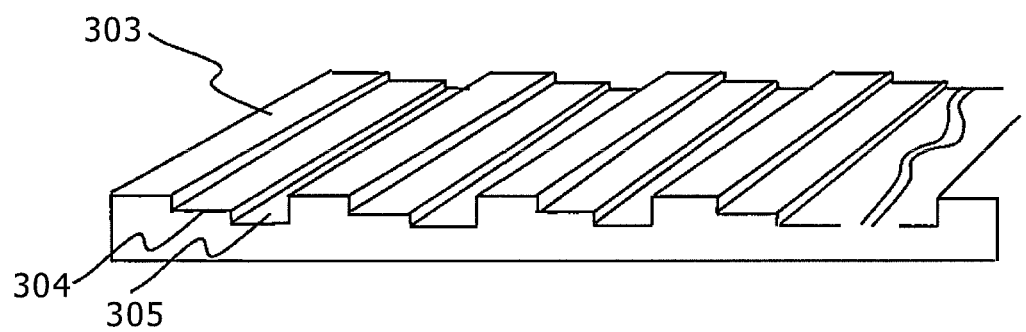
FIG. 52 is a diagram illustrating the processing order of the mold processing of the free curved surface mirror reflecting surface.
Figure 53:
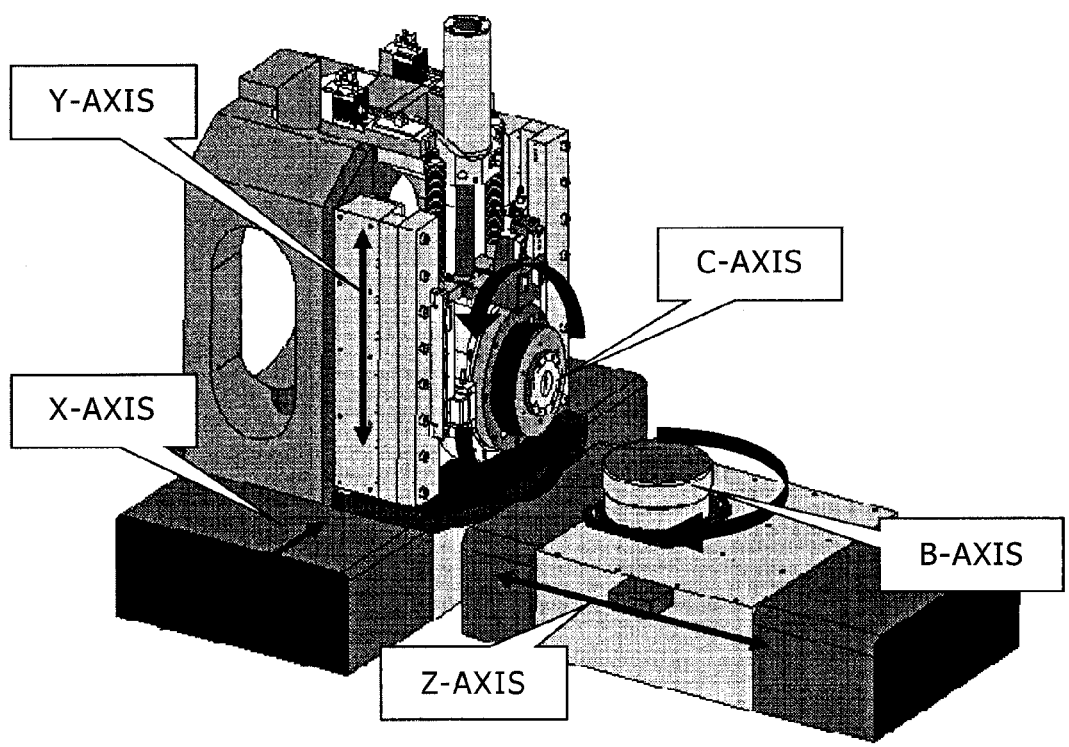
FIG. 53 is a schematic diagram of a mirror surface processing machine of a free curved surface mirror mold.

FIG. 52 is a vertical cross-sectional view of the mold of the free curved surface mirror reflecting surface illustrated in FIG. 50. For example, as illustrated in FIG. 53, the mold processing of the free curved surface mirror uses a processing machine of five-axis control which is an X-axis, a Y-axis, a Z-axis, a C-axis which is a rotating axis of a processing axis, and a B-axis which is a rotating axis of a work. A single crystal diamond bite is fitted to the C-axis, and the mold surface is scraped off through a processing method called "fly cutting" to obtain a desired shape precision and surface roughness. The mold processing of the free curved surface mirror is conducted by reciprocating a bite of the processing machine as illustrated in FIG. 48.

The processing trace is sufficiently smaller than the dimension of a spot 301 of the laser beam, and a direction and roughness of the trace of the mold processing are set to desired values so that the scattering state of the reflected light from the mirror can be controlled. For that reason, between an embodiment illustrated in FIG. 48 in which the scanning direction of the laser beam is aligned with the processing direction of the mirror mold, and an embodiment illustrated in FIG. 51 in which the scanning direction and the processing direction of the mirror mold are orthogonal to each other, the pattern of the surface roughness of the mirror surface obtained after molding is different, and the scattering degree of the laser beam is different. Therefore, the effect of reducing the speckle is also different.

Figure 48:
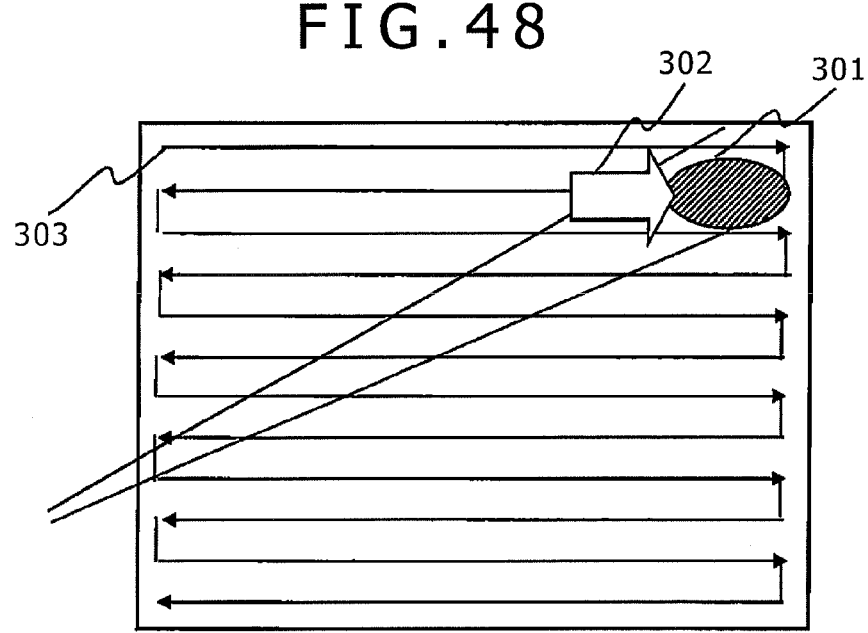
FIG. 48 is a diagram illustrating a processing order of a mold processing of a free curved surface mirror reflecting surface.
Figure 49:
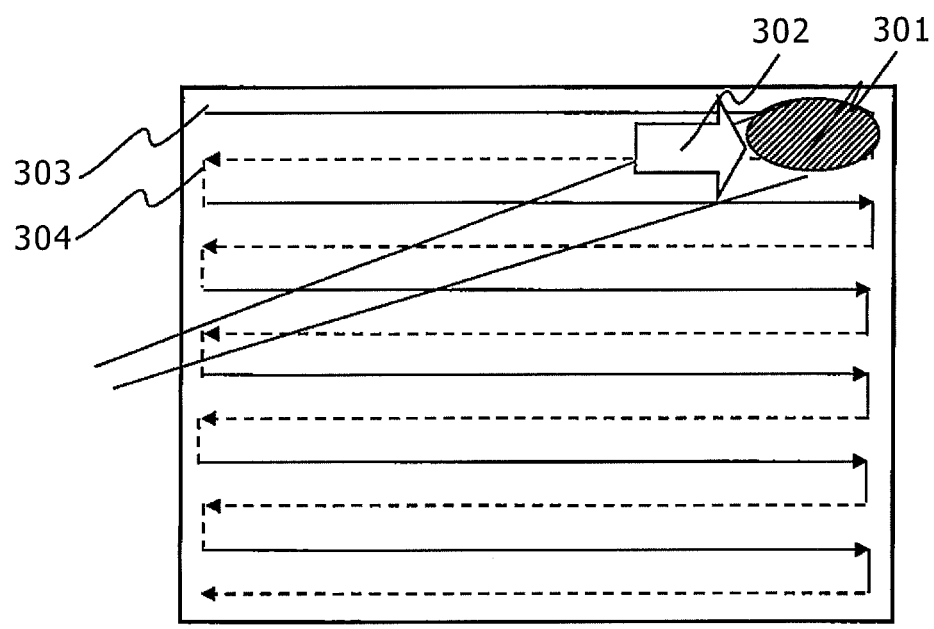
FIG. 49 is a diagram illustrating the processing order of the mold processing of the free curved surface mirror reflecting surface.

Further, contrary to FIG. 48 in which the scanning direction of the laser beam and the processing direction of the mirror mold are aligned with each other, for example, as illustrated in FIG. 49, a processing condition is changed in reciprocation of an outward path (indicated by 303 in the figure) of the bite processing and a homeward path (indicated by 304 in the figure) thereof to intentionally create the surface different in roughness. Further, as illustrated in FIG. 50, a plurality of processing conditions are changed in reciprocation of an outward path (indicated by 303 in the figure) of the bite processing, a homeward path (indicated by 304 in the figure) thereof, and further an outward path (indicated by 305) to intentionally create the surface different in roughness. Also, this processing condition is irregularly changed, thereby being capable of obtaining the surface roughness of a more complicated pattern, and the speckle can be reduced.

Figure 54:
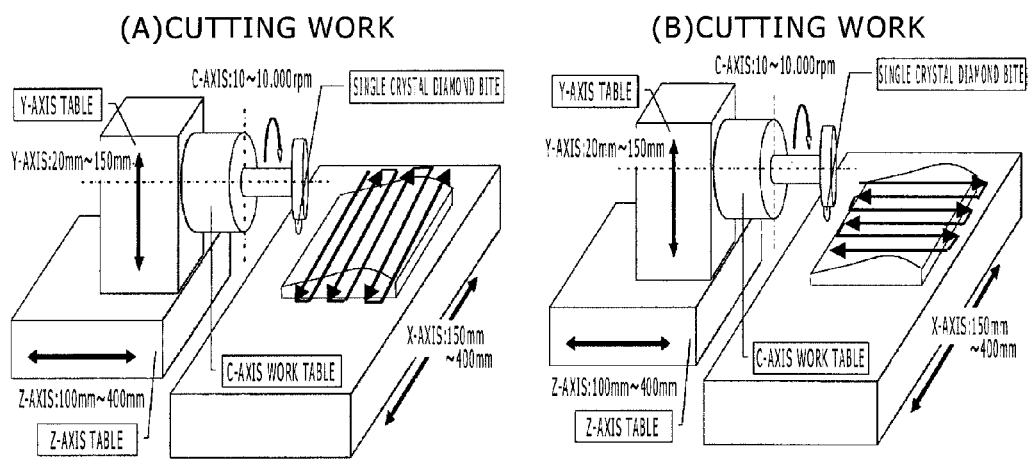
FIG. 54 is a schematic diagram illustrating a mirror surface machining method of the free curved surface mirror mold.

Subsequently, a method of the mold processing will be described. When the mold surface is scraped off by the above-mentioned five-axis processing machine to obtain an intentional processing surface in design, a trace of the fly cutting processing remains in the mold surface (this processed trace is indicated by 303 in the figure). As illustrated in FIG. 54, the trace left by the fly cutting is different in processing precision of the mold (processed object) depending on the processing direction. For that reason, the bite interferes with the mold depending on the dimension of the processed object and the surface shape of the mold, particularly the mold shape, and a portion other than a position to be originally processed may be scraped off. Therefore, the processing needs to be conducted for each of the processing directions.

Figure 55:
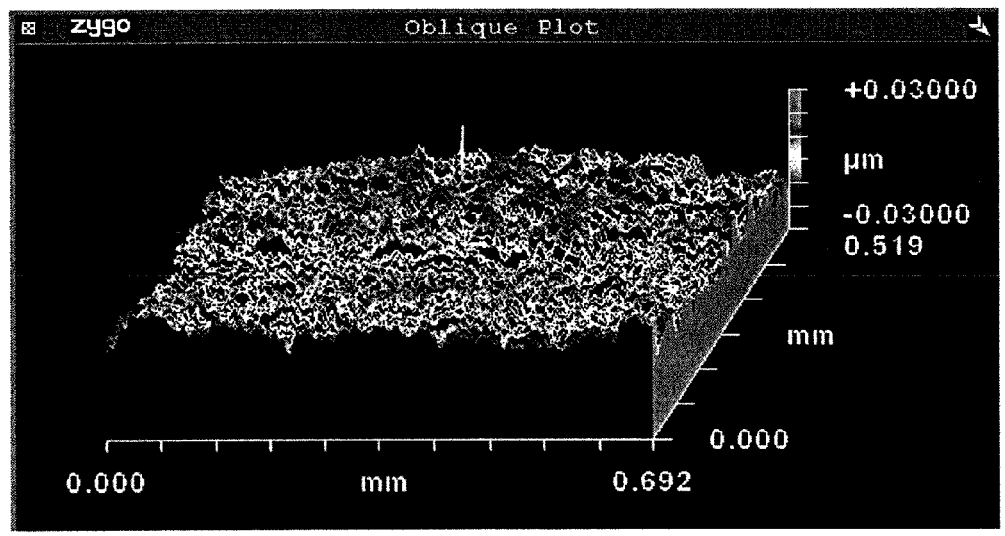
FIG. 55 is a diagram illustrating a mirror surface roughness of the free curved surface mirror mold.
Figure 56:
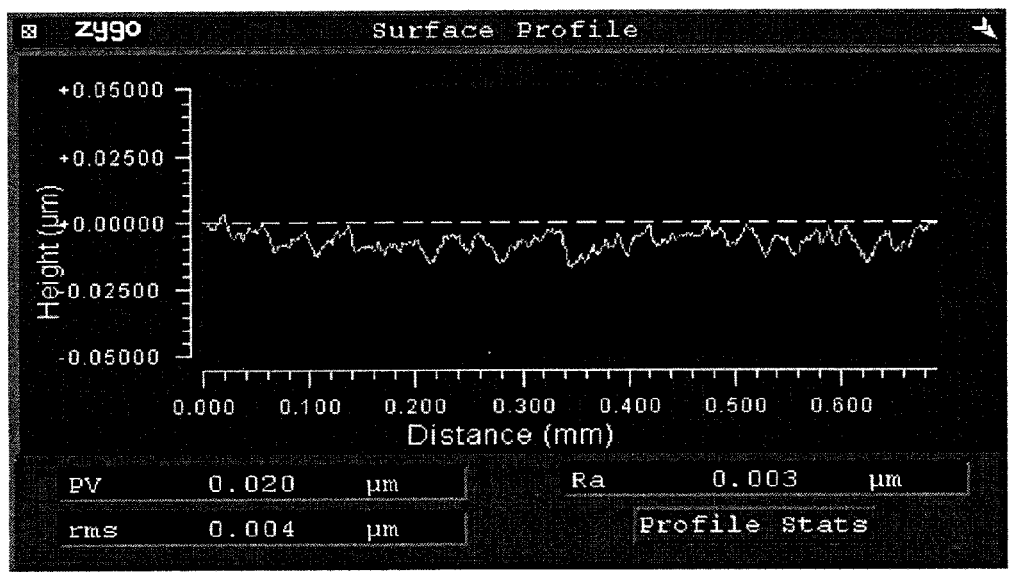
FIG. 56 is a diagram illustrating the mirror surface roughness of the free curved surface mirror mold.

FIG. 55 illustrates a scraped surface by the processing method illustrated in FIG. 54B. The results obtained by evaluating the surface roughness in a direction orthogonal to the processing direction for the purpose of measuring the roughness of the obtained processed surface are illustrated in FIG. 56. A sufficient surface roughness which is 3 nm in Ra maximum value and 4 nm in ten point height of irregularities can be obtained even for the wavelength of the light.

Figure 57:
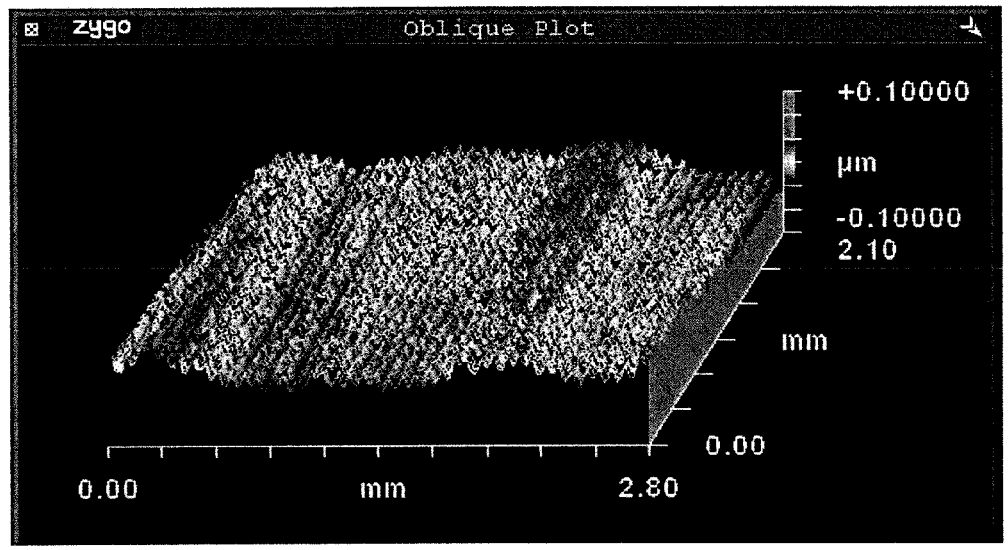
FIG. 57 is a diagram illustrating the mirror surface roughness of the free curved surface mirror mold.
Figure 58:
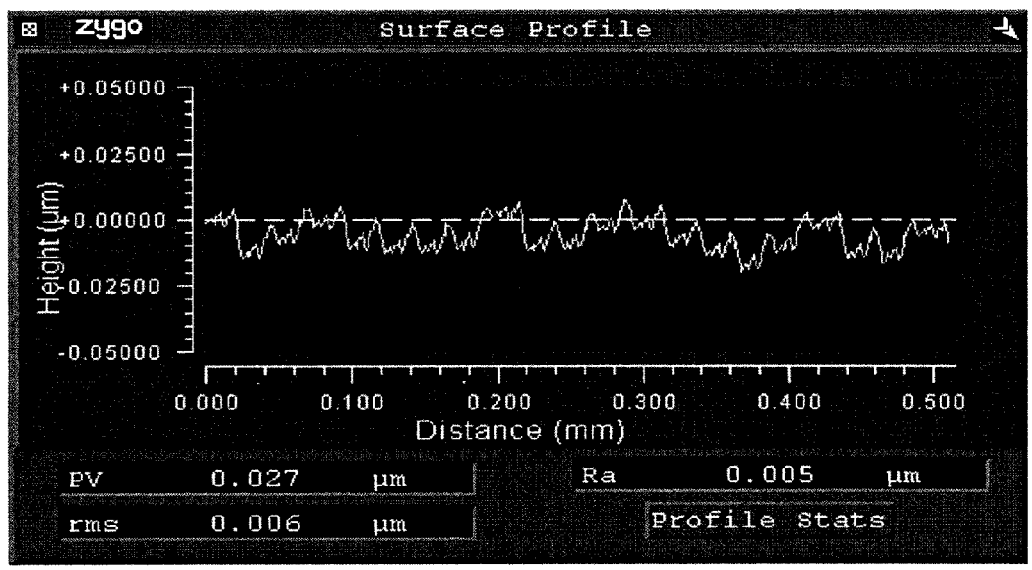
FIG. 58 is a diagram illustrating the mirror surface roughness of the free curved surface mirror mold.

On the other hand, FIG. 57 illustrates a scraped surface by the processing method illustrated in FIG. 54A. The results obtained by evaluating the surface roughness in a direction orthogonal to the processing direction for the purpose of measuring the roughness of the obtained processed surface are illustrated in FIG. 58. The obtained surface roughness which is 5 nm in Ra maximum value and 6 nm in ten point height of irregularities is larger than that in the processing method of FIG. 54B.

In this way, if not the movement of the fixed table (work table) of the processed object, but the bite is moved with the use of the processing shafts of the original processing machine, the excellent surface roughness of the mirror reflecting surface can be obtained.

According to the above embodiment, in an ultra short projection optical system, since the scanning deflection angle obtained by the rotation of the scanning mirror (optical scanning unit) can be enlarged, the scanning image can be projected on a desk in a state where the image display device is arranged on the desk as it is. Also, an optical axis connecting the light source and the optical scanning unit, and the optical scanning unit are arranged at an angle of 45 degrees or lower, and the free curved surface lens and the free curved surface mirror are arranged eccentrically from the optical axis. With this configuration, even if a distance between the free curved surface mirror and the image plane is sufficiently shortened, the light reflected by the free curved surface mirror can be prevented from again entering the free curved surface lens, and a downsized device can be realized.

Also, not the respective single-color laser sources of red, green, and blue, but a plurality of light sources having the respective adjacent wavelengths are used so that the coherent property of the lasers can be degraded to suppress the speckle. Further, the surface of the free curved surface mirror is provided with a partial scattering characteristic as a rough surface to artificially increase an area of the light emission point as a secondary light source. As a result, the amount of light can be increased while a safety standard is satisfied.

LIST OF REFERENCE SIGNS

1 . . . optical scanning unit, 2 . . . free curved surface lens, 3 . . . free curved surface mirror, 4 . . . light source, 10 . . . image display device, 20 . . . image plane, and 30 . . . structure.

The invention claimed is:

1. An image display device comprising:
an optical scanning unit that scans an image plane with a light emitted from a light source in a first direction and a second direction of the image plane due to a rotational movement of reciprocation of a reflecting surface of the light; and
an optical system that enlarges a scanning angle of the scanned light, wherein the optical system has a free curved surface lens on the optical scanning unit side, and has a free curved surface mirror on the image plane side,
wherein in a surface roughness of the free curved surface mirror, a plurality of surface roughness is present in band shapes in the same direction as the scanning direction of the free curved surface mirror with the light from the light source, or in a direction substantially orthogonal to the scanning direction, and a dimension between boundaries of the band-like roughness is smaller than a beam dimension on the free curved surface mirror.

2. The image display device according to claim 1,
wherein a length in the first direction is longer than a length in the second direction, and
wherein the free curved surface mirror is arranged so that the first direction is substantially parallel to a first plane defined by an incident optical beam and a reflected optical beam in the free curved surface mirror when the optical scanning unit remains static in the center of the scanning range.

3. The image display device according to claim 1,
wherein the optical scanning unit has one reflecting surface having two scanning directions.

4. The image display device according to claim 1,
wherein the optical scanning unit has two reflecting surfaces each having one reflecting surface.

5. The image display device according to claim 1,
wherein a larger one of deflection angles to the reflecting surface in the two scanning directions corresponds to the first direction, and a smaller one of the deflection angles of the reflecting surface in the two scanning directions corresponds to the second direction.

6. The image display device according to claim 1,
wherein an optical path length by which an optical beam longer in a distance from the reflection position on the free curved surface mirror to a scanning position on the image plane passes through the free curved surface lens in the first plane is larger than an optical path length by which an optical beam shorter in the distance from the reflection position on the free curved surface mirror to the scanning position on the image plane passes through the free curved surface lens.

7. The image display device according to claim 1,
wherein the free curved surface lens on the image plane in the second direction has a negative refractive power.

8. The image display device according to claim 1,
wherein a peripheral portion of the free curved surface mirror on the image plane in the second direction has a negative refractive power.

9. The image display device according to claim 1, wherein when it is assumed that a length in the first direction is X, and a projector distance that is a vertical length which lowers from a reference position defining an arrangement position of the free curved surface mirror on lens data toward the image plane is L, L/X is 1 or lower.

10. The image display device according to claim 1,
wherein when it is assumed that a length in the first direction is X, and a projector distance that is a vertical length which lowers from a reference position defining an arrangement position of the free curved surface mirror on lens data toward the image plane is L, L/X is 0.2 or lower.

11. The image display device according to claim 1,
wherein a portion of the free curved surface mirror which reflects the laser beam corresponding to the first direction is sharper in a convex shape toward the image plane than a portion of the free curved surface mirror which reflects the laser beam corresponding to the second direction.

12. The image display device according to claim 1,
wherein the light source emits at least one beam light having a plurality of colored lights of S polarized light, and the other beam light having a plurality of colored lights of P polarized light, and includes a color synthesis unit that combines the beam lights of the plurality of polarized waves together.

13. The image display device according to claim 12,
wherein when the one beam light includes lights of at least red, green, and blue wavelength ranges, and the respective center wavelengths are set to R1, G1, and B1 (nm), the other beam light also includes a light of one wavelength range of at least red, green, and blue wavelength ranges, and a center wavelength of the light is different from that of the R1, G1, and B1 (nm).

14. The image display device according to claim 1,
wherein the light emitted from the light source is an elliptical shape, and the light source and the image plane are arranged so that the short axial direction of the ellipse is aligned with the first direction when the optical scanning unit remains static in the center of the scanning range.

15. The image display device according to claim 1, further comprising:
an optical path changing unit that outputs the light emitted from the light source in a direction substantially perpendicular to a two-dimensional scanning surface formed by two directions of the first and second directions.

16. The image display device according to claim 1,
wherein the optical scanning unit includes a plurality of optical scanning units.

17. The image display device according to claim 1,
wherein the optical scanning unit is shielded within a structure that enables magnetic shielding, and
wherein a permanent magnetic or an electromagnet is disposed within a part of a housing of the optical scanning unit or the image display device, and is self-sustainable on or in the vicinity of the image plane by the magnetic force.

18. An image display device comprising:
an optical scanning unit that scans an image plane with a light emitted from a light source in a first direction of the image plane and a second direction orthogonal to the first direction due to a rotational movement of reciprocation of a reflecting surface of the light; and
an optical system that enlarges a scanning angle of the scanned scanning beam,
wherein the optical system has a free curved surface lens on the optical scanning unit side, and has a convex mirror on the image plane side,
wherein in the first direction, an incident angle of the scanning beam to the convex mirror corresponding to a center port of the image plane is larger than an incident angle of the scanning beam to the convex mirror corresponding to a peripheral portion of the image plane,
wherein in the second direction, an incident angle of the scanning beam to a portion of the convex mirror closer to the optical scanning unit is smaller than an incident angle of the scanning beam to a portion of the convex mirror distant from the optical scanning unit, and
wherein in a surface roughness of the convex mirror, a plurality of surface roughness is present in band shapes in the same direction as a scanning direction of the convex mirror with the light from the light source, or in a direction substantially orthogonal to the scanning direction, and a dimension between boundaries of the band-like roughness is smaller than a beam dimension on the convex mirror.

19. The image display device according to claim 18, wherein the optical scanning unit includes an MEMS mirror.

20. An image display device comprising:
an optical scanning unit that scans an image plane with a light emitted from a light source in a first direction and a second direction of the image plane due to a rotational movement of reciprocation of a reflecting surface of the light; and
an optical system that enlarges a scanning angle of the scanned light, wherein the optical system has a free curved surface lens on the optical scanning unit side, and has a convex mirror on the image plane side,
wherein in a surface roughness of the convex mirror, a plurality of surface roughness is present in band shapes in the same direction as the scanning direction of the convex mirror with the light from the light source, or in a direction substantially orthogonal to the scanning direction, and a dimension between boundaries of the band-like roughness is smaller than a beam dimension on the convex mirror.

* * * * *